(12) United States Patent
Auner et al.

(10) Patent No.: US 12,281,942 B2
(45) Date of Patent: Apr. 22, 2025

(54) APPARATUSES, SYSTEMS, AND METHODS FOR DETECTING MATERIALS BASED ON RAMAN SPECTROSCOPY

(71) Applicant: Wayne State University, Detroit, MI (US)

(72) Inventors: Gregory William Auner, Livonia, MI (US); Michelle Ann Brusatori, Sterling Heights, MI (US); Changhe Huang, Novi, MI (US)

(73) Assignee: Wayne State University, Detroit, MI (US)

( * ) Notice: Subject to any disclaimer, the term of this patent is extended or adjusted under 35 U.S.C. 154(b) by 63 days.

(21) Appl. No.: 18/319,615

(22) Filed: May 18, 2023

(65) Prior Publication Data

US 2024/0133739 A1    Apr. 25, 2024
US 2024/0230407 A9    Jul. 11, 2024

Related U.S. Application Data

(62) Division of application No. 16/451,901, filed on Jun. 25, 2019, now Pat. No. 11,698,304.

(60) Provisional application No. 62/806,689, filed on Feb. 15, 2019.

(51) Int. Cl.
*G01J 3/44* (2006.01)
*G01J 3/02* (2006.01)
*G01J 3/18* (2006.01)
*G01J 3/28* (2006.01)
*G01N 21/03* (2006.01)

(52) U.S. Cl.
CPC ............... *G01J 3/44* (2013.01); *G01J 3/0208* (2013.01); *G01J 3/1838* (2013.01); *G01J 3/2803* (2013.01); *G01N 21/03* (2013.01); *G01J 2003/1861* (2013.01)

(58) Field of Classification Search
CPC .......... G01J 3/44; G01J 3/0208; G01J 3/1838; G01J 3/2803; G01J 2003/1861; G01N 21/03
See application file for complete search history.

(56) References Cited

U.S. PATENT DOCUMENTS

2004/0257563 A1* 12/2004 Miller ................... G01J 3/2823
356/328

* cited by examiner

*Primary Examiner* — Jamil Ahmed

(57) ABSTRACT

Apparatuses, systems, and methods for Raman spectroscopy are described. In certain implementations, a spectrometer is provided. The spectrometer may include a plurality of optical elements, comprising an entrance aperture, a collimating element, a volume phase holographic grating, a focusing element, and a detector array. The plurality of optical elements are configured to transfer the light beam from the entrance aperture to the detector array with a high transfer efficiency over a preselected spectral band.

20 Claims, 40 Drawing Sheets

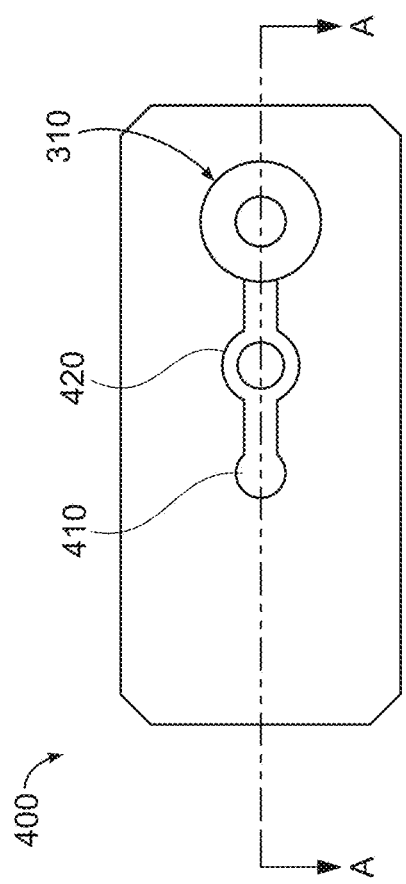
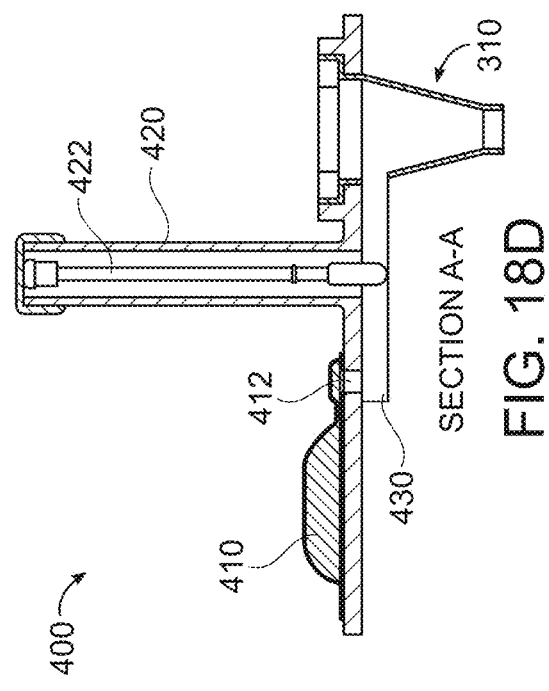

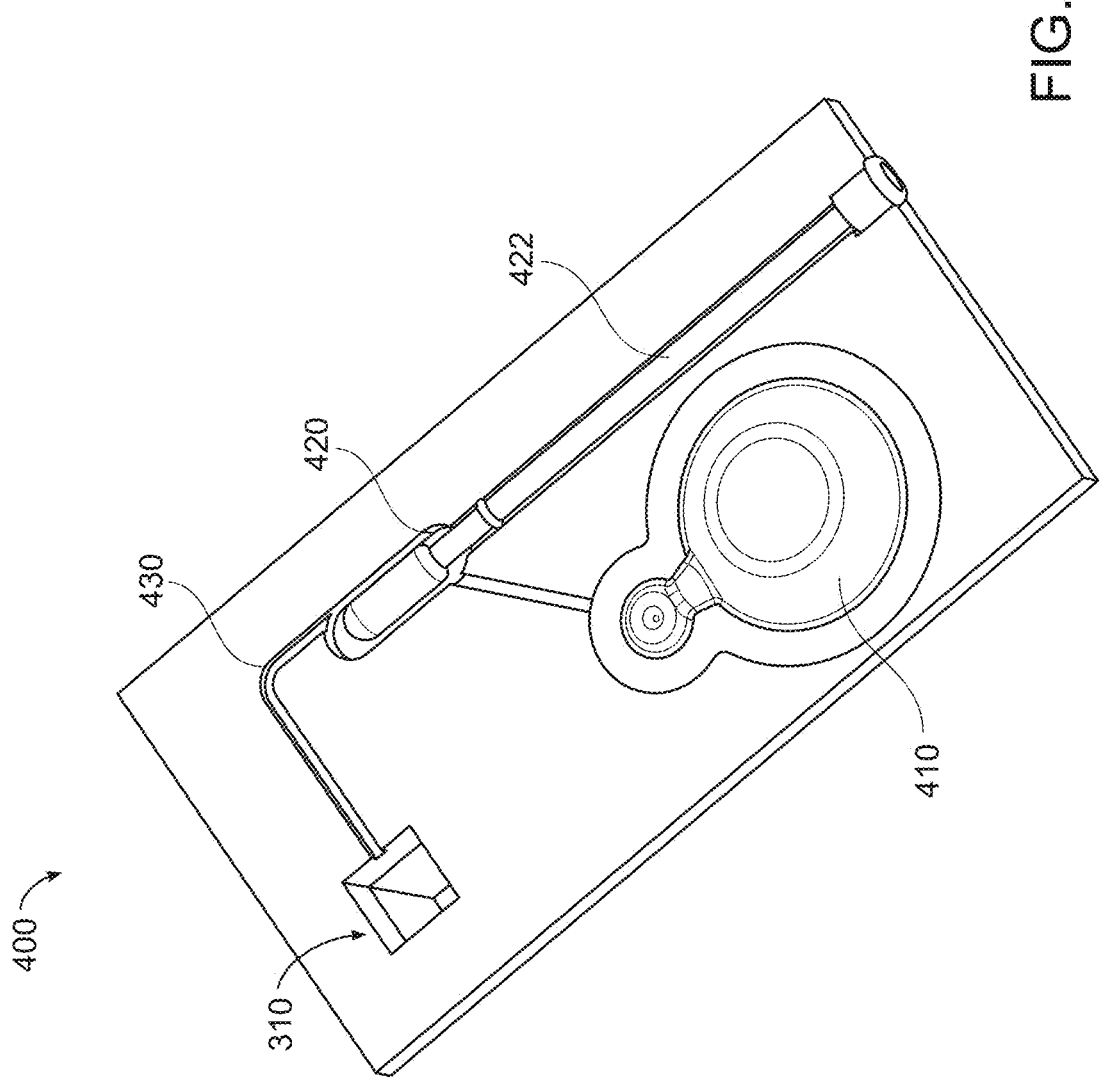

APPARATUSES, SYSTEMS, AND METHODS FOR DETECTING MATERIALS BASED ON RAMAN SPECTROSCOPY

CROSS-REFERENCE TO RELATED APPLICATIONS

This application is a divisional of U.S. patent application Ser. No. 16/451,901, filed Jun. 25, 2019, which claims the benefit of U.S. Provisional Application No. 62/806,689, filed Feb. 15, 2019, both of which are incorporated by reference in their entirety.

BACKGROUND

Technical Field

The present disclosure generally relates to the field of spectroscopy, including apparatuses, systems, and methods for performing Raman spectroscopy. Disclosed embodiments relate to, among other things, apparatuses, systems, and methods for detecting biological or chemical targets based on Raman spectroscopy.

NAMES OF THE PARTIES TO A JOINT RESEARCH AGREEMENT

Seraph Biosciences and Wayne State University

BACKGROUND DESCRIPTION

Raman spectroscopy is a vibrational spectroscopic technique that provides spectroscopic "fingerprints" by which organic and inorganic molecules and substances can be identified. Raman scattering occurs when light interacts with a molecular vibration or rotation, and a change in polarizability takes place during molecular motion. This results in light being inelastically scattered (Raman-scattered light) at a vibrational frequency shifted up or down from that of the excitation light. The frequency difference between excitation light and Raman-scattered light is the Raman shift, typically represented as $cm^{-1}$. A Raman spectrum is the intensity profile of the inelastically scattered light as a function of frequency or the frequency difference. A Raman spectrum may include one or more Raman bands or Raman peaks. The Raman bands or Raman peaks occur at vibrational frequencies characteristic of vibrational modes of specific bond types in a molecule or substance and directly provide information of the atomic or molecular composition of a molecule or substance. By detecting and analyzing the Raman spectrum, the unique spectroscopic fingerprint of a molecule or substance can be obtained, with the intensity directly proportional to the concentration of the molecule or substance that gives rise to the bands or peaks. The present disclosure provides, among other things, apparatuses, systems, and methods for detecting biological or chemical targets based on Raman spectroscopy.

SUMMARY

According to an exemplary embodiment of the present disclosure, a spectrometer is described. The spectrometer includes a plurality of optical elements. The plurality of optical elements includes an entrance aperture, a collimating element, a volume phase holographic grating, a focusing element, and a detector array. The entrance aperture is configured to receive a light beam. The collimating element is configured to direct the light beam to the volume phase holographic grating. The volume phase holographic grating is configured to disperse the light beam over a preselected spectral band of at least 50 nm. The focusing element is configured to focus the dispersed light beam to the detector array. The plurality of optical elements are configured to transfer the light beam from the entrance aperture to the detector array with an average transfer efficiency from 60% to 98% for first order diffraction over the preselected spectral band of at least 50 nm.

According to an exemplary embodiment of the present disclosure, a spectrometer is described. The spectrometer includes a plurality of optical elements. The plurality of optical elements includes an entrance aperture, a collimating element, a volume phase holographic grating, a focusing element, and a detector array. The entrance aperture is configured to receive a light beam. The collimating element is configured to direct the light beam to the volume phase holographic grating. The volume phase holographic grating is configured to disperse the light beam over a preselected spectral band of at least 50 nm. The focusing element is configured to focus the dispersed light beam to the detector array. The plurality of optical elements are configured to detect the dispersed light beam at the detector array with a spectral resolution from $0.1\ cm^{-1}$ to $2.5\ cm^{-1}$ over the preselected spectral band of at least 50 nm. In some embodiments, the plurality of optical elements are configured to detect the dispersed light beam at the detector array with a spectral resolution from $0.1\ cm^{-1}$ to $2.5\ cm^{-1}$ over the preselected spectral band of at least $1600\ cm^{-1}$ as an alternative representation. In such instances, the spectral resolution refers to the average spectral resolution of the spectrometer over the preselected spectral band.

According to an exemplary embodiment of the present disclosure, a spectrometer is described. The spectrometer includes a plurality of optical elements. The plurality of optical elements includes an entrance aperture, a collimating element, a volume phase holographic grating, a focusing element, and a detector array. The entrance aperture is configured to receive a light beam. The collimating element is configured to direct the light beam to the volume phase holographic grating. The volume phase holographic grating is configured to disperse the light beam over a preselected spectral band of at least 50 nm. The focusing element is configured to focus the dispersed light beam to the detector array. The plurality of optical elements are configured to provide a performance ratio and a performance product in the preselected spectral band. The performance ratio is a ratio between a transfer efficiency and a path length of the light beam traveled from the focusing element to the detector array in units of % transfer efficiency per cm of path length. The performance ratio is from $3\%\cdot cm^{-1}$ to $12.3\%\cdot cm^{-1}$. The performance product is a product of a spectral resolution in $cm^{-1}$ and the path length of the light beam traveled from the focusing element to the detector array in cm. The performance product is from 0.8 to 100.

According to an exemplary embodiment of the present disclosure, a cuvette for containing a sample is described. The cuvette includes a chamber that has at least one tapered wall, a top end, and a bottom end. The tapered wall has a tilt angle relative to the bottom end configured to concentrate a portion of the sample to a central region on an interior surface of the bottom end.

According to an exemplary embodiment of the present disclosure, a cuvette for containing a sample is described. The cuvette includes a chamber that has at least one tapered wall, a top end, and a bottom end. The tapered wall has a tilt angle relative to the bottom end configured to homogenize a portion of the sample across a central region on an interior surface of the bottom end.

According to an exemplary embodiment of the present disclosure, an interrogation apparatus for receiving an optical signal from a sample is described. The interrogation apparatus includes a cuvette configured to contain the sample. The cuvette includes a chamber that has at least one wall, a top end, and a bottom end. The interrogation apparatus further includes a focusing back reflector above the bottom end of the cuvette. The focusing back reflector has a focal point on or above the bottom end. The focusing back reflector is configured to reflect and focus light from the bottom end to the focal point.

According to an exemplary embodiment of the present disclosure, a Raman spectroscopic system is described. The Raman spectroscopic system includes an excitation light source to radiate a light beam into a cuvette through a bottom end of the cuvette and onto a portion of a sample contained in the cuvette. The Raman spectroscopic system further includes a Raman spectrometer. The spectrometer includes an entrance aperture, a collimating element, a transmission diffraction grating, a focusing element, and a detector array. The entrance aperture is configured to receive a Raman signal from the portion of the sample through the bottom end of the cuvette. The collimating element is configured to receive the Raman signal from the entrance aperture and direct the Raman signal to the transmission diffraction grating. The transmission diffraction grating is configured to disperse the Raman signal over a preselected spectral band. The focusing element is configured to focus the dispersed Raman signal to the detector array.

According to an exemplary embodiment of the present disclosure, a Raman spectroscopic system is described. The Raman spectroscopic system includes an excitation light source to radiate a light beam into a cuvette through a bottom end of the cuvette and onto a portion of a sample contained in the cuvette. The cuvette includes a chamber, a top end, and a bottom end. The Raman spectroscopic system further includes a focusing back reflector above the bottom end configured to reflect and focus light from the bottom end to a focal point on or above the bottom end. The Raman spectroscopic system further includes a Raman spectrometer. The spectrometer includes an entrance aperture, a collimating element, a transmission diffraction grating, a focusing element, and a detector array. The entrance aperture is configured to receive a Raman signal from the portion of the sample through the bottom end of the cuvette. The Raman signal includes Raman signal reflected by the focusing back reflector. The collimating element is configured to receive the Raman signal from the entrance aperture and direct the Raman signal to the transmission diffraction grating. The transmission diffraction grating is configured to disperse the Raman signal over a preselected spectral band. The focusing element is configured to focus the dispersed Raman signal to the detector array.

According to an exemplary embodiment of the present disclosure, a method for detecting the presence or absence of at least one feature of a Raman signal indicative of the presence or absence of a target in a sample is described. The method includes concentrating a portion of the sample to a central region on an interior surface of a bottom end of a cuvette. The cuvette includes a chamber, at least one tapered wall, a top end, and the bottom end. The method further includes focusing a light beam to the central region. The method further includes directing a Raman signal from the central region to a Raman spectrometer. The method further includes detecting the presence or absence of at least one feature of the Raman signal indicative of the presence or absence of the target in the sample.

According to an exemplary embodiment of the present disclosure, a method for detecting the presence or absence of at least one feature of a Raman signal indicative of the presence or absence of a target in a sample is described. The method includes focusing a light beam onto a portion of the sample on an interior surface of a bottom end of a cuvette. The cuvette includes a chamber, at least one tapered wall, a top end, and the bottom end. The method further includes reflecting and focusing light from the bottom end of the cuvette. The light includes a portion of the light beam and a Raman signal from the portion of the sample to a focal point on or above the interior surface of the bottom end. The method further includes directing a Raman signal from the portion of the sample to a Raman spectrometer. The method further includes detecting the presence or absence of at least one feature of the Raman signal indicative of the presence or absence of the target in the sample.

According to an exemplary embodiment of the present disclosure, a method for detecting the presence or absence of at least one feature of a Raman signal indicative of the presence or absence of a target in a sample is described. The method includes focusing a light beam onto a portion of the sample on an interior surface of a bottom end of a cuvette. The cuvette includes a chamber, at least one tapered wall, a top end, and the bottom end. The method further includes directing a Raman signal from the portion of the sample passing through the bottom end to a Raman spectrometer. The method further includes detecting the presence or absence of at least one feature of the Raman signal indicative of the presence or absence of the target in the sample.

According to an exemplary embodiment of the present disclosure, a method for detecting the presence or absence of at least one feature of a Raman signal indicative of the presence or absence of a target in a sample is described. The method includes focusing a light beam onto a portion of the sample. The method further includes directing a Raman signal from the portion of the sample to a spectrometer. The spectrometer includes a plurality of optical elements. The plurality of optical elements includes an entrance aperture, a collimating element, a volume phase holographic grating, a focusing element, and a detector array. The entrance aperture is configured to receive a light beam. The collimating element is configured to direct the light beam to the volume phase holographic grating. The volume phase holographic grating is configured to disperse the light beam over a preselected spectral band of at least 50 nm. The focusing element is configured to focus the dispersed light beam to the detector array. The plurality of optical elements are configured to transfer the light beam from the entrance aperture to the detector array with an average transfer efficiency from 60% to 98% for first order diffraction over the preselected spectral band of at least 50 nm. The method further includes detecting the presence or absence of at least one feature of the Raman signal indicative of the presence or absence of the target in the sample.

According to an exemplary embodiment of the present disclosure, a method for performing an analysis on a sample within a cuvette is described. The method includes concentrating a portion of the sample to a central region on an interior surface of a bottom end of a cuvette. The cuvette includes a chamber, at least one tapered wall, a top end, and the bottom end. The method further includes focusing a light beam to the central region. The method further includes directing a Raman signal from the central region to a Raman spectrometer. The method further includes analyzing the Raman signal.

According to an exemplary embodiment of the present disclosure, a method for performing an analysis on a sample within a cuvette is described. The method includes focusing a light beam onto a portion of the sample on an interior surface of a bottom end of a cuvette. The cuvette includes a chamber, at least one tapered wall, a top end, and the bottom end. The method further includes reflecting and focusing light from the bottom end of the cuvette. The light includes a portion of the light beam and a Raman signal from the portion of the sample to a focal point on or above the interior surface of the bottom end. The method further includes directing a Raman signal from the portion of the sample to a Raman spectrometer. The method further includes analyzing the Raman signal.

According to an exemplary embodiment of the present disclosure, a method for performing an analysis on a sample within a cuvette is described. The method includes focusing a light beam onto a portion of the sample on an interior surface of a bottom end of a cuvette. The cuvette includes a chamber, at least one tapered wall, a top end, and the bottom end. The method further includes directing a Raman signal from the portion of the sample passing through the bottom end to a Raman spectrometer. The method further includes analyzing the Raman signal.

According to an exemplary embodiment of the present disclosure, a method for performing an analysis on a sample within a cuvette is described. The method includes focusing a light beam onto a portion of the sample. The method further includes directing a Raman signal from the portion of the sample to a spectrometer. The spectrometer includes a plurality of optical elements. The plurality of optical elements includes an entrance aperture, a collimating element, a volume phase holographic grating, a focusing element, and a detector array. The entrance aperture is configured to receive a light beam. The collimating element is configured to direct the light beam to the volume phase holographic grating. The volume phase holographic grating is configured to disperse the light beam over a preselected spectral band of at least 50 nm. The focusing element is configured to focus the dispersed light beam to the detector array. The plurality of optical elements are configured to transfer the light beam from the entrance aperture to the detector array with an average transfer efficiency from 60% to 98% for first order diffraction over the preselected spectral band of at least 50 nm. The method further includes analyzing the Raman signal.

Additional disclosure of the disclosed embodiments will be set forth in part in the description that follows.

It is to be understood that both the foregoing general description and the following detailed description are examples and explanatory only and are not restrictive of the disclosed embodiments as claimed.

The accompanying drawings constitute a part of this specification. The drawings illustrate several embodiments of the present disclosure and, together with the description, serve to explain the principles of certain disclosed embodiments as set forth in the accompanying claims.

BRIEF DESCRIPTION OF DRAWINGS

FIG. 18C is a top cross-sectional view of the exemplary sample collection cartridge of FIG. 18A.

FIG. 18D is a cross-sectional view of the exemplary sample collection cartridge of FIG. 18A.

FIG. 18E is a perspective view of another exemplary sample collection cartridge, according to some embodiments of the present disclosure.

DETAILED DESCRIPTION

Figure 1:
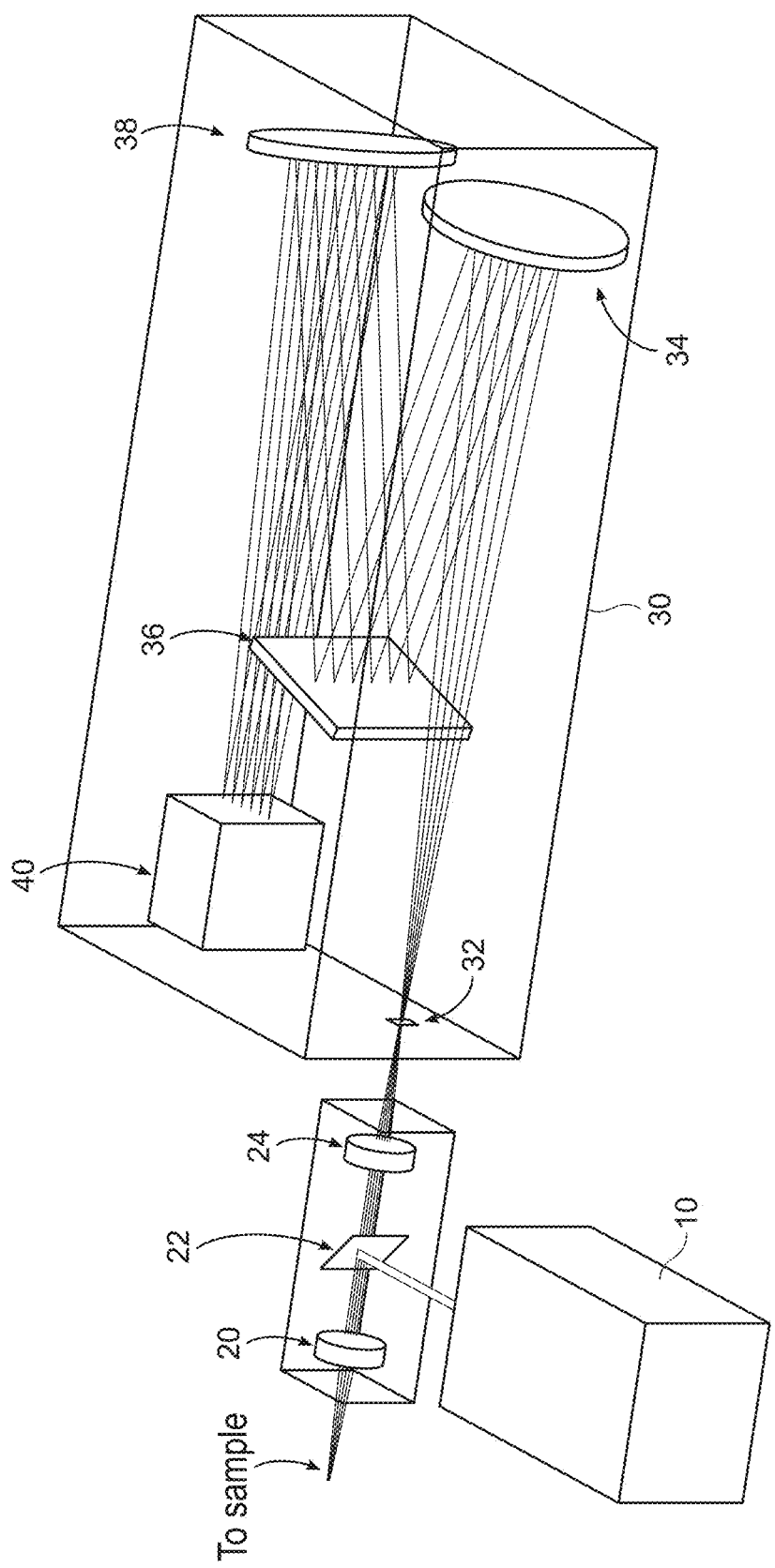
FIG. 1 is a schematic representation of an exemplary Raman spectrometer.

Reference will now be made in detail to embodiments and aspects of the present disclosure, certain examples of which are illustrated in the accompanying drawings. Where possible, the same reference numbers will be used throughout the drawings to refer to the same or like parts.

Some embodiments of the present disclosure may be implemented using a microscope, a spectrograph or spectrometer, or apparatuses or systems built according to certain embodiments of the present disclosure.

As used herein, "target" refers to any substance, chemical, organism, and material, including biological material. "Biological material" refers to any biological matter, such as molecules, cells, tissue, molecular structures, toxins, metabolites, biomarkers, and pathogens, including bacteria, parasites, and viruses. "Sample" refers to a sample to be interrogated for one or more targets. The target may be unidentified before the interrogation, and the sample may or may not contain the target to be detected. The interrogated sample may be a portion of a sample obtained from the source, and that portion would contain the target if the target is present in the sample. When a sample is described as being concentrated, homogenized, and/or interrogated, such concentration, homogenization, and/or interrogation may include only a portion of the sample obtained from the source.

As used herein, a Raman signal refers to Raman-scattered light. "Raman spectrum" refers to a representation of the intensity of Raman-scattered light as a function of its frequency. For example, in a Raman spectrum, the frequency of Raman-scattered light is typically converted to the Raman shift, which is the frequency difference between excitation light and Raman-scattered light, according to the following formula:

$$\Delta v(\text{cm}^{-1}) = \left(\frac{1}{\lambda_0(\text{nm})} - \frac{1}{\lambda(\text{nm})}\right) \times \frac{10^7 \text{ nm}}{\text{cm}}$$

where $\Delta v$ is the Raman shift represented as $cm^{-1}$, $\lambda_0$ is the excitation wavelength represented as nm, and $\lambda$ is the wavelength of the Raman-scattered light represented as nm.

As described herein, "preselected spectral band" refers to a spectral band or spectral region in an optical signal that may contain a feature characteristic of or indicative of one or more targets to be detected. A feature of a Raman signal refers to one or more of a shape, height, slope, area, and location of one or more Raman bands and/or Raman peaks of the Raman spectrum. A feature may include only one of a shape, height, slope, area, or location. A feature may include any combination of two of a shape, height, slope, area, or location. A feature may include any combination of three of a shape, height, slope, area, or location. A feature may include any combination of a shape, height, slope, area, or location. A feature may include all five (a shape, height, slope, area, and location). In some exemplary embodiments, one feature is indicative of the presence or absence of a target. In some exemplary embodiments, more than one feature is indicative of the presence or absence of a target. One or more features may correspond to the molecular structure, composition, and inter-molecular interactions of a target in the sample to be interrogated. In some instances, more than one preselected spectral band is detected or used for detecting the presence or absence of the target in a sample. The preselected spectral band for a certain target may be experimentally or theoretically determined before being used for detecting the presence or absence of the target in a sample. For example, a preselected spectral band can be determined based on one or more predefined Raman bands or Raman peaks corresponding to the vibration or rotation of one or more functional groups of atoms in a pure sample of the target.

As described herein, an "optical signal" refers to electromagnetic radiation from a sample to be interrogated. For example, the electromagnetic radiation can be elastically or inelastically scattered light emitted from the sample to be interrogated, such as fluorescence emission or Raman-scattered light.

The term "from one value to another value" includes the endpoints and all values between the endpoints.

Various terms are used herein for describing performance of a spectrometer. The "path length" of a spectrometer refers to the physical linear distance traveled by a light beam from a focusing element of the spectrometer to a detector of the spectrometer. Unless indicated otherwise, path length as used herein is denominated in units of cm. The path length of a spectrometer can affect, among other things, the overall physical dimension of a spectrometer.

The "light throughput" of a spectrometer refers to a transfer efficiency of a spectrometer for transferring a light beam entering the entrance aperture to the detector of the spectrometer. The transfer efficiency is the percent of the light that enters the entrance aperture that reaches the detector. Such transfer efficiency of the spectrometer may vary among different wavelengths of the light beam, and may also vary for different diffraction orders. In some instances, an average transfer efficiency is used to describe the light throughput of a spectrometer. The average transfer efficiency refers to the average transfer efficiency of the spectrometer for different wavelengths within a spectral band of the light beam for a certain diffraction order. Given a certain detector, increasing the light throughput or transfer efficiency of a spectrometer improves the sensitivity of the spectrometer or reduces the integration time for detecting low intensity optical signals, such as Raman-scattered light.

The "performance ratio" of a spectrometer refers to a ratio between (1) the transfer efficiency as a percent and (2) the path length of the spectrometer measured in cm. The performance ratio is directly proportional to the performance of the spectrometer. Given a certain path length or spectral resolution of a spectrometer, increasing the transfer efficiency of the spectrometer improves the overall performance of the spectrometer and increases the performance ratio. The performance ratio may vary for different wavelengths. Alternatively, given a transfer efficiency of the spectrometer, reducing the path length of the light beam in the spectrometer improves the performance of the spectrometer and increases the performance ratio. In some instances, the performance ratio of a spectrometer refers to the average performance ratio of the spectrometer over a spectral band, which is the ratio between (1) the average transfer efficiency of the spectrometer over a spectral band as a percent and (2) the path length of the spectrometer measured in cm.

The "performance product" of a spectrometer refers to a product of a spectral resolution measured in $cm^{-1}$ and the path length of the spectrometer measured in cm. All else equal, a smaller performance product corresponds to better spectral resolution and/or a shorter path length, either or both of which may be preferred according to certain embodiments. The performance product may vary for different wavelengths. In some instances, the performance product of a spectrometer refers to the average performance product of the spectrometer over a spectral band, which is the product of an average spectral resolution over a spectral band measured in $cm^{-1}$ and the path length of the spectrometer measured in cm.

Due to the inherent low intensity of Raman-scattered light and complexities of interrogating biological material, such as urine, saliva, blood, contaminated water, and fecal matter, it is desirable for Raman spectroscopic systems to have both high light throughput and high spectral resolution to increase the signal to noise (S/N) ratio of the measured Raman spectra to obtain information from the measured Raman spectra. It is also desirable for Raman spectroscopic systems to have smaller physical dimensions such that the systems can be setup on a standard laboratory countertop or for deployment at point of need in the field. However, the desirable benefits of high light throughput, high spectral resolution, and small physical dimension are difficult to achieve in typical Raman spectrometers. For example, a typical Raman spectrometer has a long path length to increase the spectral resolution, which in turn increases the physical dimension of the spectrometer. Furthermore, there exists a fundamental tradeoff between spectral resolution and light throughput in typical Raman spectrometers. These difficulties are further described below with reference to FIGS. 1 and 2.

Figure 2:
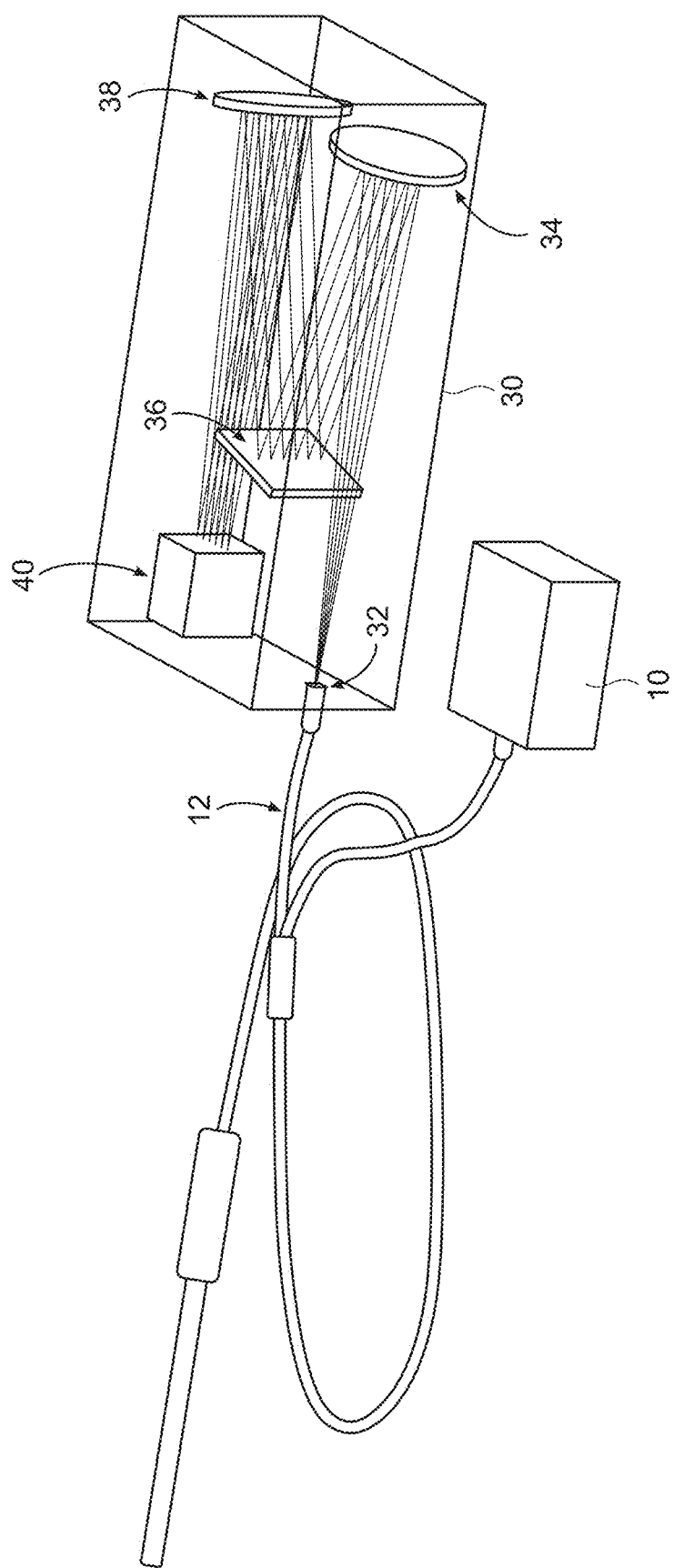
FIG. 2 is a schematic representation of another exemplary Raman spectrometer.

FIG. 1 is a schematic representation of a system, including a typical Raman spectrometer that is used to obtain Raman spectra from a sample. As shown in FIG. 1, excitation light from a laser 10 or monochromatic source is reflected off a long pass edge filter 22 (or notch filter) and is directed through lens 20, which in turn focuses the excitation light onto a sample. Raman-scattered light from the sample is received by lens 20 and is directed to the edge filter 22 that blocks the excitation light and passes only the Raman-scattered light through. Lens 24 then focuses the Raman-scattered light onto the entrance slit 32 of a spectrometer 30. Light entering through the entrance slit 32 is collimated by collimating mirror 34, which directs the collimated light onto a reflective grating 36 of the spectrometer 30. The reflective grating 36 disperses the collimated light, which is then focused by focusing mirror 38 onto a CCD 40. FIG. 2 is a schematic representation of another system, including a typical Raman spectrometer, where optical fibers 12 are used to direct the excitation light and Raman-scattered light to the spectrometer 30.

The spectral resolution of a spectrometer can be affected by various factors, including 1) the size of the entrance aperture or slit, 2) optical characteristics of the collimating and focusing mirrors (e.g., focal lengths and focal spot sizes), 3) the dispersive element (e.g., a grating), 4) the excitation wavelength of the laser, and 5) the detector (e.g., the pixel size of a CCD). For example, the size of the entrance aperture or slit may affect the minimum image size that the collimating and focusing mirrors can form in the detector plane. The type of dispersive element may affect the total wavelength range and/or the spectral resolution of the spectrometer. The type of detector may affect the maximum number and size of discreet points in which the spectrum can be digitized.

The light throughput of a spectrometer can also be affected by various factors, including 1) the etendue of the spectrometer, 2) the diffraction efficiency of the dispersive element over the spectral region of interest, 3) the quantum efficiency of the detector, and 4) light losses in optical components (e.g., through adsorption or reflection), such as filters, lenses, and mirrors. The etendue is the ability of the spectrometer to accept light and is a function of the entrance aperture area (S) times the solid angle ($\Omega$) of the accepted light beam.

In the typical Raman spectrometers as shown in FIGS. 1 and 2, optimization of the different factors described above to reconcile the tradeoff between spectral resolution and light throughput to obtain desired performance has been difficult in this field. For example, as shown in FIGS. 1 and 2, typical Raman spectrometers achieve high spectral resolution by using a scanning reflective grating and making the light travel over a long path length in the spectrometer. For example, in typical Raman spectrometers, the path length of light travelled from the focusing mirror to the CCD is from about ¾ meter to 1 meter. However, the long path length can increase the physical dimension of the spectrometer such that the spectrometer is too large to be setup on a standard laboratory shelf or for deployment at point of need in the field. Moreover, the long path length of the spectrometer can lead to low light throughput of the spectrometer, which in turn degrades the sensitivity of the system for detecting targets. Spectrometers with low light throughput may also need to use longer integration time for collecting an optical signal, during which biological or other dynamic changes of the sample being interrogated may confound the Raman spectra and/or reduce the quality of the Raman spectra for accurate analysis and detection. Also, to obtain spectrum of an optical signal over a broad spectral range, the reflecting grating may need to be turned to scan over the spectral range. Such scanning further increases the amount of time for interrogating a sample.

In some exemplary embodiments, the present disclosure provides spectrometers and spectroscopic systems having both high spectral resolution and high light throughput. In some exemplary embodiments, the present disclosure provides spectrometers and spectroscopic systems having small physical dimensions suitable to be setup on a standard laboratory countertop or for deployment at a point of need in the field. In some exemplary embodiments, the present disclosure provides spectrometers and spectroscopic systems allowing for short interrogation time with high sensitivity. In some exemplary embodiments, such spectrometers and spectroscopic systems can be used for various spectroscopic applications, including for Raman spectroscopic analysis in biomedical applications. Advantageously, such Raman spectrometers and Raman spectroscopic systems may allow for rapid and sensitive acquisition of high quality Raman spectra and real-time detection of biological or chemical targets.

Figure 3:
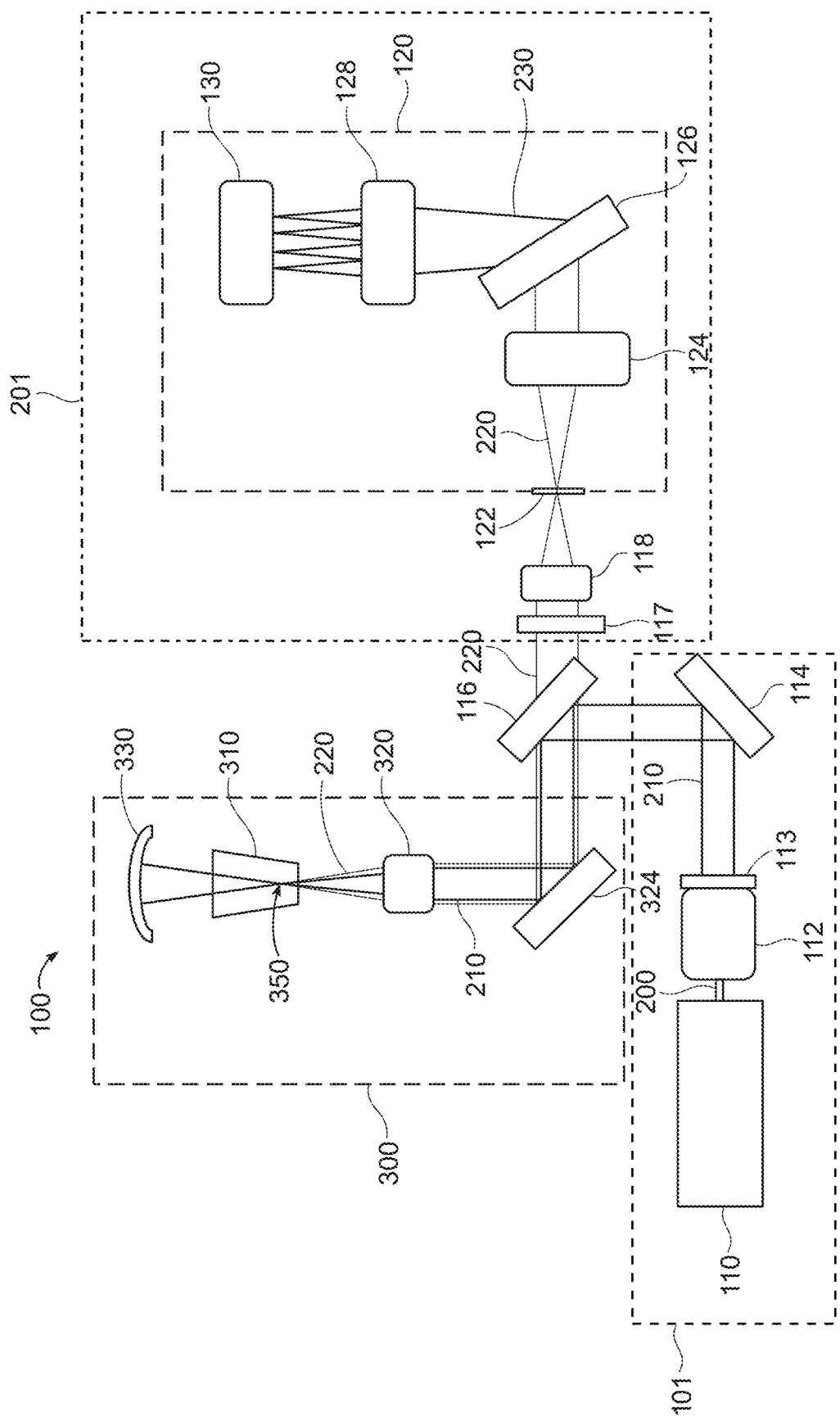
FIG. 3 is a schematic representation of an exemplary Raman spectroscopic system, according to some embodiments of the present disclosure.

FIG. 3 is a schematic representation of an exemplary Raman spectroscopic system 100, according to some embodiments of the present disclosure. As shown in FIG. 3, Raman spectroscopic system 100 includes an illumination system 101, a detection system 201, and an interrogation apparatus 300, each having a plurality of components.

Illumination System

In some exemplary embodiments, the illumination system 101 of Raman spectroscopic system 100 includes an excitation light source 110 that emits an excitation light beam 200. In some exemplary embodiments, excitation light source 110 may be a laser or a monochromatic light source. In some exemplary embodiments, the illumination system 101 includes a beam expander 112 that expands excitation light beam 200 to a larger excitation light beam 210. In some exemplary embodiments, beam expander 112 further collimates excitation light beam 200 such that the divergence of the expanded excitation light beam 210 is smaller than excitation light beam 200. In some exemplary embodiments, the illumination system 101 includes a line bandpass filter 113 that has a passband to transmit wavelengths of excitation light source 110 and suppresses other wavelengths. Line bandpass filter 113 can be used to block ambient light outside of the passband of the filter. In some exemplary embodiments, the illumination system 101 includes one or more mirrors or beamsplitters for directing excitation light beam 200 or expanded excitation light beam 210 towards the interrogation apparatus 300 of Raman spectroscopic system 100. For example, as shown in FIG. 3, mirror 114 and beamsplitter 116 reflect and direct excitation light beam 210 towards the interrogation apparatus 300.

Detection System

In some exemplary embodiments, the detection system 201 of Raman spectroscopic system 100 may receive an optical signal 220 from interrogation apparatus 300, such as Raman-scattered light, and provide one or more outputs based on the received optical signal 220. The one or more outputs of the detection system 201 may include a Raman spectrum of the optical signal, an analysis of the Raman spectrum, a result of the analysis, and an alert based on the result of the analysis. To obtain a Raman spectrum of optical signal 220, optical signal 220 may be received by the detection system 201 over a period of interrogation time.

In some exemplary embodiments, as shown in FIG. 3, the detection system 201 of the Raman spectroscopic system 100 includes a spectrometer 120, a notch filter 117, and an aperture focusing lens 118. Notch filter 117 blocks wavelengths of excitation light source 110 while transmitting other wavelengths, including wavelengths of optical signal 220 from interrogation apparatus 300. Aperture focusing lens 118 focuses optical signal 220 onto an entrance aperture 122 of spectrometer 120. Entrance aperture 122 may be a slit or a pinhole for receiving a light beam, such as optical signal 220. In some exemplary embodiments, entrance aperture 122 may receive a fiber or fiber bundle that carry a light beam.

In some exemplary embodiments, aperture focusing lens 118 focuses optical signal 220 from interrogation apparatus 300 to a point at entrance aperture 122. In some exemplary embodiments, aperture focusing lens 118 is designed to be a multi-element diffraction limited lens. In some exemplary embodiments, aperture focusing lens 118 may have a diameter equal to or greater than the diameter of optical signal 220 such that a substantial amount or all of optical signal 220 are collected and focused to entrance aperture 122.

In some exemplary embodiments, spectrometer 120 includes a collimating element 124, a transmission grating 126, a focusing element 128, and a detector 130. Collimating element 124 receives a light beam that has passed through entrance aperture 122, collimates the light beam, and directs the light beam towards transmission grating 126. Transmission grating 126 disperses the light beam and directs the dispersed light beam to focusing element 128. Focusing element 128 focuses the dispersed light beam to detector 130. Advantageously, in some exemplary embodiments, the optical components of spectrometer 120 are designed and configured individually and as a whole to provide both high spectral resolution and high light throughput in one or more preselected spectral bands.

As discussed above, in a typical Raman spectrometer, e.g., a typical high-resolution Raman spectrometer, the path length is ¾ to 1 meter, which can result in low light throughput and may require a spectrometer size that is not optimal for certain applications. Shortening path length, however, has been associated with reducing the spectral resolution. In some exemplary embodiments, the optical components of spectrometer 120 are designed and configured individually and as a whole such that the spectrometer 120 has a reduced path length compared to typical spectrometers, but does not have reduced spectral resolution.

In some exemplary embodiments, the advantages of high light throughput, high spectral resolution, and reduced path length are at least partially achieved from the design and use of a lens-grating-lens configuration. Any one or more of the following design considerations may be used according to some embodiments.

First, as shown in FIG. 3, an exemplary embodiment of spectrometer 120 uses a lens-grating-lens configuration. This lens-grating-lens configuration reduces the path length of spectrometer 120 compared to typical spectrometers as shown in FIGS. 1 and 2, which in turn increases the light throughput of the spectrometer. In some exemplary embodiments, the path length of the spectrometer 120, i.e., from the focusing element 128 to the detector 120, is from 8 cm to 20 cm. In some exemplary embodiments, the path length is 12.5 cm. Advantageously, in some embodiments, the spectrometer 120 has a path length less than one third of that of the typical spectrometers as shown in FIGS. 1 and 2. Reducing the path length of spectrometer 120 can reduce the overall physical dimension of spectrometer 120, making it optimal for standard laboratory uses or to be deployed in the field. Another benefit of the lens-grating-lens configuration shown in FIG. 3 is that it provides more flexibility in replacing one type of detector 130 with another type of detector, each of which may be more suitable for different applications.

In some exemplary embodiments, a consideration for designing spectrometer 120 is selecting a collimating element 124. The collimating element 124 that receives light from the entrance aperture is configured to receive a most of the light entering the entrance aperture. The more light that the collimating element 124 receives from the entrance aperture, the greater the light throughput. In certain embodiments, larger lenses may be used as the collimating element 124 achieve this result. In some exemplary embodiments, the f-number of collimating element 124 in FIG. 3 is selected such that collimating element 124 receives all or substantially all of the diverging optical signal 220 that enters entrance aperture 122, thereby increasing the light throughput of spectrometer 120. For example, in some embodiments, the collimating element 124 receives from 80% to 98% of optical signal 220 that enters entrance aperture 122. In some exemplary embodiments, collimating element 124 is a multi-element lens that has two or more elements. In some exemplary embodiments, collimating element 124 is a multi-element diffraction limited lens. In some embodiments, a collimating element 124 having a small f-number can be used for receiving the light beam that entered entrance aperture 122. In some exemplary embodiments, collimating element 124 has an f-number from F/4 to F/1.2, where F is the focal length of collimating element 124. In some exemplary embodiments, collimating element 124 has an f-number of F/4 or F/2. Certain exemplary optical elements that can used as collimating element 124 include (i) fixed focus multi-element lenses that allows for correction of chromatic aberrations and (ii) reflective optics that collimate and direct light towards the grating. As used herein, f-number refers to the ratio of the focal length to the diameter of the entrance pupil of the collimating element or the focusing element.

In some exemplary embodiments, a consideration for designing spectrometer 120 is selecting a transmission grating 126. In some exemplary embodiments, to increase the light throughput and the spectral resolution of spectrometer 120, transmission grating 126 having both high spectral resolution and high diffraction efficiency in one or more preselected spectral bands is used in the lens-grating-lens configuration. Transmission grating 126 is a transmissive diffraction grating designed based on specific specifications to achieve high diffraction efficiency and high spectral resolution in an operational wavelength range. Those specifications may include angle of incidence, line density, and bandwidth or operational wavelength range. Such transmissive diffraction gratings used in the lens-grating-lens configuration are designed to allow for shorter path lengths without significantly sacrificing the desired resolution.

As described herein, the diffraction efficiency of transmission grating 126 may be higher for first order diffraction than other orders of diffraction at a designed angle of incidence. Similarly, the spectral resolution of transmission grating 126 may be higher for first order diffraction than other orders of diffraction at a designed angle of incidence. Therefore, description of the diffraction efficiency and spectral resolution of transmission grating 126 herein refers to the diffraction efficiency and spectral resolution of transmission grating 126 for first order diffraction at a designed angle of incidence for one or more wavelengths of vertically polarized light, horizontally polarized light, and/or the combination of vertically polarized light and horizontally polarized light. In the absence of referring to the specific polarization of the diffracted light, description of the diffraction efficiency and spectral resolution of transmission grating 126 herein refers to the diffraction efficiency and spectral resolution of transmission grating 126 for first order diffraction at a designed angle of incidence for one or more wavelengths of the combination of vertically polarized light and horizontally polarized light. In some instances, the diffraction efficiency of the transmission grating refers to the average diffraction efficiency of the transmission grating over the preselected spectral band. In some instances, the spectral resolution of the transmission grating refers to the average spectral resolution of the transmission grating over the preselected spectral band.

The spectral resolution and diffraction efficiency of transmission grating 126 may depend on various design factors, including wavelength, line density, polarization, angle of incidence, and diffraction order. In some exemplary embodiments, to increase the spectral resolution and light throughput of spectrometer 120, transmission grating 126 is designed to disperse an incident light beam with high spectral resolution and high diffraction efficiency over all wavelengths in an operational wavelength range for vertically and/or horizontally polarized light. In some exemplary embodiments, a center wavelength or a design wavelength refers to the wavelength where transmission grating 124 has the highest diffraction efficiency for first order diffraction when the designed angle of incidence into the Bragg planes is equal to the angle of diffraction out of the Bragg planes. In some exemplary embodiments, transmission grating 126 is designed to disperse an incident light beam with, as compared to the operational wavelength as a whole, highest spectral resolution and/or the highest or peak diffraction efficiency at a first wavelength for vertically polarized light, a second wavelength for horizontally polarized light, and/or a center wavelength for the combination of vertically and horizontally polarized light. In some exemplary embodiments, the first wavelength is the same as the second wavelength. In some exemplary embodiments, the first wavelength is the same as the center wavelength. In some exemplary embodiments, the second wavelength is the same as the center wavelength. In some exemplary embodiments, the first wavelength, the second wavelength, and the center wavelength are the same. In some exemplary embodiments, the center wavelength of transmission grating 126 refers to the Bragg wavelength at which the angle of incidence into the Bragg planes of transmission grating 126 is equal to the angle of diffraction out of the Bragg planes.

In some embodiments, the initial step for designing the transmission grating 126 is determining the operational wavelength range and center wavelength where transmission grating 126 disperses an incident light beam with high diffraction efficiency. In some exemplary embodiments, the operational wavelength range may include one or more preselected spectral bands. In some exemplary embodiments, the center wavelength is a wavelength within the one or more preselected spectral bands, such as a wavelength at or around the middle of the one or more preselected spectral bands. In some exemplary embodiments, the center wavelength is a selected wavelength within one or more preselected spectral bands of interest, and may or may not be at the middle of the one or more preselected spectral bands. Once the operational wavelength range and center wavelength are determined, the angle of incidence can be determined according to the grating equation below.

$$\sin \alpha + \sin \beta_{n\lambda} = kn\lambda_n$$

where n is the diffraction order, $\alpha$ is the angle of incidence (AOI), k is the line density represented as line/mm, $\beta$ is the angle of diffraction (AOD), and $\lambda$ is the wavelength. When the Bragg phase-matching condition is met, the angle of incidence, $\alpha$, equals the angle of diffraction, $\beta$, at the center wavelength, $\lambda_B$, and the grating equation becomes $2 \sin \alpha = kn\lambda_B$, from which the angle of incidence, $\alpha$, can be determined given a certain line density k. In some exemplary embodiments, given a certain transmission grating 126, a center wavelength can be tuned by adjusting the incidence angle, $\alpha$.

In some exemplary embodiments, transmission grating 126 is designed to have an angle of incidence greater than 0° for wavelengths in the operational wavelength range for first order diffraction. In some exemplary embodiments, transmission grating 126 may have an angle of incidence from 10° to 60° for all the wavelengths in the operational wavelength range. In some exemplary embodiments, transmission grating 126 may have an angle of incidence from 10° to 60° for a center wavelength in the operational wavelength range. Advantageously, in some exemplary embodiments, because of the lens-grating-lens configuration, transmission grating 126 is designed to have a higher angle of incidence to reduce the overall dimension of spectrometer 120, making spectrometer 120 suitable to be set up on standard laboratory countertop or to be used in the field.

Figure 4:
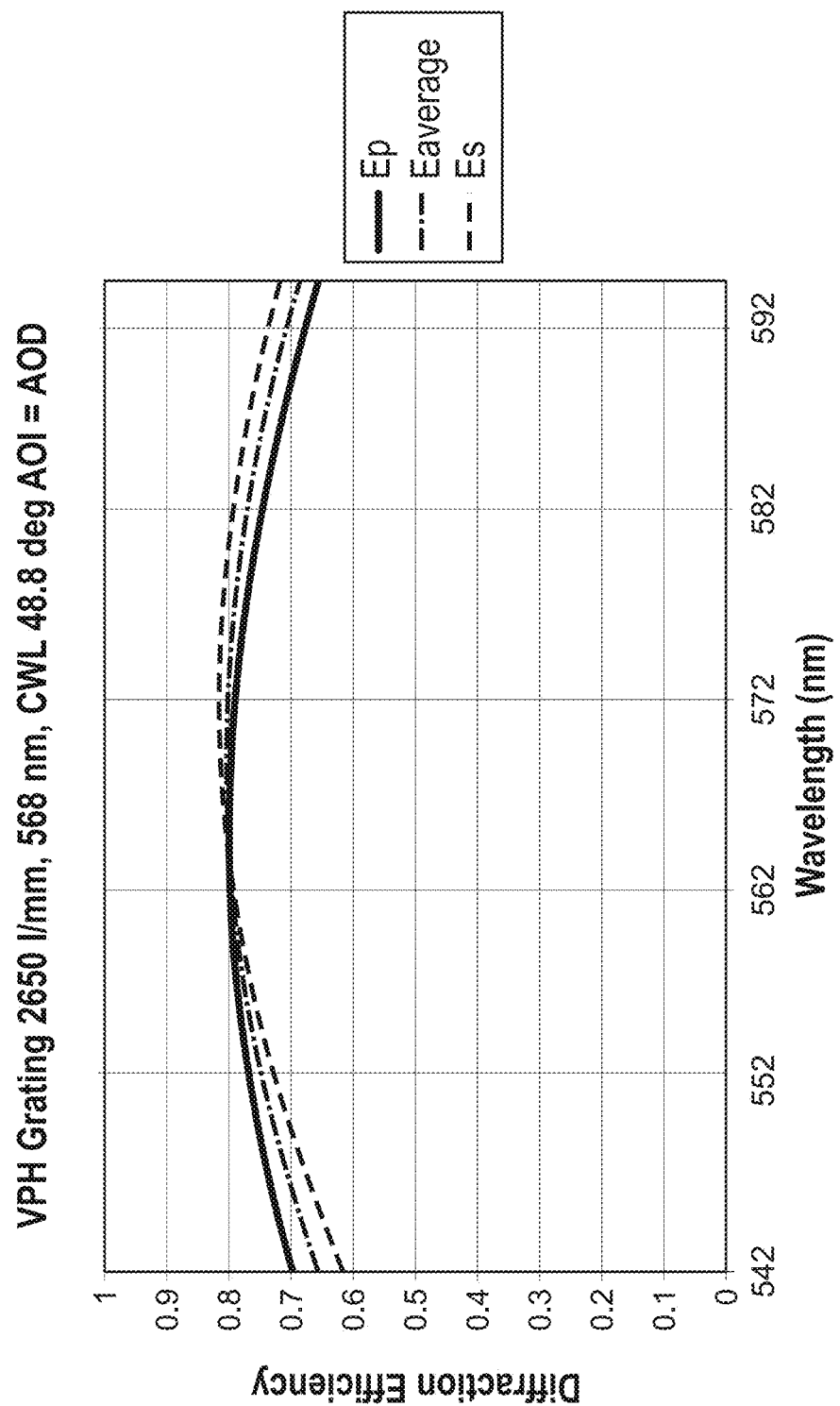
FIG. 4 is a graphical representation of the diffraction efficiency over a spectral band of an exemplary transmission grating, according to some embodiments of the present disclosure.

In some exemplary embodiments, transmission grating 126 has a peak diffraction efficiency of 60% or more, including all percentages from 60% to 100%, at a center wavelength of a preselected spectral band for the combination of vertically and horizontally polarized light. In some exemplary embodiments, transmission grating 126 has a peak diffraction efficiency of 60% or more, including all percentages from 60% to 100%, at a first wavelength of a preselected spectral band for vertically polarized light. In some exemplary embodiments, transmission grating 126 has a peak diffraction efficiency of 60% or more, including all percentages from 60% to 100%, at a second wavelength of a preselected spectral band for horizontally polarized light. In some exemplary embodiments, the first wavelength is the same as the second wavelength. In some exemplary embodiments, the first wavelength is the same as the center wavelength. In some exemplary embodiments, the second wavelength is the same as the center wavelength. In some exemplary embodiments, the first wavelength, the second wavelength, and the center wavelength are the same. In some exemplary embodiments, transmission grating 126 has a diffraction efficiency higher than 60% for most or all the wavelengths in a preselected spectral band. In some exemplary embodiments, transmission grating 126 is designed to provide a high and substantially flat dispersion of all wavelengths of a preselected spectral band, allowing for fast concurrent identification of a number of spectral features. As described herein, "flat" or "flatness" refers to the generally smooth and even performance of an optical component in a preselected spectral band, such as the diffraction efficiency of transmission grating 126 as shown in FIG. 4. In some embodiments, "substantially flat" indicates that the performance of the optical components in the preselected spectral band vary less than 30%, 20%, or 10%.

In some exemplary embodiments, the preselected spectral band is determined based on the wavelengths of the excitation light source suitable for detecting a target and/or the Raman peaks associated with the molecular structures or compositions in the target. The preselected spectral band for a certain target may be experimentally or theoretically determined before being used for detecting the presence or absence of the target in a sample. In some exemplary embodiments, when an excitation wavelength from 514 nm to 572 nm is used, such as when used to detect target bacteria, the preselected spectral band can be from 537 nm to 596 nm or a sub-spectral band at any points from 537 nm to 596 nm, or alternatively represented as a preselected spectral band from 200 $cm^{-1}$ to 2000 $cm^{-1}$ or a sub-spectral band at any points from 200 $cm^{-1}$ to 2000 $cm^{-1}$. In some exemplary embodiments, when an excitation wavelength of 405 nm is used, such as when used to detect target bacteria, virus, cells, chemicals, or tissue, the preselected spectral band can be from 408 nm to 441 nm or a sub-spectral band at any values from 408 nm to 441 nm, or alternatively represented as a preselected spectral band from 180 $cm^{-1}$ to 2016 $cm^{-1}$ or a sub-spectral band at any points from 200 $cm^{-1}$ to 2000 $cm^{-1}$. In some exemplary embodiments, when an excitation wavelength of 785 nm is used, such as when used to detect target bacteria, virus, cells, chemicals, or tissue, the preselected spectral band can be from 791 nm to 1048 nm or a sub-spectral band at any values from 791 nm to 1048 nm, or alternatively represented as a preselected spectral band from 100 $cm^{-1}$ to 3200 $cm^{-1}$ or a sub-spectral band at any points from 100 $cm^{-1}$ to 3200 $cm^{-1}$. In some exemplary embodiments, when an excitation wavelength of 1064 nm is used, such as when used to detect target bacteria, virus, cells, chemicals, or tissue, the preselected spectral band can be from 1075 nm to 1613 nm or a sub-spectral band at any values from 1075 nm to 1613 nm, or alternatively represented as a preselected spectral band from 100 $cm^{-1}$ to 3200 $cm^{-1}$ or a sub-spectral band at any points from 100 $cm^{-1}$ to 3200 $cm^{-1}$. In some exemplary embodiments, the excitation wavelength can be selected based on the characteristic Raman bands or Raman peaks of the target to be detected. In some exemplary embodiments, other excitation wavelengths that can be used to detect target bacteria, virus, cells, chemicals, or tissue include 405 nm and 514.5 nm. In some exemplary embodiments, the preselected spectral band may vary based on the excitation light source and/or the target to be detected. In some embodiments, the preselected spectral band may span a broad spectral range for detecting one or more targets. For example, the preselected spectral band may span for 50 nm or more.

In some exemplary embodiments, transmission grating 126 may include more than one sub-transmission grating, such as two or more volume phase holographic gratings, that disperse an incident light beam over more than one preselected spectral bands. For example, transmission grating 126 can be designed to disperse light in a number of preselected spectral bands, such as a plurality of spectral bands selected at any points from 100 $cm^{-1}$ to 3200 $cm^{-1}$.

In some exemplary embodiments, transmission grating 126 is designed to have high spectral resolution to improve the spectral resolution of spectrometer 120 to resolve spectral features of an incident light beam, such as optical signal 220. In some embodiments, the next step for designing the transmission grating 126 is determining the line density k based on the desired spectral resolution in the operational wavelength range and/or the desired spectral resolution at the center wavelength. Increasing the line density increases the spectral resolution of the transmission grating 126, which in turn increases the spectral resolution of spectrometer 120 to resolve spectral features of an incident light beam, such as optical signal 220. However, increasing the line density may reduce the bandwidth of the operational wavelength range of the transmission grating 126. Therefore, in some exemplary embodiments, a maximum line density is used that does not change the operational wavelength range. In some exemplary embodiments, the line density is from 380 lines/mm to 6000 lines/mm. In some exemplary embodiments, the line density is from 2500 lines/mm to 6000 lines/mm.

As used herein, high spectral resolution refers to a spectral resolution sufficient for resolving one or more characteristic features of a target in the preselected spectral band, such as Raman bands or Raman peaks. In some exemplary embodiments, transmission grating 126 disperses an incident light beam with a spectral resolution of less than 5 $cm^{-1}$ in one or more preselected spectral bands, such as a spectral resolution from 1.5 $cm^{-1}$ to 2.5 $cm^{-1}$. In some exemplary embodiments, the desired spectral resolution of spectrometer 120 and transmission grating 126 may be designed based on the spectral features of the target to be detected. In some exemplary embodiments, when the target is bacteria and excitation wavelengths from 400 nm to 532 nm are used, the spectral resolution of transmission grating 126 may be designed to be from 1.5 $cm^{-1}$ to 2.5 $cm^{-1}$ in a preselected spectral band from 537 nm to about 596 nm or from 200 $cm^{-1}$ to 2000 $cm^{-1}$. In some exemplary embodiments, when the target is bacteria and excitation wavelengths from 400 nm to 532 nm are used, the spectral resolution of transmission grating 126 may be designed to be from 1.5 $cm^{-1}$ to 2.5 $cm^{-1}$ in a sub-spectral band at any points from 537 nm to 596 nm or a sub-spectral band at any values from 200 $cm^{-1}$ to 2000 $cm^{-1}$. In some exemplary embodiments, when the target are cells or tissue and an excitation wavelength of 785 nm or 1064 nm is used, the spectral resolution of transmission grating 126 may be designed to be from 2 $cm^{-1}$ to 5 $cm^{-1}$ in a preselected spectral band from about 791 nm to 1048 nm, and/or from 1075 nm to 1613 nm.

In some exemplary embodiments, when the target is bacteria, spectrometer 120 provides a spectral resolution of 2.5 $cm^{-1}$ or less, such as a spectral resolution from 1.5 $cm^{-1}$ to 2.2 $cm^{-1}$ in a preselected spectral band from 200 $cm^{-1}$ to 2000 $cm^{-1}$ or a sub-spectral band at any values from 200 $cm^{-1}$ to 2000 $cm^{-1}$. In some exemplary embodiments, transmission grating 126 is a volume phase holographic grating that provides both high spectral resolution and high diffraction efficiency for both vertically and horizontally polarized light in a preselected spectral band. In some exemplary embodiments, the volume phase holographic (VPH) grating is formed in a layer of transmissive material, such as dichromated gelatin, and is sealed between two layers of optically transparent glass or fused silica. Various design factors affect the diffraction efficiency, polarization sensitivity, and bandwidth of the volume phase holographic grating. These factors include the Bragg angle, the average refractive index, the refractive index differential, and the thickness of the transmissive material.

In some exemplary embodiments, the volume phase holographic grating is designed to have a thickness from 0.5 mm to 10 mm. In some exemplary embodiments, the layer of the transmissive material of the volume phase holographic grating is designed to have a thickness from 0.1 µm to 0.1 mm. In the layer of the transmissive material, the refractive index is modulated, forming a periodic structure in the transmissive material, which can be referred to as fringes. In some exemplary embodiments, the refractive index of the volume phase holographic grating is from 1 to 2.42. The periodic structure or fringes can be interferometrically produced with a predetermined line density or spatial frequency. In some exemplary embodiments, increasing the line density or spatial frequency of the periodic structure increases the spectral resolution of the volume phase holographic grating. In some exemplary embodiments, the line density or spatial frequency of the periodic structure may be designed to be from 380 lines/mm to 6000 lines/mm. In some exemplary embodiments, the line density or spatial frequency of the periodic structure may be designed to be from 2500 to 6000 lines/mm.

FIG. 4 is a graphical representation of the diffraction efficiency of an exemplary volume phase holographic grating (VPH Grating) over a preselected spectral band. The spatial frequency of the exemplary volume phase holographic grating is about 2650 l/mm and the angle of incidence for first order diffraction for a center wavelength of 568 nm is about 48.8°. As shown in FIG. 4, the exemplary volume phase holographic grating has a diffraction efficiency higher than 80% at a center wavelength of 568 nm for first order diffraction at the angle of incidence of 48.8°. The spectrometer 120 including the exemplary volume phase holographic grating also provides a spectral resolution of at least about 2 cm$^{-1}$ in the preselected spectral band.

Figure 6:
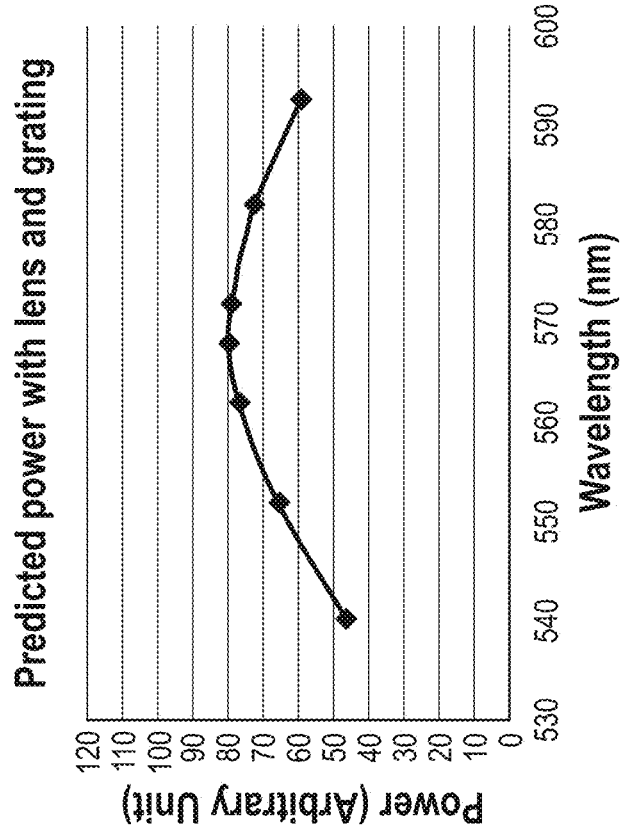
FIG. 6 is a graphical representation of theoretically predicted spectra output of an optical signal by an exemplary Raman spectrometer, according to some embodiments of the present disclosure.
Figure 5:
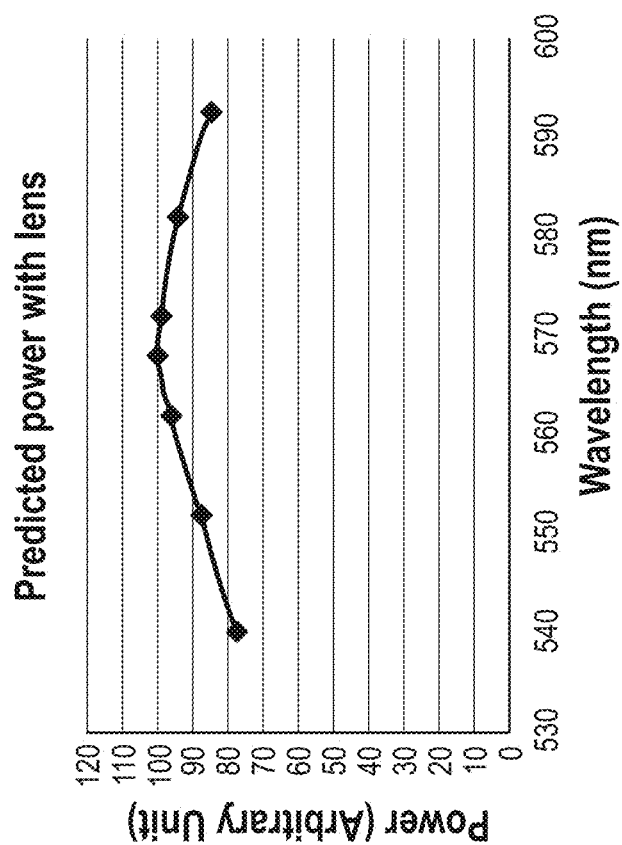
FIG. 5 is a graphical representation of theoretically predicted spectra output of an optical signal by an exemplary Raman spectrometer, according to some embodiments of the present disclosure.

As shown in FIG. 4, the exemplary volume phase holographic grating offers both a high and flat diffraction efficiency curve for both vertically polarized light (E$_s$) and horizontally polarized light (E$_p$) over a broad spectral band that spans over 50 nm, where E$_p$ represents the average of the diffraction efficiency of both E$_s$ and E$_p$. Such high and flat diffraction efficiency improves the light throughput or sensitivity of spectrometer 120 in the preselected spectral band. This high and flat diffraction efficiency of the exemplary volume phase holographic grating is further confirmed by theoretical predictions of spectra output of spectrometer 120 as shown in FIGS. 5 and 6. FIG. 5 is a graphical representation of theoretically predicted spectra output of an optical signal by spectrometer 120 without the exemplary volume phase holographic grating. In comparison, FIG. 6 is a graphical representation of theoretically predicted spectra output of the same optical signal by spectrometer 120 with the exemplary volume phase holographic grating. As illustrated in FIGS. 5 and 6, the addition of the exemplary volume phase holographic grating reduced the power of predicted spectra output by less than 40% across the preselected spectral band, showing that the diffraction efficiency of the exemplary volume phase holographic grating is higher than 60%, where the diffraction efficiency of the exemplary volume phase holographic grating can be calculated as the ratio of the power of predicted spectra output of the spectrometer with the exemplary volume phase holographic grating to the power of predicted spectra output of the spectrometer without the exemplary volume phase holographic grating. At the center wavelength, in one embodiment, the diffraction efficiency of the exemplary volume phase holographic grating is 80%.

In some exemplary embodiments, other suitable dispersive elements may be used in place of the transmission grating 126, such as a dispersive prism, a staircase reflective element as described in US 2015/0029504 A1, or a step-style reflective element as described in US 2015/0085284 A1.

In some exemplary embodiments, a consideration for designing spectrometer 120 is selecting a suitable detector 130, which provides a spectral profile of intensity over wavelengths or wavenumbers of the dispersed optical signal 230, such as a Raman spectrum. The detector 130 may be a detector array having an array of pixels, such as a CCD, a CMOS, a GaAs detector array, or an array of micro photo multiplier tubes. The detector 130 may be selected to obtain the desired sensitivity and/or spectral resolution. In some exemplary embodiments, detector 130 having high quantum efficiency is used to improve the sensitivity of spectrometer 120. Examples of such detectors include a cryogenically cooled CCD and a deep cooled back thinned CCD. In some exemplary embodiments, detector 130 may be selected based on the design parameters of other components of spectrometer 120 to obtain the desired spectral resolution and sensitivity, such as the size of entrance aperture 122, the magnification of entrance aperture 122 by collimating element 124 and focusing element 128, and the dispersion of optical signal 230 by transmission grating 126. In some exemplary embodiments, a detector 130 having smaller pixel sizes may be used to increase the spectral resolution of spectrometer 120. In some exemplary embodiments, the size of detector 130 is selected such that the image of entrance aperture 122 extends across the image area of detector 130 along a dimension. In some exemplary embodiments, detector 130 has 2048 by 70 pixels, the size of each pixel being 14 µm×14 µm, resulting in an image area of 28.7 mm by 0.98 mm. In some exemplary embodiments, detector 130 has 2048 pixels by 248 pixels, the size of each pixel being from 8 µm×8 µm to 16 µm×16 µm.

In some exemplary embodiments, detector 130 may be selected such that the operational wavelength range of the dispersed spectrum detected by the detector 130 spreads across the image area of the detector 130. Reciprocal linear dispersion (RLD) defines the extent to which a spectral interval is physically spread out across a focal field in a spectrometer, e.g., the image area of the detector 130, and is represented as nm/mm. For example, when the operational wavelength range of the transmission rating 126 includes a preselected spectral band from 540.17 nm to 592.63 nm and the detector 130 has an image area of 28.7 mm by 0.98 mm, the reciprocal linear dispersion of spectrometer 120 can be about 1.83 nm/mm.

In some exemplary embodiments, the reciprocal linear dispersion of spectrometer 120 and the size of the pixels of detector 130 can affect the spectral resolution of spectrometer 120. For example, when spectrometer 120 has a reciprocal linear dispersion of about 1.84 and the size of each pixel is 14 µm×14 µm, at Nyquist sampling (sampling the dispersed spectrum by 2 pixels per Full Width at Half Maximum (FWHM) of the spectrometer), the spectral resolution of the spectrometer 120 can be determined to be 2×14 µm×1.84 nm/mm, which is about 0.052 nm or 1.63 cm$^{-1}$. As described herein, other factors of the components of spectrometer 120 can also affect the spectral resolution, such as the size of entrance aperture 122.

In some exemplary embodiments, a consideration for designing spectrometer 120 is selecting the size of entrance aperture 122, such as an entrance slit, which can affect the spectral resolution of the spectrometer 120. The spectral resolution of a spectrometer is equal to the bandpass (BP) of the spectrometer at Nyquist sampling. BP is defined as the FWHM spectral response of a spectrometer to incident monochromatic light. The total or net bandpass is a result of the natural line width of the spectrum of the incident monochromatic light source used to measure the FWHM, the limiting instrumental line profile that includes system aberrations and diffraction effects, and the influence of the entrance slit. Assuming a gaussian line profile, FWHM can be approximated by the following generalized bandpass equation:

$$\text{FWHM} = BP_{net} = \sqrt{BP_{nat}^2 + BP_{slit}^2 + BP_{res}^2}$$

where $BP_{net}$ is the net bandpass, $BP_{nat}$ is the natural spectral bandwidth of the emitting source, $BP_{slit}$ is the bandpass determined by the reciprocal linear dispersion and the width of the image of the entrance slit on detector 130 formed by collimating element 124 and focusing element 128, and $BP_{res}$ is the limiting resolution of the instrument (the ultimate bandpass with a line emission source). In some exemplary embodiments, the bandpass is dominated by the bandpass determined by the slit width, $BP_{slit}$, which can be calculated according to $$BP_{slit}(\text{nm}) = W_{slit\,image} \cdot RLD = \frac{W_{slit}(\text{mm})10^6(\text{nm/mm})\cos(\alpha)}{nk(\text{lines/mm})L_a(\text{mm})},$$

where RLD is the reciprocal linear dispersion and $W_{slit\,image}$ is the width of the image of the entrance slit on detector 130 generated by collimating element 124 and focusing element 128. RLD defines the extent to which a spectral interval is physically spread out across a focal field in a spectrometer.

The width of the image of the slit, $W_{slit\ image}$, is the product of the magnification of the image of entrance aperture 122 and the physical width of the entrance slit. The magnification of the image of entrance slit is a function of the ratio of the focal length of the focusing element 124 to the focal length of the collimating element 124. The product of the image of the entrance slit width and the reciprocal linear dispersion, $W_{slit\ image}$·RLD, is a function of the physical width of the entrance slit ($W_{slit}$) the diffraction order (n), the angle of incidence ($\alpha$), the line density of the grating (k) represented as line/mm, and the focal length of the collimating element 124 ($L_a$). The following provides an example for calculating $BP_{slit}$: when an entrance slit has a physical width of 25 μm, the angle of incidence is 48.816°, the line density is 2650 lines/mm, and the focal length, $L_a$, is 135 mm, $BP_{slit}$ for the first order diffraction is calculated to be 0.046 nm. Thus, with $BP_{slit}$ as the dominating term, the FWHM or the spectral resolution of spectrometer 120 can be approximated as 0.046 nm or alternatively represented as 1.43 cm$^{-1}$ at a wavelength of 568 nm when the excitation wavelength is 532.02 nm. Because the spectral resolution can be improved with the narrowing of the width of the image of the entrance slit on detector 130, in some exemplary embodiments, a narrower image of the entrance slit on the detector 130 is desired.

In some exemplary embodiments, a consideration for designing spectrometer 120 is selecting the magnification of spectrometer 120. As described above, the width of entrance aperture 122 can also affect the light throughput of spectrometer 120 by limiting the etendue of the spectrometer. As the width of the entrance aperture 122 increases, more light is received through the entrance aperture 122. More light is desirable in certain embodiments. On the other hand, as described above, in some embodiments, a narrower image of entrance aperture 122 on the detector 130 is desired to obtain a better spectral resolution. Therefore, the size of entrance aperture 122 can be increased to increase the light throughput of spectrometer 120 or decreased to increase the spectral resolution of spectrometer 120. In some exemplary embodiments, the size of entrance aperture 122 is based on the designed spectral resolution and bandwidth of transmission grating 126, the magnification of entrance aperture 122 in spectrometer 120, and the pixel size of detector 130. In some exemplary embodiments, the magnification of spectrometer 120 is selected to be 1 or close to 1 such that the width of the image of the entrance aperture 122 equals the physical width of the entrance aperture 122. To achieve a magnification of 1, in certain exemplary embodiments, the focal length of focusing element 128 is designed to be the same as the focal length of collimating element 124. In some exemplary embodiments, entrance aperture 122 may be a pinhole having a diameter from 10 μm to 25 μm. In some exemplary embodiments, entrance aperture 122 may be a slit having a width from 5 μm to 25 μm.

In some exemplary embodiments, focusing element 128 is identical to collimating element 124. In some exemplary embodiments, the focal length of focusing element 128 is equal to the path length of spectrometer 120. In some exemplary embodiments, focusing element 128 and collimating element 124 have the same f-number. In other exemplary embodiments, focusing element 128 and collimating element 124 have different f-numbers. In some exemplary embodiments, focusing element 128 has an f-number from F/4 to F/1.2, where F is the focal length of focusing element 128. In some exemplary embodiments, focusing element 128 has an f-number of F/4 or F/2. In some exemplary embodiments, focusing element 128 is a multi-element diffraction limited lens having a substantially flat response across a preselected spectral band. As described herein, "response" of focusing element 128 refers to the optical transfer function of focusing element 128.

In certain exemplary embodiments, configuring the optical components of spectrometer 120 individually and as a whole to provide high spectral resolution, high light throughput, and short path length in one or more preselected spectral bands involve adjusting different factors based on the practical limitations, applications, and/or test results. For example, if the width of the entrance slit selected for a desired spectral resolution is very narrow such that it only allows a very limited amount of light to enter the spectrometer 120, it can affect sensitivity of spectrometer 120 in detecting low intensity optical signals, such as Raman signals. In such instances, the width of the entrance slit may be adjusted to be wider and the other factors may be adjusted to achieve the desired spectral resolution, such as selecting a wider detector 130 and/or choosing a grating with a higher line density. In some exemplary embodiments, the spectral resolution of spectrometer 120 is less than 5 cm$^{-1}$ in one or more preselected spectral bands, such as a spectral resolution from 1.5 cm$^{-1}$ to 2.5 cm$^{-1}$, a spectral resolution from 1.69 cm$^{-1}$ to 2.08 cm$^{-1}$, or a spectral resolution from 1.85 cm$^{-1}$ to 2.16 cm$^{-1}$.

One or more parameters can be used to characterize the performance of spectrometer 120. The desired performance of spectrometer 120 may vary for different applications. In biomedical applications, it typically is desired to have a compact spectroscopic system or a compact spectrometer with high spectral resolution, high light throughput, and short interrogation time. Advantageously, in some exemplary embodiments, such compact spectroscopic system or spectrometer may be set up on a standard laboratory shelf or used in resource-limited settings.

In some exemplary embodiments, the performance ratio is used to evaluate the performance of spectrometer 120 in the preselected spectral band. In some exemplary embodiments, the lens-grating-lens configuration of spectrometer 120 and the combined use of collimating element 124, transmission grating 126, and focusing element 128 increase both the spectral resolution and transfer efficiency of spectrometer. Thus, the designs and configurations of these components in some exemplary embodiments improve the performance of spectrometer 120 and increase the performance ratio of spectrometer 120. In some exemplary embodiments, the performance ratio of spectrometer 120 is from 3%·cm$^{-1}$ to 12.3%·cm$^{-1}$. For example, when the focal length of focusing element 128 is 135 mm and the transfer efficiency of spectrometer 120 is 60%, the performance ratio of the spectrometer 120 is approximately 4.4%·cm$^{-1}$.

Additionally or alternatively, in some exemplary embodiments, the performance product is used to evaluate the performance of spectrometer 120 in the preselected spectral band. In some exemplary embodiments, the lens-grating-lens configuration of spectrometer 120 and the combined use of collimating element 124, transmission grating 126, and focusing element 128 improves performance of spectrometer 120 and reduces the performance product of spectrometer 120. In some exemplary embodiments, the performance product of spectrometer 120 is from 0.8 to 100. In some exemplary embodiments, the performance product is from 12 to 50. For example, when the focal length of focusing element 128 is 135 mm and the spectral resolution of spectrometer 120 is 2 cm$^{-1}$, the performance product of the spectrometer 120 is approximately 27.

In some exemplary embodiments, the length of interrogation time for obtaining an optical signal is used to evaluate the performance of spectrometer 120 in the preselected spectral band. Due to the inherent low intensity of Raman signals, in typical Raman spectrometers, long periods of interrogation time are needed to increase the signal to noise (S/N) ratio of the measured Raman spectra to obtain information from the measured Raman spectra. The interrogation time of typical Raman spectrometers can be from 20 minutes to 60 minutes. However, the long periods of interrogation time can in turn degrade the optical signal because the sample, such as a sample containing biological materials, may change during a period of interrogation time. For example, cells in a sample may replicate, pathogens in a sample may undergo growth phase changes (a bacteria colony can change over periods greater than 10 minutes to 30 minutes), and biofilm may be formed in a sample containing bacteria. Such change of the sample during the interrogation time can affect the quality of the optical signal collected from the sample. In some exemplary embodiments, the high light throughput or high efficiency of spectrometer 120 allows obtaining Raman spectra having a high sensitivity, such as a high signal to noise ratio, in a short period of interrogation time. In some exemplary embodiments, the period of interrogation time of spectrometer is from 30 seconds to 10 minutes. Such short period of interrogation time mitigate the changes in the sample that confounds the determination of the presence or absence of a target. In some exemplary embodiments, successive short periods of interrogation time allows monitoring or tracking the changes within the sample over time, such as growth phase changes of a bacteria colony.

Interrogation Apparatus

To receive an optical signal from a sample, such as a Raman signal, the user of the instrument, such as a laboratory technician, typically needs to perform manual focusing to search for target in the sample and focus the excitation light onto the target. Such manual focusing is often not consistent and can result in inaccurate collection of the optical signal and inaccurate analysis results. To improve the reliability of manual focusing, burdensome highly technical training of the laboratory technician is often required. For example, some Raman microscopes that are used to detect bacteria require a highly trained investigator with considerable skills to focus on the bacteria. To address this problem, in some exemplary embodiments, as shown in FIG. 3, Raman spectroscopic system 100 includes an interrogation apparatus 300. Interrogation apparatus 300 is designed to collect or concentrate the sample to be interrogated at a focal point of the illumination and signal receiving optics to reduce the technical complexity for focusing on the sample, thereby improving the accuracy and reliability of the collected optical signal. Additionally, in some exemplary embodiments, interrogation apparatus 300 is designed to increase the amount of signal that can be received from the same sample to reduce the interrogation time and improve the sensitivity of Raman spectroscopic system 100. In some exemplary embodiments, interrogation apparatus 300 may further allow Raman spectroscopic system 100 to meet the requirements of the Clinical Laboratory Improvement Amendments of 1988.

Figure 7:
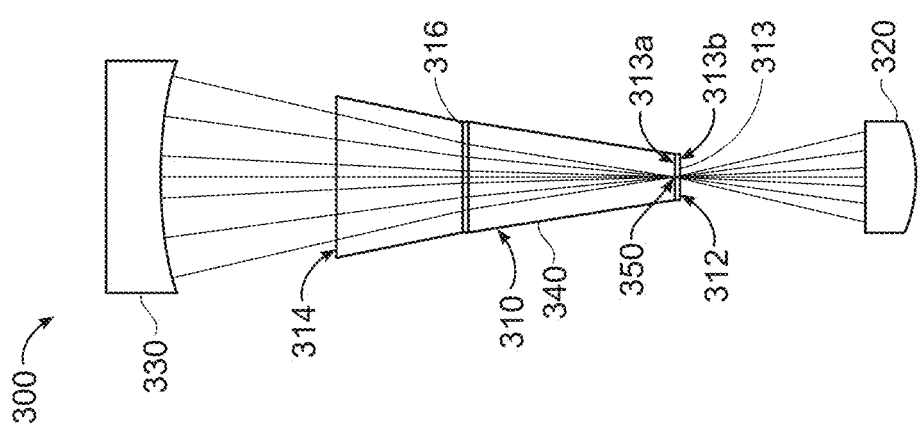
FIG. 7 is a schematic representation of an exemplary interrogation apparatus, according to some embodiments of the present disclosure.

FIG. 7 is a schematic representation of an exemplary interrogation apparatus 300, according to some embodiments of the present disclosure. In some exemplary embodiments, as shown in FIGS. 3 and 7, interrogation apparatus 300 includes a cuvette 310 that can contain a sample to be interrogated. In some exemplary embodiments, interrogation apparatus 300 includes one or more optical elements for focusing an incoming excitation beam to a focal point in cuvette 310. For example, as shown in FIG. 3, interrogation apparatus 300 may include a lens 320 that focuses excitation light beam 210 to a focal point 350 on or above a bottom end of cuvette 310. Lens 320 further receives and collimates optical signal 220 from focal point 350 as described below with reference to FIG. 8. In some exemplary embodiments as shown in FIG. 3, at least one optical element 324 is used to direct optical signal 220 to the detection system. For example, optical element 324 can be a mirror that reflects and directs the collimated optical signal 220 to the detection system.

Figure 8:
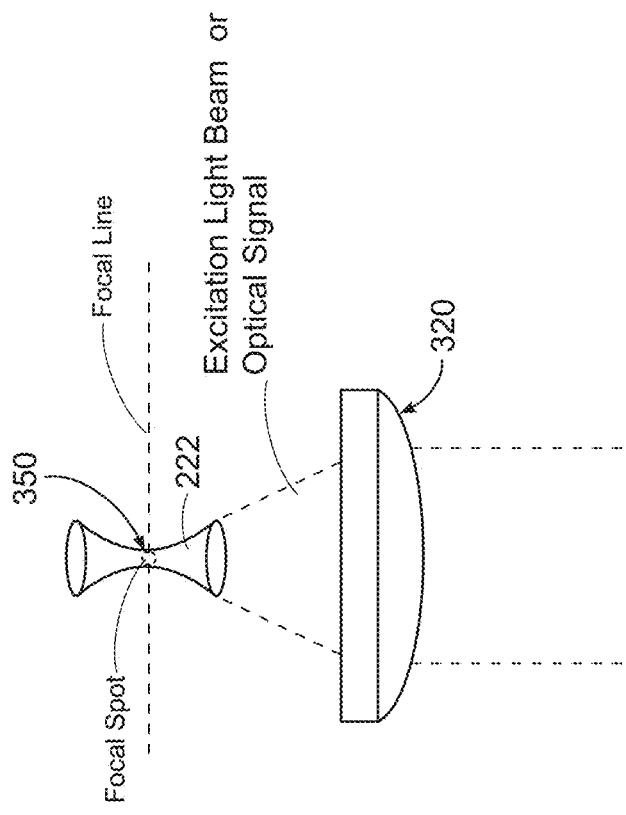
FIG. 8 is a graphical illustration of an example of focusing an excitation light beam to, or receiving an optical signal from, a focal point, according to some embodiments of the present disclosure.

As described herein, "a focal point" refers to the focus of an optical element, such as a lens or a concave mirror. In some exemplary embodiments, the focus of an optical beam can be a focal spot when the optical beam is focused by an optical element, such as a spherical lens, that focuses incoming light into a spot. In such exemplary embodiments, focal point 350 overlaps with the focal spot of the optical beam, such as excitation light beam 210. FIG. 8 is a graphical illustration of an example of focusing an excitation light beam to, or receiving an optical signal from, a focal point of an exemplary interrogation apparatus 300, according to some embodiments of the present disclosure. As shown in FIG. 8, when an excitation light beam is focused to focal point 350 of lens 320, a focal spot (shown as dotted circle in FIG. 8) of the excitation light beam overlaps with focal point 350. Further, as shown in FIG. 8, receiving an optical signal from focal point 350 refers to receiving the optical signal from a measurement volume 222 at and surrounding focal point 350. In some exemplary embodiments, the focus of an optical beam can be a focal line when the optical beam is focused by an optical element, such as a cylindrical lens, that focuses incoming light into a line. In such exemplary embodiments, focal point 350 overlaps with the focal line (shown as broken line in FIG. 8) of the optical beam.

Compared to typical cuvettes for containing samples for spectroscopic measurements, cuvette 310 of interrogation apparatus 300 reduces the technical complexity for performing focusing on the sample and increases the amount of optical signal 220 that can be received from the same sample. For example, typical cuvettes used in spectroscopic measurements are small tube-like containers having straight walls. When interrogating a sample, the excitation light beam is focused through a straight wall onto the sample in a solution form or diluted in a solution. In contrast, in some exemplary embodiments, cuvette 310 of interrogation apparatus 300 is designed to concentrate or collect the sample to be interrogated to focal point 350 of cuvette 310. As described herein, concentrating or collecting the sample to be interrogated to focal point 350 refers to concentrating or collecting the sample at and/or around focal point 350.

Advantageously, in some exemplary embodiments, concentrating or collecting the sample to be interrogated to the focal point 350 allows the system to automatically focus on the sample to be interrogated when cuvette 310 is placed at a known place with a fixed focal point in the system, which does not require a highly trained investigator or technician to perform. Moreover, compared to receiving an optical signal from a sample or a sample contained in a typical cuvette, cuvette 310 is designed to concentrate the sample to be interrogated to the focal point 350 such that greater amount of optical signal 220 can be received during the same period of interrogation time, improving the sensitivity of the system. In certain exemplary embodiments, concentrating or collecting the sample to be interrogated to focal point 350 also may allow a shorter period of interrogation time to be used and/or increases the quality of the obtained optical signal 220 for further spectral analysis. Further, in some situations, excitation light beam 210 focused to focal point 350 can attract certain targets, such as pathogens, to focal point 350, such as *Escherichia coli*, which can further concentrate such targets to focal point 350. Features and configurations of cuvette 310 are further described in detail below with reference to FIGS. 7-19E.

In some exemplary embodiments, as shown in FIG. 7, cuvette 310 includes a chamber having a top end 314, a bottom end 312, and at least one tapered wall 340. Bottom end 312 is narrower than top end 314. Tapered wall 340 has a tilt angle relative to a centerline perpendicular to the bottom end 312. In some exemplary embodiments, bottom end 312 of cuvette 310 includes an optical window 313. In some exemplary embodiments, optical window 313 is made of an optically transparent material that has low Raman emission at the excitation wavelengths. In some exemplary embodiments, optical window 313 may be made of any of the following exemplary materials: fused silica, glass, sapphire, and quartz. Optical window 313 has an interior surface 313a and an exterior surface 313b. As shown in FIG. 7, in some exemplary embodiments, focal point 350 is on or above interior surface 313a. In some embodiments, the focal point is above interior surface 313a by a distance from 100 µm to 5 mm. In some embodiments, interior surface 313a includes a functionalized surface to attract and/or retain a sample to be interrogated. In some exemplary embodiments, the functionalized surface is a layer of material covering the interior surface 313a or a central region of the interior surface 313a. In some exemplary embodiments, the functionalized surface is formed by modifying the interior surface 313a. In some exemplary embodiments, focal point 350 is designed to be on or above the functionalized surface.

Certain exemplary functionalized surfaces may have physical, chemical, or biological characteristics suitable to attract or retain the sample to be interrogated. In some exemplary embodiments, the functionalized surface can be hydrophobic to attract the sample to be interrogated, such as proteins, through Van der Waals attraction. In some exemplary embodiments, the functionalized surface can be hydrophilic to attract the target through dipole-dipole interactions. In some exemplary embodiments, the functionalized surface can include biomolecules or chemicals that bind to the target. In some exemplary embodiments, the functionalized surface may include antibodies that bind to target pathogens, cells, or biomolecules. In some exemplary embodiments, the functionalized surface may include protein G. In some exemplary embodiments, the functionalized surface may include functionalized bacteria specific phages. In some exemplary embodiments, the functionalized surface is prepared with Oseltamivir, a synthetic derivative prodrug of ethyl ester with antiviral activity, or Zanamivir for attracting and retaining viruses, such as influenza viruses. The chemical structure of Oseltamivir is illustrated below.

In some exemplary embodiments, when cuvette 310 receives a sample to be interrogated, tapered wall 340 of cuvette 310 allows the sample to be interrogated, subject to the effect of gravity, to first settle onto the tapered wall 340 and move down along the tapered wall 340 towards the bottom end 312 of cuvette 310. Compared to straight walls of typical cuvettes, such guided settlement of the sample to be interrogated allows the sample to be interrogated to settle in a higher concentration at a narrow region at the bottom end 312, such as a central region on the interior surface 313a of optical window 313. As described herein, "central region" refers to an area at and surrounding a center region of the interior surface 313a that overlaps or is close to focal point 350. Such concentrating of the sample to be interrogated to the focal point 350, in some exemplary embodiments, allows a greater amount of the optical signal 220 to be received from the same sample during the interrogation time compared to typical cuvettes. In some exemplary embodiments, the tilt angle of the tapered wall 340 may be influenced by the sample to be interrogated. In some exemplary embodiments, the tilt angle is from 9 degrees to 19 degrees. In some exemplary embodiments, a settling period allows the cuvette 310 to concentrate the sample to be interrogated to focal point 350 before receiving an optical signal 220. In some exemplary embodiments, the settling period may depend on the type of the sample to be interrogated, the density of the sample to be interrogated, and the tilt angle of tapered wall 340. In some exemplary embodiments, when the sample to be interrogated includes bacteria, a settling period from 5 seconds to 5 minutes may be used before receiving the signal. In some exemplary embodiments, when the sample to be interrogated includes chemicals, a settling period from 10 milliseconds to 5 minutes may be used before receiving the signal.

Figure 9A:
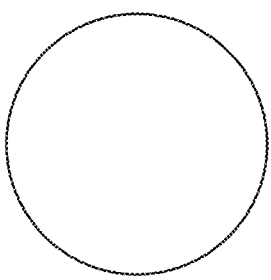
FIG. 9A is a top view of an exemplary chamber of an exemplary cuvette that can contain a sample, according to some embodiments of the present disclosure.
Figure 9B:
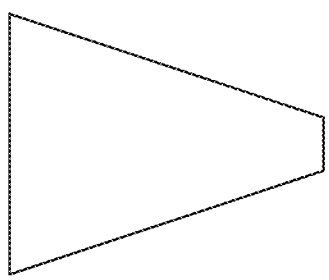
FIG. 9B is a side view of the exemplary chamber of FIG. 9A.
Figure 9C:
FIG. 9C is a bottom view of the exemplary chamber of FIG. 9A.
Figure 10A:
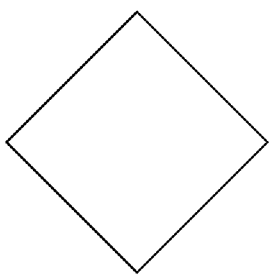
FIG. 10A is a top view of an exemplary chamber of an exemplary cuvette that can contain a sample, according to some embodiments of the present disclosure.
Figure 10B:
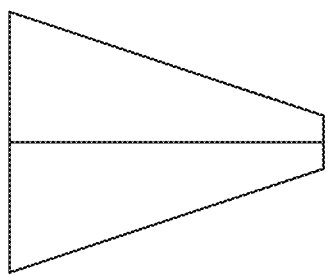
FIG. 10B is a side view of the exemplary chamber of FIG. 10A.
Figure 10C:
FIG. 10C is a bottom view of the exemplary chamber of FIG. 10A.
Figure 11A:
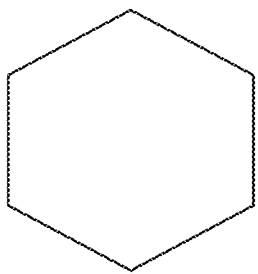
FIG. 11A is a top view of another exemplary chamber of an exemplary cuvette that can contain a sample, according to some embodiments of the present disclosure.
Figure 11B:
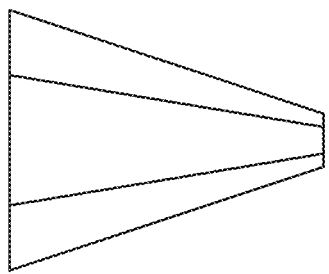
FIG. 11B is a side view of the exemplary chamber of FIG. 11A.
Figure 11C:
FIG. 11C is a bottom view of the exemplary chamber of FIG. 11A.

The chamber of cuvette 310 may have various shapes. FIG. 9A is a top view of an exemplary chamber of cuvette 310. FIG. 9B is a side view and FIG. 9C is a bottom view of the exemplary chamber of FIG. 9A. FIG. 10A is a top view of another exemplary chamber of cuvette 310. FIG. 10B is a side view and FIG. 10C is a bottom view of the exemplary chamber of FIG. 10A. FIG. 11A is a top view of another exemplary chamber of cuvette 310. FIG. 11B is a side view and FIG. 11C is a bottom view of the exemplary chamber of FIG. 11A. In some exemplary embodiments, as shown in FIGS. 9A-9C, the chamber of cuvette 310 has a shape of a truncated cone. In some exemplary embodiments, the chamber of cuvette 310 has a shape of a truncated pyramid having a plurality of tapered walls 340, such as three, four, six, eight, and ten tapered walls 340. As a non-limiting example, as shown in FIGS. 10A-10C, the chamber of cuvette 310 has a shape of a truncated pyramid having four tapered walls 340. As another non-limiting example, as shown in FIGS. 11A-11C, the chamber of cuvette 310 has a shape of a truncated pyramid having six tapered walls 340. In other exemplary embodiments, the chamber of cuvette 310 has a shape of a truncated pyramid having a number of tapered walls 340 from 3 to 10.

In some exemplary embodiments, the shape of the chamber of cuvette 310 and number of tapered walls 340 can be configured based on the sample to be interrogated. In some exemplary embodiments, it is beneficial to detect optical signal 220 from a homogenized layer of the sample to be interrogated where the sample to be interrogated is evenly or substantially evenly distributed. In some exemplary embodiments, this is achieved with a cuvette 310 having a chamber with four tapered walls 340. After being received in cuvette 310 with four tapered walls 340, the sample to be interrogated can settle towards bottom end 312 and form a homogenized layer across interior surface 313a of optical window 313 or across a central region of interior surface 313a. In some exemplary embodiments, the homogenized layer is a monolayer. In some exemplary embodiments, it is beneficial to detect optical signal 220 from an accumulated mass of the sample to be interrogated. Therefore, in some exemplary embodiments, cuvette 310 has a chamber with a shape of a truncated cone that allows the sample to be interrogated to concentrate to a central region of interior surface 313a, forming an accumulated mass. In other some exemplary embodiments, cuvette 310 has a chamber with six tapered walls 340. After being received in cuvette 310 with six tapered walls 340, in some exemplary embodiments, the sample to be interrogated can settle towards interior surface 313a and concentrate to a central region of interior surface 313a, forming an accumulated mass of the sample to be interrogated. In other exemplary embodiments, after being received in cuvette 310 with six tapered walls 340, the sample to be interrogated can settle towards interior surface 313a and concentrate to a central region of interior surface 313a, forming an accumulated mass of the sample to be interrogated at the central region and a homogenized layer around the central region.

In some exemplary embodiments, the shape of the chamber of cuvette 310 and number of tapered walls 340 can be configured based on the geometry of the excitation beam 210. In some exemplary embodiments, when the excitation beam 210 is focused to a line-shaped beam, the shape of the chamber of cuvette 310 and number of tapered walls 340 can be configured such that a homogenized layer of the sample to be interrogated is formed across interior surface 313a of optical window 313 to which the excitation beam 210 is focused. This configuration can result in a larger exposure area of the sample to be interrogated. In some exemplary embodiments the configuration may be used, for certain motile or heterogeneous samples where it may be desirable to interrogate a larger area across the interior surface 313a. A motile sample may include targets that are mobile, such as *Escherichia coli*. A heterogenous sample may have different concentrations of the targets distributed in the sample, such as a bacterial biofilm or a non-uniform chemical. In some exemplary embodiments, when the excitation beam 210 is a spot focused beam, the shape of the chamber of cuvette 310 and number of tapered walls 340 can be configured such that the sample to be interrogated is concentrated to a central region of interior surface 313a. In some exemplary embodiments, such a configuration can be used to increase the amount of optical signal 220 received from the sample to be interrogated when the concentration of the sample to be interrogated is low.

Tapered walls 340 of cuvette 310 may be made of various suitable materials. For example, the tapered walls 340 of cuvette 310 may be made of glass, Teflon, fluorocarbon-based materials, or a polymer, such as polystyrene (PS) or polymethyl methacrylate (PMMA). In some exemplary embodiments, the interior surface of tapered wall 340 is modified to have a suitable physical, chemical, or biological characteristic to facilitate concentrating the sample to be interrogated to a focal point 350.

Figure 12:
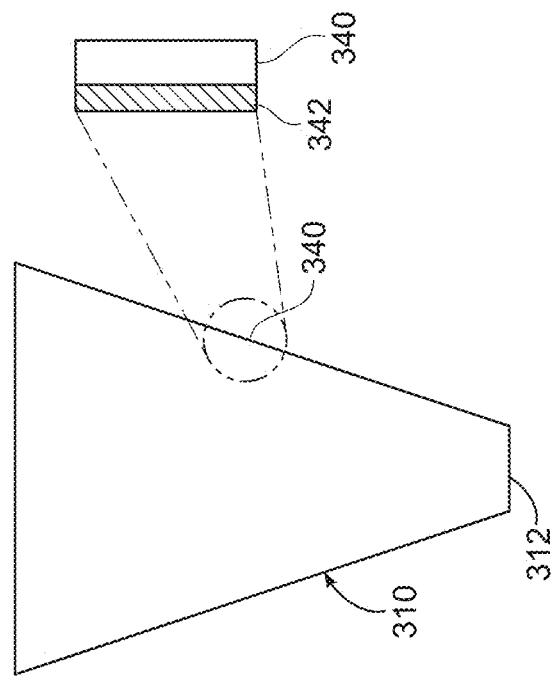
FIG. 12 illustrates an exemplary interior surface of a tapered wall of an exemplary cuvette that can contain a sample, according to some embodiments of the present disclosure.

FIG. 12 illustrates an exemplary interior surface 342 of a tapered wall 340, according to some embodiments of the present disclosure. As shown in FIG. 12, in some exemplary embodiments, interior surface 342 of a tapered wall 340 includes a smooth hydrophobic coating, such as a hydrophobic fluorine terminated polymer coating. Exemplary hydrophobic coatings include glass, sapphire, fused silica, lacquers, hydrophobic self-assembled monolayers, fluorocarbons, acrylics, vinyls, olefins, carbonates, and amides. In some exemplary embodiments, the interior hydrophobic coating may inhibit the sample to be interrogated from adhering to tapered wall 340 and facilitates movement of the sample to be interrogated to the bottom end 312.

Figure 13:
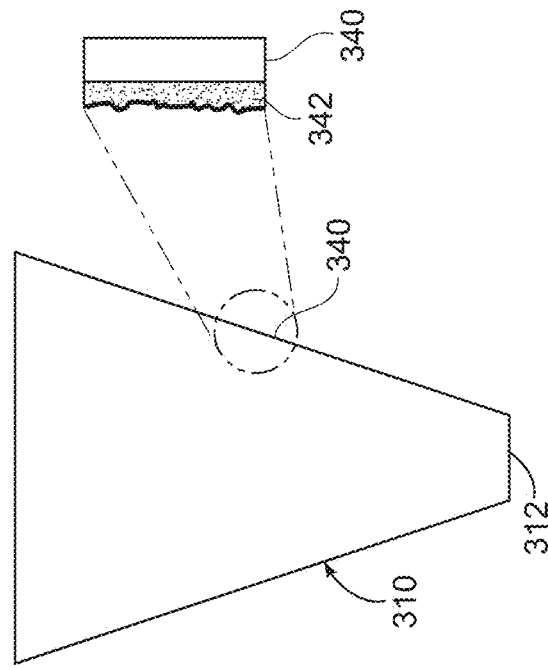
FIG. 13 illustrates an exemplary interior surface of a tapered wall of an exemplary cuvette that can contain a sample, according to some embodiments of the present disclosure.

FIG. 13 illustrates another exemplary interior surface 342 of tapered wall 340, according to some embodiments of the present disclosure. As shown in FIG. 13, in some exemplary embodiments, interior surface 342 of tapered wall 340 includes a micro textured hydrophilic coating that is wetted when immersed in liquid. In some exemplary embodiments, the micro textured hydrophilic coating is a hydrophilic-terminated polymer coating, such as poly(N-isoproplacrylamide) (PNIPAM), polyacrylamide (PAM), polyethylenimine, poly (acrylic acid), poly(vinyl alcohol), copolymers, and polyethers, a metal-terminated polymer coating, or a self-assembled monolayer. Such hydrophilic coating can have a slip stream effect that impedes the sample to be interrogated from adhering to the tapered wall 340 and thus facilitates movement of the sample to be interrogated to the bottom end 312. In some such exemplary embodiments, the tilt angle can be increased up to 80 degrees. In some exemplary embodiments, an interior surface or an exterior surface of the tapered wall 340 is coated with a metallic material that reflects optical signal 220 off the tapered wall 340 back into cuvette 310 and/or keeps ambient light from entering cuvette 310. In some exemplary embodiments, the metallic coating of the tapered wall 340 reduces Raman emission of the material of the tapered wall 340.

To increase the amount of signal that can be received from the sample and improve the sensitivity of the spectroscopic system or reduce the interrogation time, as shown in FIGS. 3 and 7, in some exemplary embodiments, interrogation apparatus 300 includes a focusing back reflector 330. In some exemplary embodiments, focusing back reflector 330 is a concave mirror, such as a spherical or parabolic mirror. Focusing back reflector 330 is placed above bottom end 312 of cuvette 310 at a distance such that focal point 350 overlaps the focus of focusing back reflector 330. In this way, a portion of the excitation light beam 210 that is not absorbed by the sample to be interrogated at focal point 350 can be reflected and focused back to focal point 350 by focusing back reflector 330. Additionally, the portion of optical signal 220 that is emitted towards focusing back reflector 330 can also be reflected and focused back to focal point 350. Both of the reflected portions of the excitation light beam 210 and optical signal 220 can be absorbed by the sample to be interrogated at focal point 350 to generate more optical signal 220, creating a resonance effect. Advantageously, such resonance effect of optical signal 220 enhances optical signal 220 by increasing the overall amount of optical signal 220 that can be received from the same sample during the same period of interrogation time. This in turn improves the sensitivity of Raman spectroscopic system 100.

In some exemplary embodiments, when optical signal 220 is a Raman signal emitted by a sample to be interrogated concentrated to focal point 350, excitation light beam 210 not absorbed by the sample to be interrogated is reflected and focused back to focal point 350 to cause more Raman emission from the sample to be interrogated, resulting in an enhanced optical signal 220 to be directed to spectrometer 120. Also, the portion of the Raman signal emitted towards focusing back reflector 330, having the same energy as required to cause Raman emission, is reflected and focused back to focal point 350 to cause more Raman emission of the sample to be interrogated, resulting in a further enhanced optical signal 220. In some exemplary embodiments, such enhancement of optical signal 220 can increase the amount of optical signal 220 from two to twenty orders of magnitude.

Figure 14:
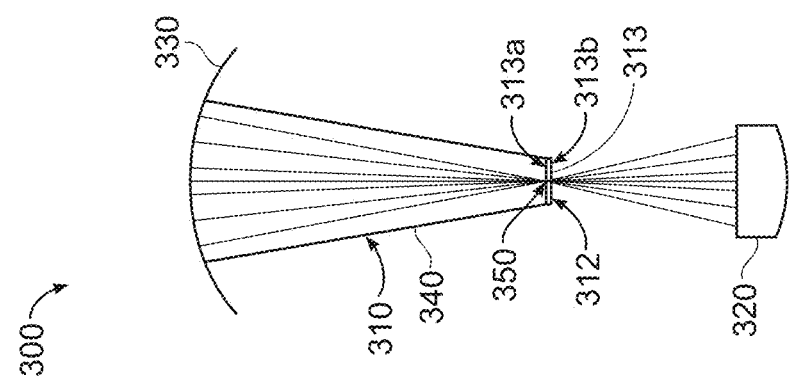
FIG. 14 is a schematic representation of another exemplary cuvette for containing a sample, according to embodiments of the present disclosure.

In some exemplary embodiments, focusing back reflector 330 is part of a cover of cuvette 310. As shown in FIG. 14, after cuvette 310 is filled with a sample or a solution containing the sample, focusing back reflector 330 covers and seals cuvette 310. In some exemplary embodiments, focusing back reflector 330 is formed by metalizing an interior side of a curved cover of cuvette 310.

Figure 15:
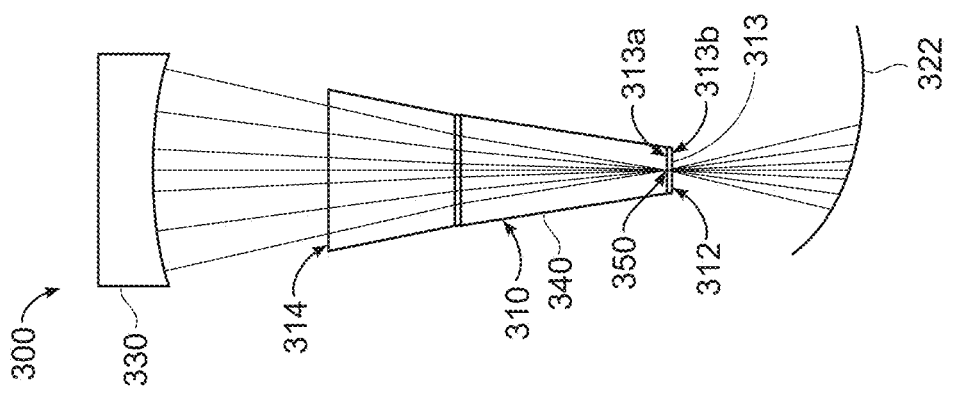
FIG. 15 is a schematic representation of another exemplary interrogation apparatus, according to some embodiments of the present disclosure.

In some exemplary embodiments, as shown in FIG. 15, a concave mirror 322 is used to focus excitation light beam 210 to focal point 350 and receive optical signal 220 from focal point 350. In some exemplary embodiments, concave mirror 322 collimates and directs optical signal 220 to the detection system. For example, concave mirror 322 can be a spherical mirror or a parabolic mirror.

In some exemplary embodiments, to increase the amount of optical signal 220 that can be received from a sample, the interior surface 313a of the bottom end 312 of the cuvette 310 includes a plurality of nanostructures to enhance optical signal 220 emitted from a sample being interrogated through surface-enhanced Raman scattering (SERS). In some exemplary embodiments, the nanostructures are metal nanoparticles or metal nanodots, such as gold, silver, or platinum nanoparticles. In some exemplary embodiments, the nanostructures are arranged in an array. In some exemplary embodiments, the nanostructures may increase optical signal 220 by several orders of magnitude, allowing Raman spectroscopic system 100 to detect low levels of targets, such as low concentrations of pathogens or biomarkers. In some exemplary embodiments, the sample being interrogated may also be retained to the interior surface 313a by being attracted to or binding to the nanostructures.

Figure 16:
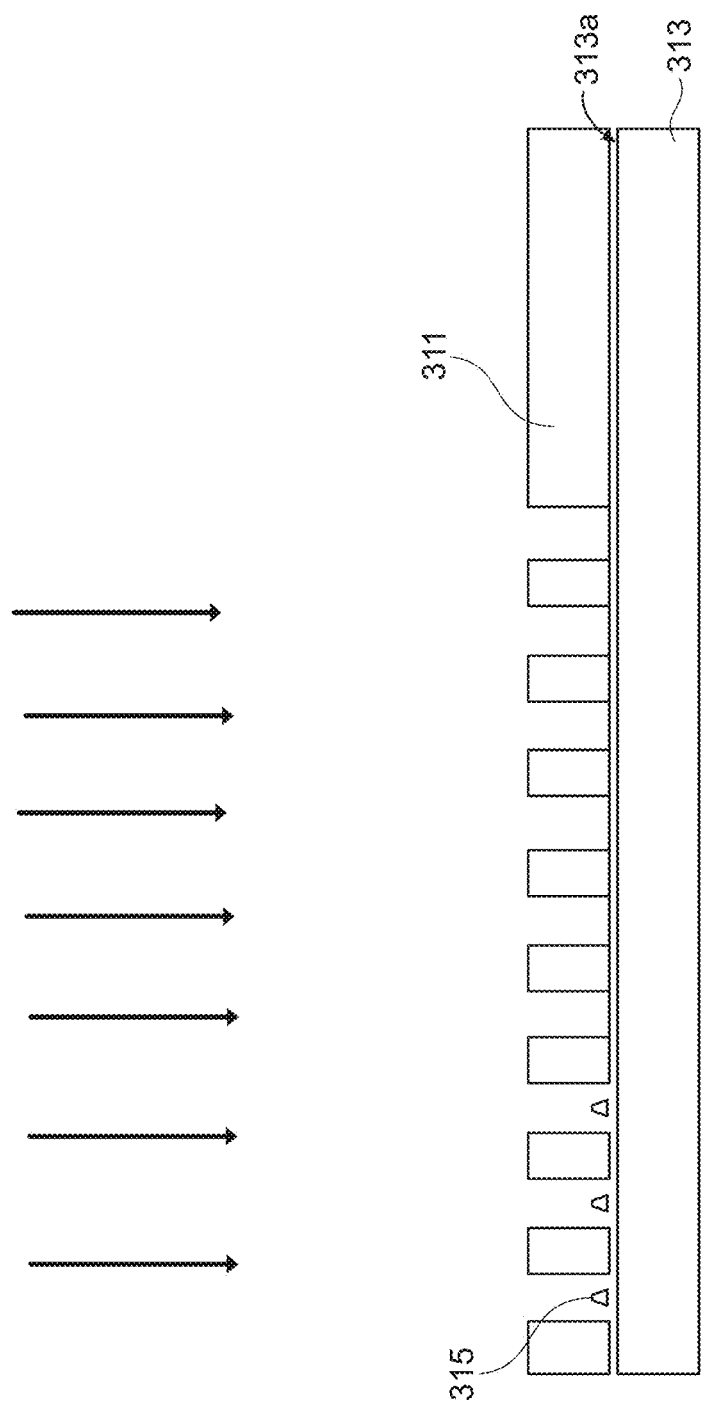
FIG. 16 illustrates an exemplary preparation of a functionalized surface of an exemplary cuvette that can contain a sample, according to some embodiments of the present disclosure.

FIG. 16 illustrates exemplary preparation of nanoparticles on the surface of an exemplary cuvette 310 that can contain a sample, according to some embodiments of the present disclosure. As shown in FIG. 16, a photoresist layer 311 is used to pattern open columns on interior surface 313a of optical window 313 at a high aspect ratio. The high aspect ratio of the open columns creates a lensing effect that create regular repeatable patterns. Then, gold, silver, or platinum nanoparticles are sputter deposited onto interior surface 313a of optical window 313 through the openings or channels of photoresist layer 311 during a short deposition time. After the deposition, photoresist layer 311 is removed, leaving an array of nanoparticles 315 that can enhance optical signal 220 through SERS. In some exemplary embodiments, the length or diameter of the nanoparticles is less than 100 nm. In exemplary embodiments, a fill factor of the nanoparticles on interior surface 313a is between 50% and 90%.

Figure 17A:
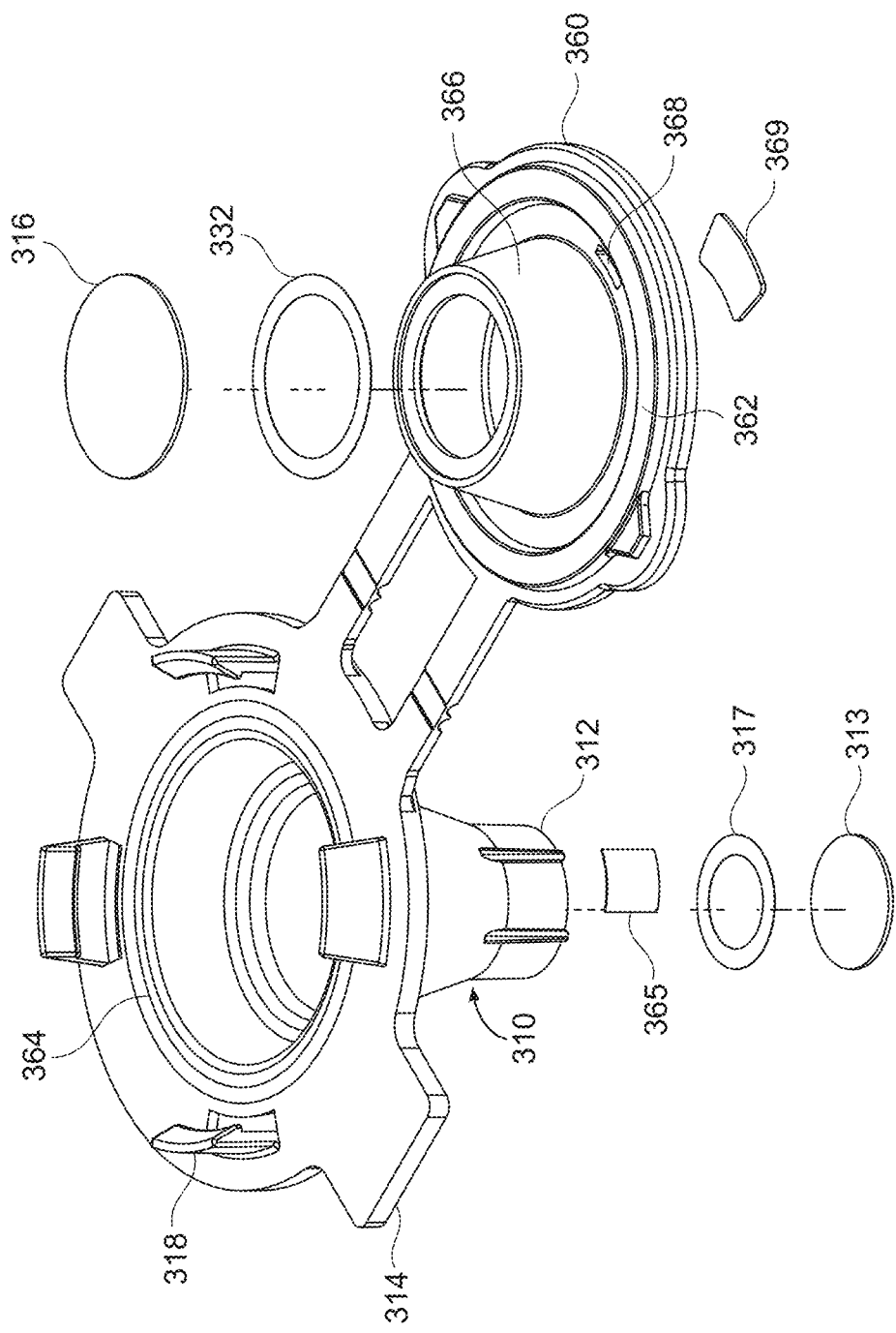
FIG. 17A is an exploded perspective view of an exemplary cuvette, according to some embodiments of the present disclosure.
Figure 17B:
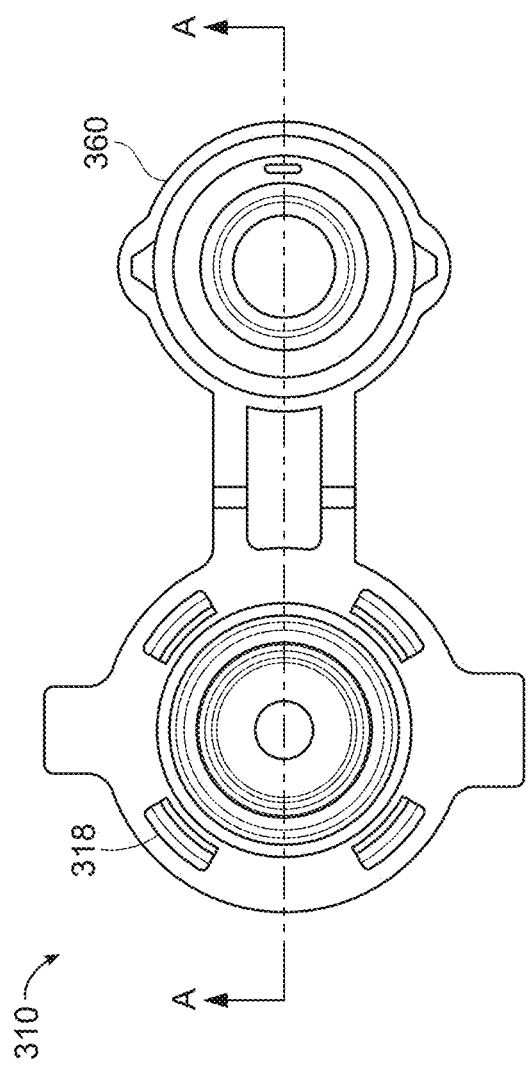
FIG. 17B is a top view of the exemplary cuvette of FIG. 17A, according to some embodiments of the present disclosure.
Figure 17D:
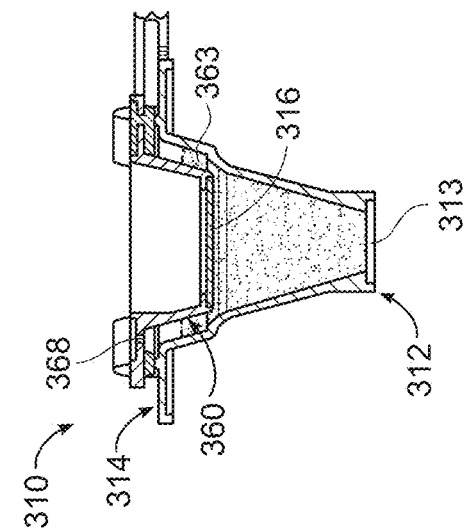
FIG. 17D is a cross-sectional view of the exemplary cuvette of FIG. 17A, according to some embodiments of the present disclosure.
Figure 17C:
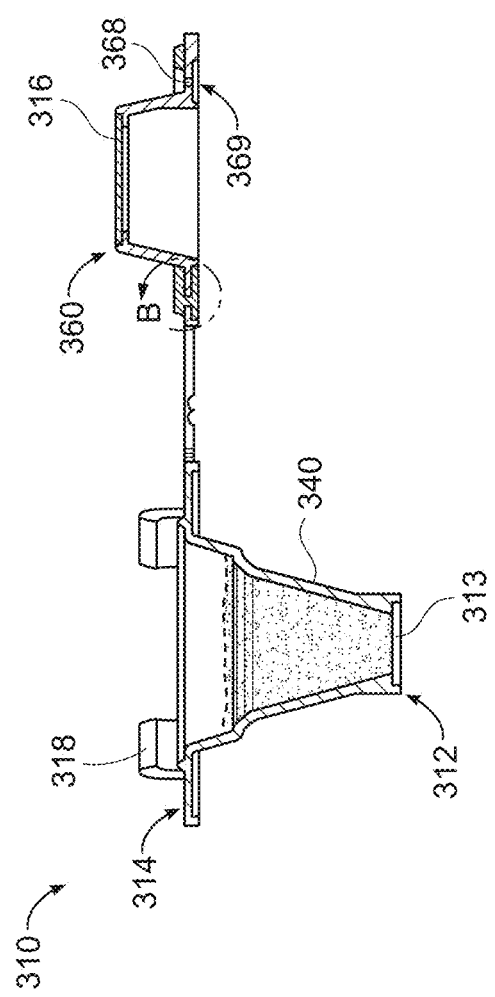
FIG. 17C is a cross-sectional view of the exemplary cuvette of FIG. 17A, according to some embodiments of the present disclosure.

Typically, a sample to be interrogated is a solution or mixed in a solution before being interrogated. When the solution is received in cuvette 310, air bubbles in the chamber of cuvette 310 can act like lenses, cause scattering and light loss, and impair the performance of the excitation and collection optics. In some exemplary embodiments, cuvette 310 may include a cover that reduces or eliminates air bubbles in the chamber of cuvette 310. In some exemplary embodiments, as shown in FIG. 17, the cover is an upper optical window 316 that pushes out air bubbles and seals the solution between upper optical window 316 and bottom end 312. In some exemplary embodiments, cuvette 310 may include a lid that seals cuvette 310 while allowing air bubbles to be pushed out of the cuvette 310. FIG. 17A is an exploded perspective view of an exemplary cuvette 310 having a lid 360, according to some embodiments of the present disclosure. FIG. 17B is top view of the exemplary cuvette 310 of FIG. 17A. FIGS. 17C and 17D are cross-sectional views of the exemplary cuvette of FIG. 17A.

As shown in FIGS. 17A-17D, in some exemplary embodiments, lid 360 includes a seal 362 that meets ridge 364 on top end 314 of cuvette 310 when lid 360 is closed onto top end 314. When lid 360 is closed, seal 362 and ridge 364 can form a liquid tight seal. In some exemplary embodiments, lid 360 of cuvette 310 has a recessed portion 366. In some exemplary embodiments, as shown in FIG. 17A, upper optical window 316 forms the bottom end of recessed portion 366. Upper optical window 316 may be attached to recessed portion 366 using an adhesive layer 332 or other suitable attachment method. As shown in FIGS. 17C and 17D, when lid 360 is closed onto top end 314, recessed portion 366 displaces some solution in a top part of the chamber of cuvette 310 to a space 363 formed between recessed portion 366 and tapered wall 340 of cuvette 310. Such displacement allows solution to be filled and surround upper optical window 316 to reduce air bubbles in the chamber of cuvette 310. Additionally, in some exemplary embodiments, to minimize air bubbles in the chamber of cuvette 310, lid 360 includes at least one air hole 368. Air hole 368 is covered with a hydrophobic membrane 369 that allows air to escape but retains liquid therein. Therefore, when cuvette 310 is filled with a solution as shown in FIG. 17D, closing lid 360 onto top end 314 of cuvette 310 causes the solution in top end 314 to be pushed into space 363 and air to be pushed out of cuvette 310 through air hole 368, thereby reducing or eliminating air bubbles between upper optical window 316 and optical window 313. In some exemplary embodiments, as shown in FIG. 17A, top end 314 of cuvette 310 includes one or more clamps 318 for locking and securing lid 360. In some exemplary embodiments, as shown in FIG. 17A, optical window 313 is attached to bottom end 312 using an adhesive layer 317 or other suitable attachment method. In some exemplary embodiments, as shown in FIG. 17A, cuvette 310 includes a bar code 365 or other suitable type of labeling for identifying the sample to be interrogated.

Figure 17F:
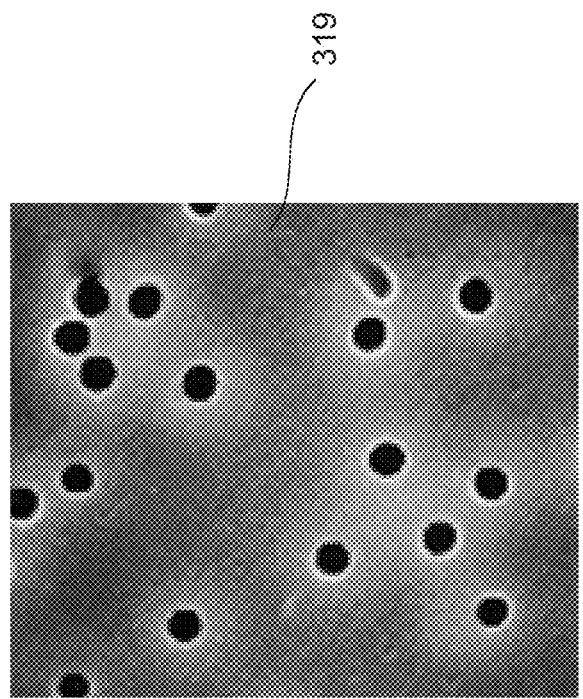
FIG. 17F is a magnified image of the exemplary filter of FIG. 17E, according to some embodiments of the present disclosure.
Figure 17G:
FIG. 17G is a perspective view of an exemplary filter for trapping a target in a sample, according to some embodiments of the present disclosure.
Figure 17E:
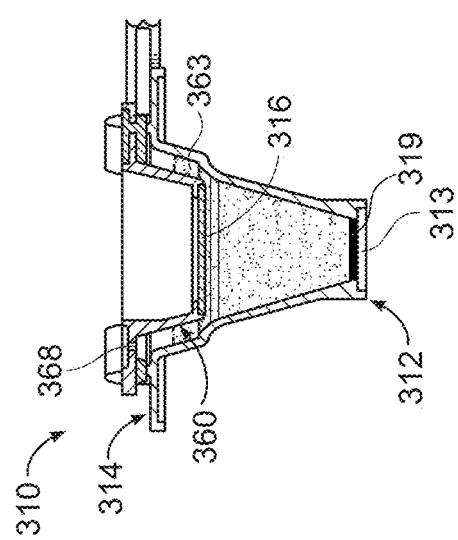
FIG. 17E is a cross-sectional view of another exemplary cuvette having an exemplary filter, according to some embodiments of the present disclosure.

In some exemplary embodiments, the target in the sample to be interrogated may be highly motile, such as a motile bacterium, where it may be desirable to trap the target to the focal point 350 on or above the interior surface 313a of the cuvette 310 for interrogation. In some such exemplary embodiments, a filter is used to trap the motile bacterium. As shown in FIG. 17E, in some exemplary embodiments, at least one filter 319 that traps the target in a sample to be interrogated is included toward the bottom of the cuvette 310.

For example, Leptospirosis is an infection caused by corkscrew shaped gram negative like bacteria of the genus *Leptospira*. In humans, it can cause a wide range of symptoms, some of which may be mistaken for other diseases. Some infected persons, however, may have no symptoms at all. Without treatment, Leptospirosis can lead to kidney damage, meningitis (inflammation of the membrane around the brain and spinal cord), liver failure, respiratory distress, and even death. *Leptospira* are spiral-shaped bacteria that are 6-20 µm long and 0.1 µm in diameter with a wavelength of about 0.5 µm. One or both ends of the spirochete are usually hooked. *Leptospira* are represented in urine due to kidney infections. As such they are not considered a urinary tract infection. Rather they present themselves after being sluffed out of the kidney and in relatively low concentrations in urine. *Leptospira* are highly motile. Due to the low concentration of infection level and high motility of *Leptospira*, it may be very difficult to detect or assess free-swimming *Leptospira*. Therefore, in some exemplary embodiments, the filter 319 that traps the motile bacteria in a sample is placed toward the bottom end 312 of the cuvette 310 to concentrate the motile bacteria at the bottom end. Alternatively or additionally, in some exemplary embodiments, the filter 319 concentrates the trapped motile bacteria to the focal point 350 on or above the interior surface 313a of the cuvette 310.

In some exemplary embodiments, the filter 319 is a membrane filter. In some exemplary embodiments, the filter 319 is a polycarbonate membrane filter. In some exemplary embodiments, the filter 319 is a Nuclepore™ membrane filter. FIG. 17F is a magnified image of the exemplary filter 319 of FIG. 17E, according to some embodiments of the present disclosure. In some exemplary embodiments, the filter 319 has a diameter equal to or smaller than the diameter of the bottom end 312 of cuvette 310. In some exemplary embodiments, the filter 319 has a diameter of 8 mm. In some exemplary embodiments, the filter 319 has a plurality of holes. In some exemplary embodiments, the size of the holes of the filter 319 can be selected based on the target to be trapped. In some exemplary embodiments, the diameter of the holes of filter 319 is from 0.2 µm to 1.0 µm. In some exemplary embodiments, filter 319 is made of a metallic material. In some exemplary embodiments, a surface of the filter 319 is a metallic material or is coated with a metallic material. In some exemplary embodiments, the metallic material is or comprises one or more metal or metal alloy, such as platinum (Pt), palladium (Pd), silver (Ag), copper (Cu), Tantalum (Ta), or stainless steel. In some exemplary embodiments, the filter 319 has a platinum coating having a thickness from 250 Angstroms to 1000 Angstroms. In such instances, the platinum coating of the filter 319 may inhibit background fluorescence signal emitted from the base material of the filter 319, such as the polycarbonate substrate. In some exemplary embodiments, the platinum coating of the filter 319 may allow surface-enhanced Raman scattering effects to be induced at the edges of the holes where the radii of the platinum-coated holes are at a nanostructure level.

In some exemplary embodiments, filter 319 is used as follows: (1) aspirate 5 ml of the sample (such as urine, bacteria in water, bacteria in urine) into a 10 ml syringe; (2) place the filter 319 on the tip of the syringe and gently press the plunger of the syringe to filter the sample through the filter 319 until the barrel of the syringe is empty; (3) remove the filter 319 and aspirate 1 ml of water into the syringe; (4) place the same filter 319 back on to the tip of the syringe and gently press the plunger until the barrel is empty (this step may be repeated as needed to remove residue sample solution on the filter 319). After the procedure, the filter 319 includes the target on its surface if the target is present in the sample. In some embodiments, the filter 319 is placed face down in the cuvette 310 such that the target is trapped or concentrated to the bottom end 312 of the cuvette 310 or the focal point 350 of the cuvette 310. FIG. 17G illustrates an exemplary filter 319 with trapped exemplary bacteria on its surface to be placed face down at the bottom end of the cuvette 310, according to some embodiments of the present disclosure.

Figure 18B:
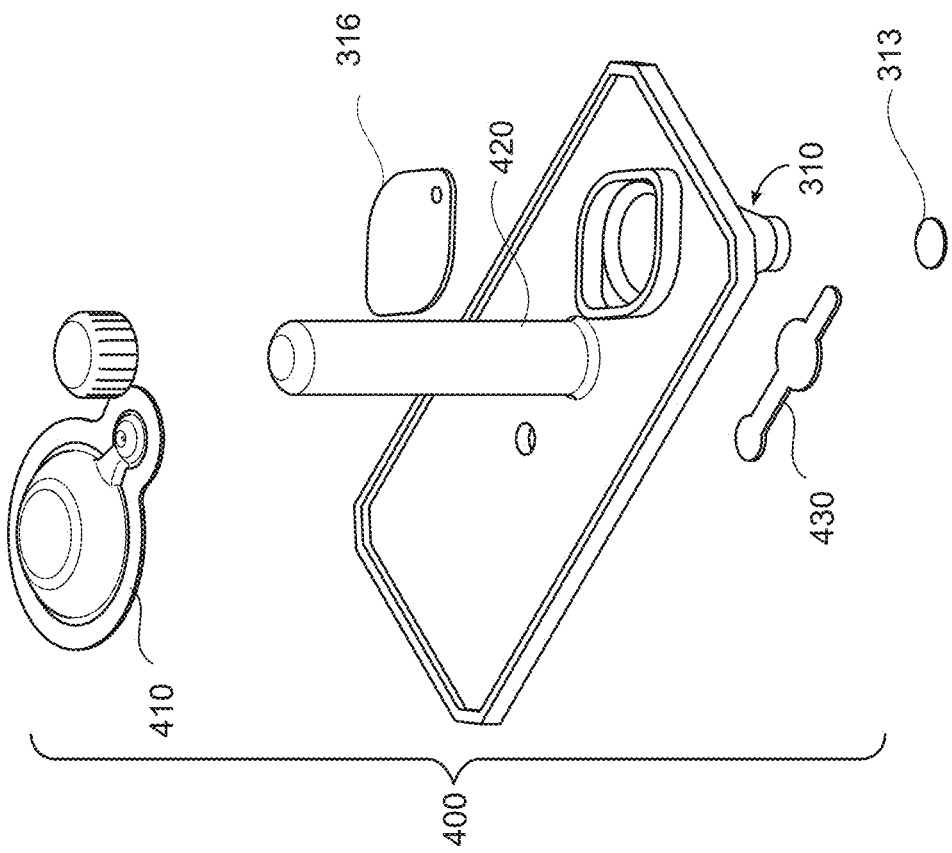
FIG. 18B is an exploded perspective view of the exemplary sample collection cartridge of FIG. 18A.
Figure 18A:
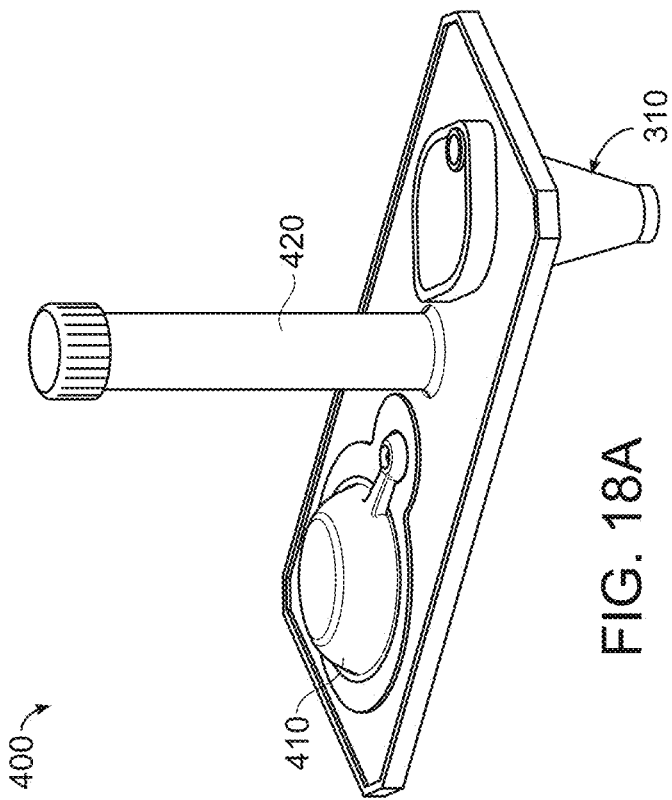
FIG. 18A is a perspective view of an exemplary sample collection cartridge, according to some embodiments of the present disclosure.

In some exemplary embodiments, as shown in FIGS. 18A-18E, cuvette 310 is part of a sample collection cartridge 400 that can receive a sample directly from a swab. FIG. 18A is a perspective view of an exemplary sample collection cartridge 400, according to some embodiments of the present disclosure. FIG. 18B is an exploded perspective view of the exemplary sample collection cartridge 400 of FIG. 18A. FIG. 18C is a top cross-sectional view of the exemplary sample collection cartridge 400 of FIG. 18A. FIG. 18D is a cross-sectional view of the exemplary sample collection cartridge 400 along the cross-section A-A as shown in FIG. 18C. FIG. 18E is a perspective view of another exemplary sample collection cartridge 400.

As shown in FIGS. 18A-18D, an exemplary sample collection cartridge 400 includes cuvette 310, a reservoir 410 that can contain a washing solution, and a chamber 420 that can receive a swab. Reservoir 410, chamber 420, and cuvette 310 are connected via channel 430. In some embodiments, the washing solution is water. When chamber 420 receives a swab 422 that has absorbed a sample, reservoir 410 can be actuated such that the wash solution in reservoir 410 can be pushed out from reservoir 410. The wash solution exits reservoir 410 through opening 412 into channel 430, passes by and flushes the absorbent material off the swab 422 such that at least a portion of the sample is washed off from the swab 422 and carried into cuvette 310 by the wash solution via channel 430. Cuvette 310 then concentrates and/or homogenizes at least a portion of the sample that has been carried into cuvette 310 to bottom end 312.

FIG. 18E is a perspective view of another exemplary sample collection cartridge 400, according to some embodiments of the present disclosure. The view in FIG. 18E shows the interior of cartridge. As shown in FIG. 18E, sample collection cartridge 400 includes cuvette 310, a reservoir 410 that can contain a washing solution, a chamber 420 that can receive a swab 422, and a channel 430 connecting reservoir 410, the absorbent material of swab 422 in chamber 420, and cuvette 310. When chamber 420 receives swab 422 that has absorbed a sample, the wash solution in reservoir 410 can be pushed out from reservoir 410 and pass by the absorbent material of swab 422 such that at least a portion of the sample is washed off from the absorbent material of swab 422 and carried into cuvette 310 by the wash solution. Cuvette 310 then concentrates and/or homogenizes at least a portion of the sample that has been carried into cuvette 310 to bottom end 312.

Advantageously, sample collection cartridge 400 allows a sample obtained directly from a source using a swab to be ready for interrogation without any manual processing. This greatly simplifies and reduces the time required for sample collection and gathering and reduces the total time for determining the presence or absence of a target in the sample.

Exemplary Applications

Figure 19:
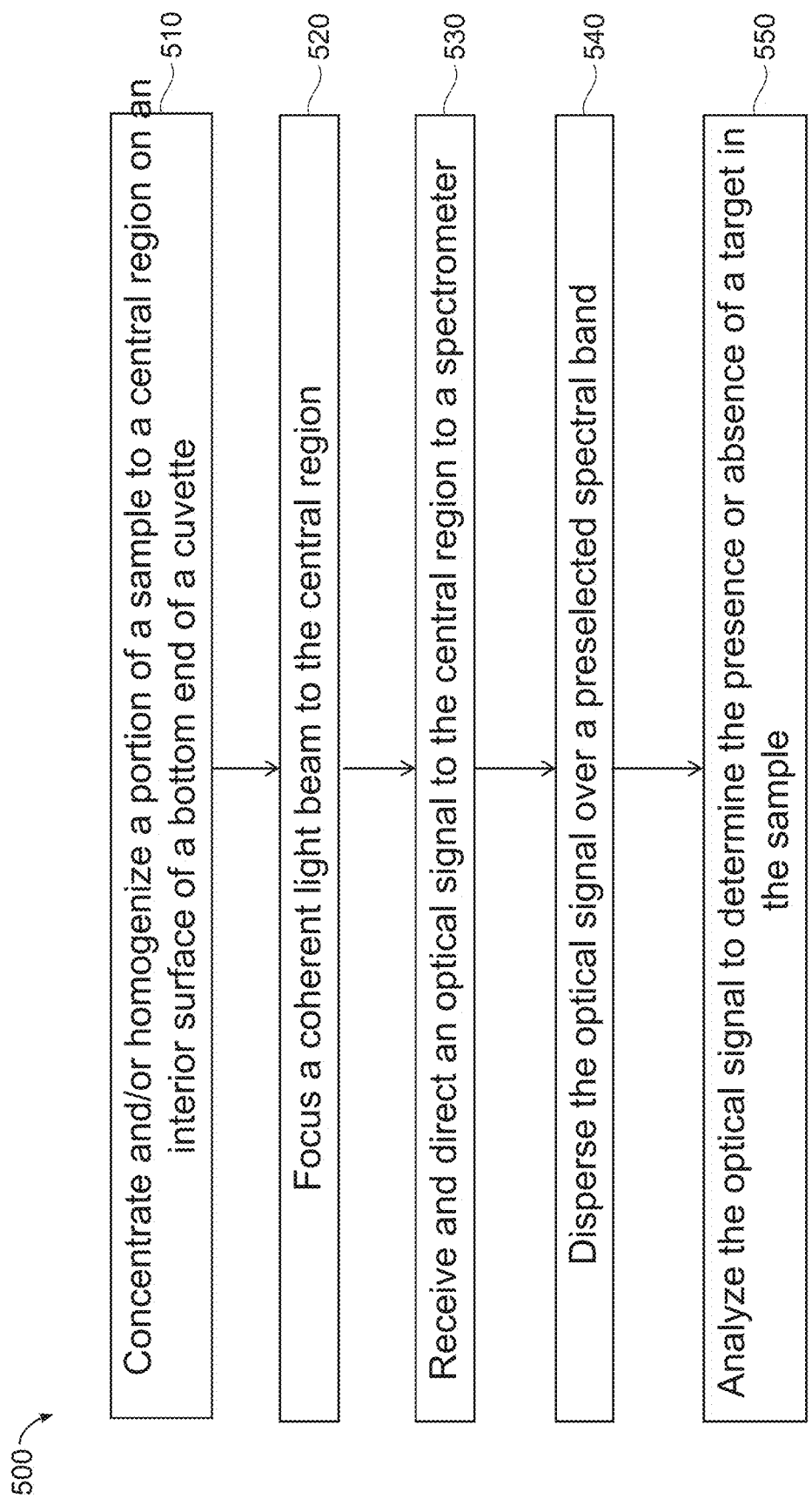
FIG. 19 is a flowchart of an exemplary method for detecting the presence or absence of a target in a sample, according to some embodiments of the present disclosure.

Spectrometer 120, interrogation apparatus 300, cuvette 310, and Raman spectroscopic system 100 as described herein may be utilized in a variety of methods for assessing or detecting the presence or absence of a target in a sample. FIG. 19 is a flowchart of an exemplary method 500 for determining the presence or absence of a target in a sample. Method 500 uses all or a selection of features of Raman spectroscopic system 100 described above in reference to FIGS. 3-18E.

In some exemplary embodiments, method 500 includes steps 510-550. At step 510, a sample is received in a cuvette and at least a portion of the sample to be interrogated is concentrated and/or homogenized to a central region on interior surface 313a of bottom end 312 of cuvette 310. At step 520, an excitation light beam is focused to the central region. In some exemplary embodiments, the excitation light beam is a coherent light beam emitted by a laser. At step 530, an optical signal is received from the sample to be interrogated and directed to a spectrometer. In some exemplary embodiments, the optical signal is a Raman signal. At step 540, the optical signal is dispersed over a preselected spectral band. At step 550, a spectrum of the optical signal obtained by the spectrometer is analyzed to detect the presence or absence of a target in the sample.

Method 500 may further include additional steps. Each of steps 510-550 of method 500 may further include additional steps or be replaced by one or more steps. In some exemplary embodiments, method 500 includes reflecting and focusing light from a bottom end of the cuvette to a focal point on or above an interior surface of the bottom end using a focusing back reflector. In some exemplary embodiments, light from the bottom end of the cuvette includes a portion of the excitation light beam that has not been absorbed by the sample to be interrogated and the optical signal from the sample to be interrogated emitted towards the focusing back reflector.

In some exemplary embodiments, at step 510, a sample is received in the cuvette and at least a portion of the sample to be interrogated is concentrated and/or homogenized to a central region on the interior surface of the bottom end of the cuvette. In some exemplary embodiments, step 510 further includes attracting or immobilizing the sample to be interrogated on the interior surface of the cuvette. In some exemplary embodiments, step 530 further includes directing the optical signal from the sample to be interrogated passing through the bottom end of the cuvette to the spectrometer. In some exemplary embodiments, step 530 includes dispersing the optical signal with a spectral resolution from 0.1 $cm^{-1}$ to 5 $cm^{-1}$ over the preselected spectral band. In some exemplary embodiments, step 530 further includes dispersing the optical signal with an average transfer efficiency from 60% to 98% for first order diffraction over the preselected spectral band.

In some exemplary embodiments, step 550 further includes analyzing one or more preselected spectral bands of the optical signal. In some exemplary embodiments, when the optical signal is a Raman signal, the preselected spectral band for assessing or detecting a certain target is experimentally or theoretically determined based on one or more predefined Raman bands or Raman peaks corresponding to the vibration or rotation of one or more functional groups of atoms or molecules in a pure sample of the target. Table 1 below lists exemplary Raman bands or Raman peaks corresponding to the vibration or rotation of exemplary functional groups of pure samples at the excitation wavelength of 532 nm. For example, if a target contains a number of functional groups, a preselected spectral band including a combination of features corresponding to the functional groups contained in the target can be selected. In certain exemplary embodiments, a method involves detecting the presence or absence of one or more features in the preselected spectral band that are indicative of the presence or absence of the target in a sample being interrogated. Because Raman spectra are complex in nature and often contain broad Raman bands or Raman peaks due to an ensemble effect with contributions arising from all the molecules present in the sample, such as contributions arising from molecular interactions and/or bonding with neighboring molecules or atoms, the preselected spectral bands can shift from the experimentally or theoretically determined spectral bands.

In some exemplary embodiments, analyzing optical signal 220 refers to analyzing the spectrum of optical signal 220 in the preselected spectral band. In some exemplary embodiments, when optical signal 220 is a Raman signal, analyzing optical signal 220 includes analyzing and/or detecting one or more features formed by one or more Raman bands or Raman peaks of the spectrum of optical signal 220. In some exemplary embodiments, analyzing one or more features of the spectrum of optical signal 220 includes comparing and determining the differences between the spectrum in one or more preselected spectral bands of optical signal 220 to a reference spectrum in the same preselected spectral bands. For example, differences of the slope, the shape, the height, the shift of location, and/or the area, of one or more Raman bands or Raman peaks between the spectrum of optical signal 220 and the reference spectrum can be identified. A selection of these identified differences can be used as a unique fingerprint for identifying the presence of a target or for distinguishing one target from another substance, material, or molecule. In some exemplary embodiments, the reference spectrum is the Raman spectrum of an optical signal 220 received from a control sample, such as water or buffer solution containing known molecules, materials, or substances, or a biological sample whose Raman bands or Raman peaks have been previously determined, such as a biological sample containing a particular protein.

Figure 20:
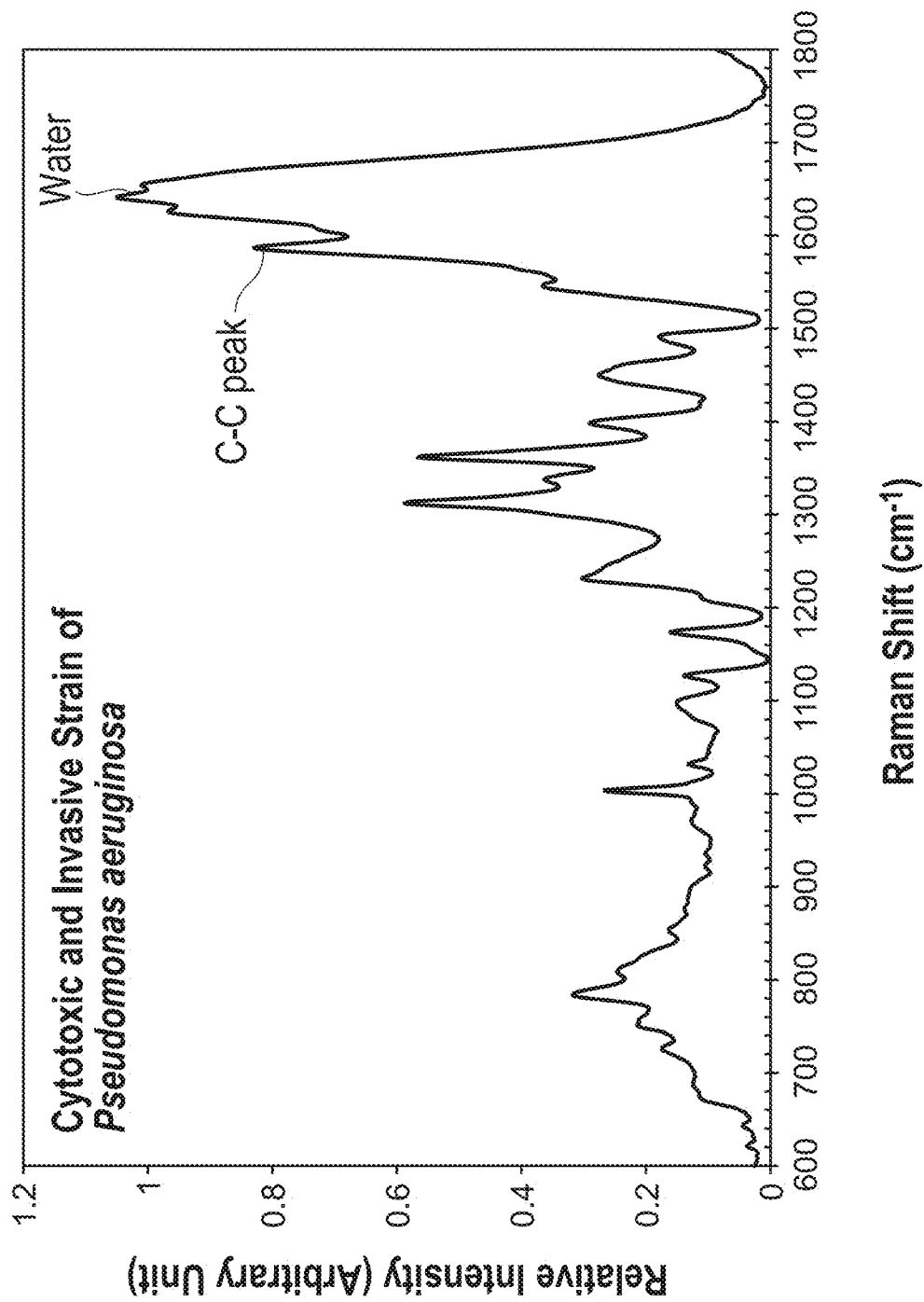
FIG. 20 illustrates an exemplary mean Raman spectrum of a cytotoxic and invasive strain of *Pseudomonas aeruginosa* in water.

In some exemplary embodiments, analyzing the spectrum of optical signal 220 in the preselected spectral band allows the quantitation of the amount of the target in the sample to be interrogated, such as determining the concentration of the target. In some exemplary embodiments, the amount of the target can be determined based on the ratio of the height of a Raman band or Raman peak to the height of a reference Raman band or Raman peak. FIG. 20 illustrates an exemplary mean Raman spectrum of a cytotoxic and invasive strain of *Pseudomonas aeruginosa* in water. As shown in FIG. 20, a Raman peak corresponding to a C—C bond in the molecular composition of *Pseudomonas aeruginosa* and a Raman peak corresponding to water are identified. The ratio between the height of the Raman peak of the C—C bond and the height of the Raman peak of water can be used to determine the concentration of *Pseudomonas aeruginosa* in the sample based on a calibration curve previously determined. In some exemplary embodiments, the amount of the target can be determined based on the ratio of the area covered by a Raman band or Raman peak to the area covered by a reference Raman band or Raman peak. The area under the Raman band or Raman peak may be determined from a Gaussian fit to the Raman band or Raman peak.

TABLE 1

Exemplary Raman bands or Raman peaks of functional groups

| Wavenumber cm$^{-1}$ | Functional Group Assignment | Location |
|---|---|---|
| 620, 640 | Amino acids (620 cm$^{-1}$ = phenylalanine, 640 cm$^{-1}$ = tyrosine) | Protein |
| 665-782 | Nucleic acids (G, A, C, T, U) | DNA/RNA |
| 788 | O—P—O sym str. | DNA |
| 810-820 | Nucleic acids (C—O—P—O—C), A-type helix | RNA |
| 829, 852 | Tyrosine (buried, exposed) | Protein |
| 877-937 | Protein [v(C—C)], carbohydrates [v(COC)], lipids | Carbohydrates, protein, lipids |
| 1003 | Phenylalanine v(C—C) ring breathing | Protein |
| 1030-1085 | Protein [v(C—N), v(C—C)], carbohydrate [v(C—O), v(C—C)], lipids | Protein, carbohydrate, lipids |
| 1090 | P—O stretch | Phospholipid |
| 1126 | Protein [(v(C—N), v(C—C)], lipids[v(C—C)], carbohydrates [v(C—C), v(COC) glycoside link] | Protein, lipids, carbohydrates |
| 1158 | Protein [v(C—C)] | Protein |
| 1175 | Aromatic amino acids, Tyrosine [δ(C—H)], | Protein |
| 1230-1295 | Amide III [v(C—N), N—H bend, C=O, O=C—N bend], 1230 cm$^{-1}$ [PO$_2^-$ asym. stretch from phospholipids] | Protein, nucleic acids, phospholipids |
| 1295, 1267 | Lipids [δ(CH$_2$)] saturated | Lipids |
| 1320-1340 | Nucleic acids (Guanine, Adenine), amino acids, proteins, carbs (1340 cm$^{-1}$) | DNA/RNA, proteins, carbohydrates |
| 1336 | Amino acids [C—H bend] | Protein |
| 1375 | Nucleic acids (T, A, G) | DNA |
| 1420-1460 | Lipids, carbohydrates, proteins [δ(C—H$_2$) scissoring for each], 1420 cm$^{-1}$ saturated and Z-unsaturated fatty acids. ~1444 cm$^{-1}$ = a(CH$_2$/CH$_3$) saturated lipids | Lipids, carbohydrates, proteins |
| 1483-1487 | Nucleic acid (G, A), CH def. | DNA |
| 1518-1550 | Amide II [N—H bend, v(C—N), v(C=C)] (only for Resonant Raman) | Protein |
| 1575-1578 | Nucleic acids (G, A), ring stretching | DNA |
| 1585 | Tryptophan, Phenylalanine | Protein |
| 1606 | Phenylalanine | Protein |
| 1617 | Tyrosine | Protein |
| 1640 | Water | |
| 1650-1680 | Amide I [v(C=O), v(C—N), N—H bend], Lipid [C=C str] unsaturated | Protein, Lipids |
| 1735 | >C=O ester str. | Phospholipids |
| 1745-1754 | C=O | Lipids |

Figure 21:
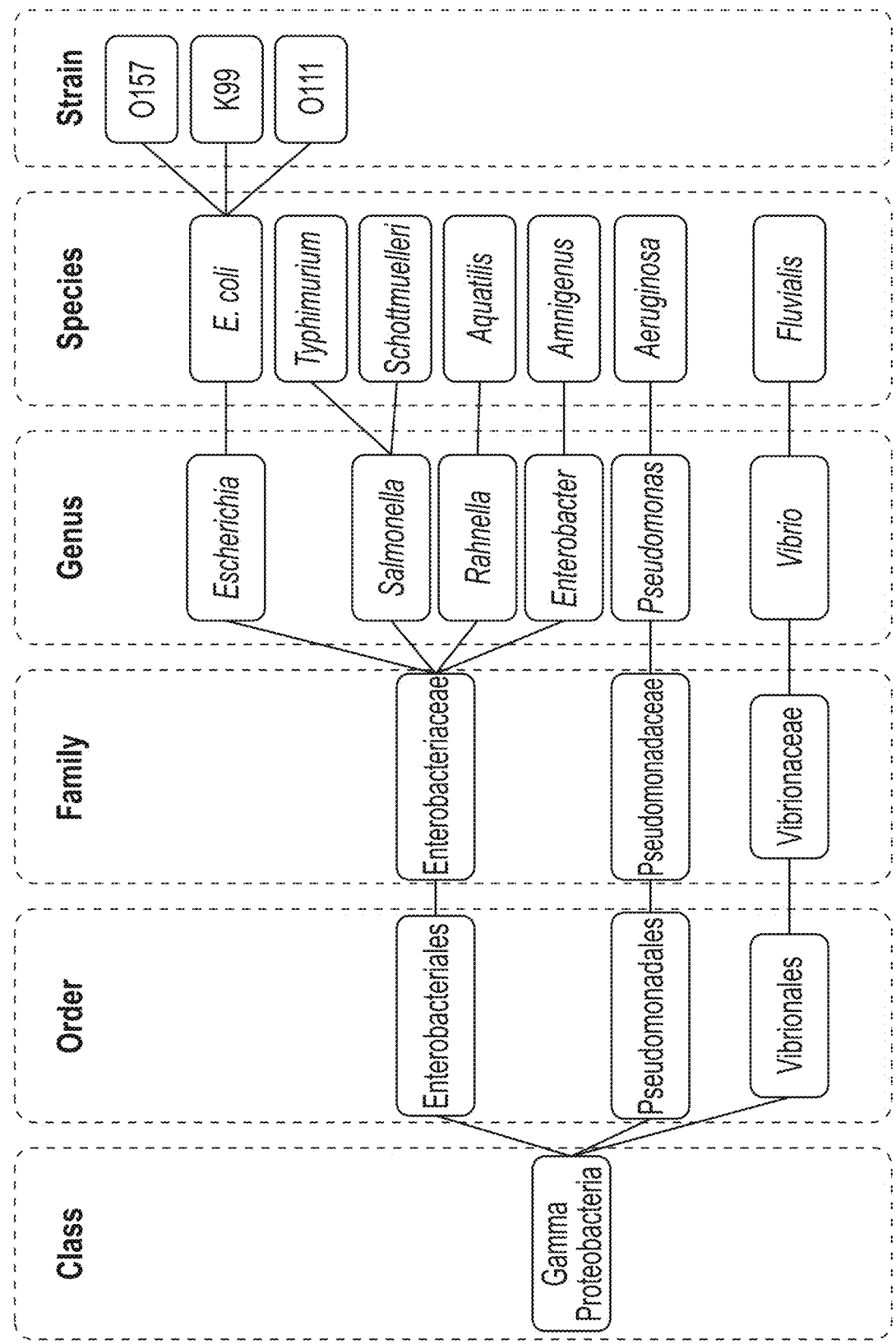
FIG. 21 illustrates an exemplary decision tree for detecting Gram-negative bacteria.
Figure 22:
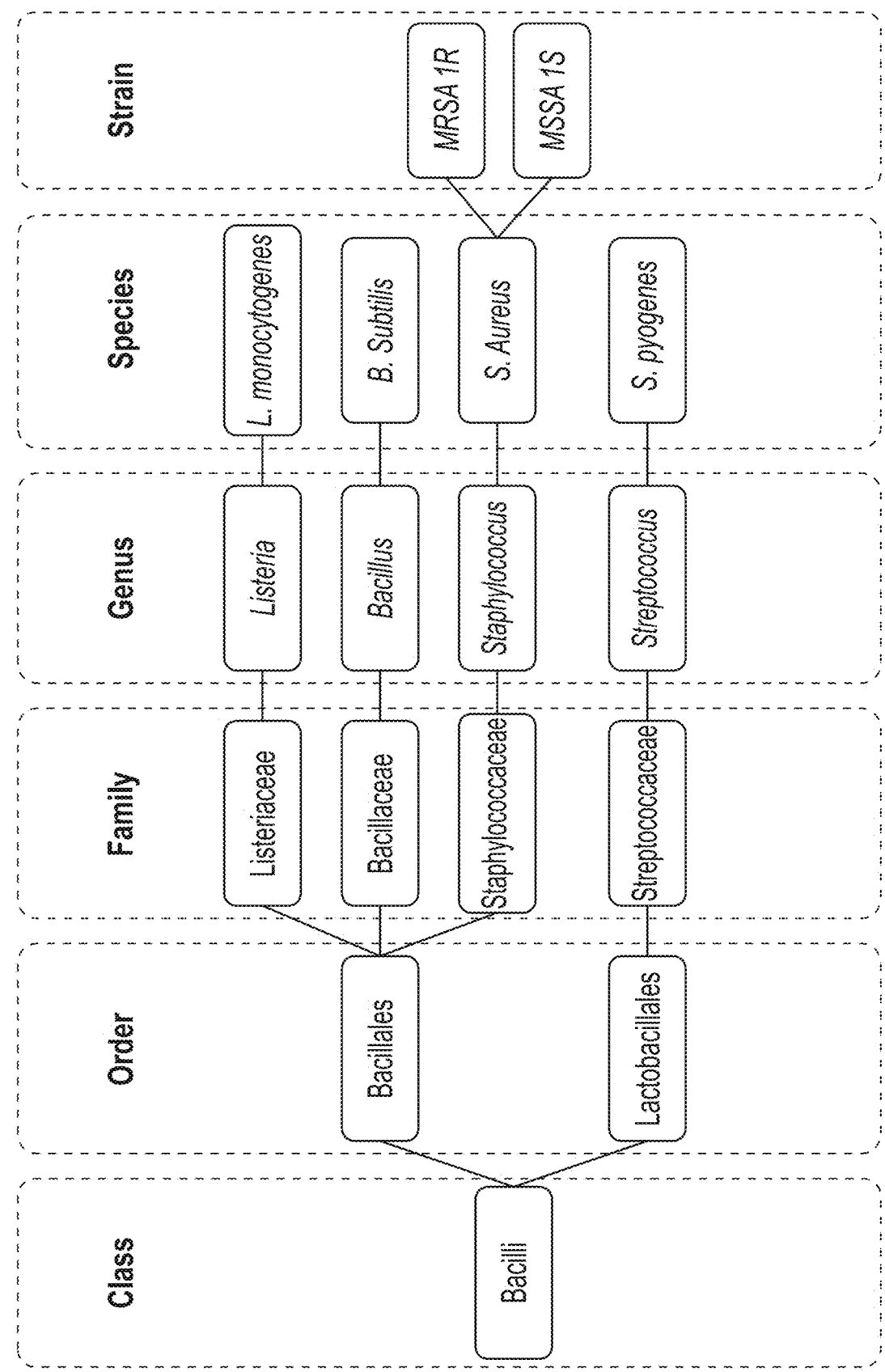
FIG. 22 illustrates an exemplary decision tree for detecting Gram-positive bacteria.

In some exemplary embodiments, Raman spectroscopic system 100 is used to assess or detect the presence or absence of a bacterium or to determine the strain of a bacterium. Bacteria are typically systematically classified so that different strains can be differentiated and similar strains can be grouped in one or more broader categories. Such differentiation and grouping may be beneficial for determining treatment for bacterial infection or for studying microbial colonies. FIGS. 21 and 22 illustrate exemplary decision trees for detecting Gram-negative bacteria and Gram-positive bacteria. As illustrated by FIGS. 21 and 22, different strains of bacteria can share many similarities, making it difficult to distinguish among them. However, because each species of bacterium can have a distinct cell envelope composition, mole fraction of amino acids, virulence factors, and capsule constitutes, each species of bacterium can have a unique Raman spectral fingerprint due to the stretching and bending of molecular bonds in proteins, nucleic acids, lipids, and saccharides.

For example, Gram-negative bacteria and Gram-positive bacteria can be distinguished based on various distinct molecular components of the outer cell wall. The outer cell wall of Gram-positive bacteria is comprised of several layers of peptidoglycan. Gram-positive cells bacteria contain teichoic acids absent in Gram-negative bacteria. There are two types of teichoic acids in Gram-positive cells bacteria: lipoteichoic acid, which is physically connected to the plasma membrane and traverses the peptidoglycan layer, and wall teichoic acid, which is covalently bound to peptidoglycan. Teichoic acids play a role in providing rigidity to the cell wall as well as in the regulation of cell growth. In contrast, Gram-negative bacteria have an outer membrane comprised of a complex of lipopolysaccharide (LPS), protein, and phospholipid. LPS is made up of a hydrophobic lipid (lipid A), which is responsible for the toxic properties of the molecule, a hydrophilic core polysaccharide chain, and a hydrophilic O-antigenic polysaccharide side chain. Other antigens that are associated with strains of Gram-negative bacteria include the K or capsule antigen and the flagella H antigen. Certain exemplary distinct components of Gram-Positive Bacteria and Gram-Negative Bacteria are summarized in Table 2 below.

TABLE 2

Certain Exemplary Distinct Components of Gram-Positive Bacteria and Gram-Negative Bacteria

| Component | Gram-Positive Bacteria | Gram-Negative Bacteria |
|---|---|---|
| React in crystal violet dye | Yes | No |
| Cell wall composition | Cell all 100-120 Angstroms thick, single layered. Lipid content is low. Murein content is higher 70-80% | Cell all 70-120 Angstroms thick, two layered. Lipid content is high (20-30%). Murein content is low 20%. |
| Peptidoglycan layer | 15-80 nm (multilayered) | 10 nm (single layered) |
| Periplasmic space after peptidoglycan layer | Absent | Present |
| Outer membrane | Absent | Present |
| Teichoic acids | Present in many | Absent |
| Lipopolysachharide (LPS) | In general, none | High |
| Toxin | Primarily exotoxin (extra-cellular) | Primarily endotoxin |
| Lipoprotein | Low | High |
| Lipids | Low | High |
| Flagellum | If present, two rings in their basal body | 4 basal body rings |
| Mesosomes | More prominent | Less prominent |
| Antibiotic resistance | More susceptible to antibiotics | More resistant to antibiotics |

Figure 23:
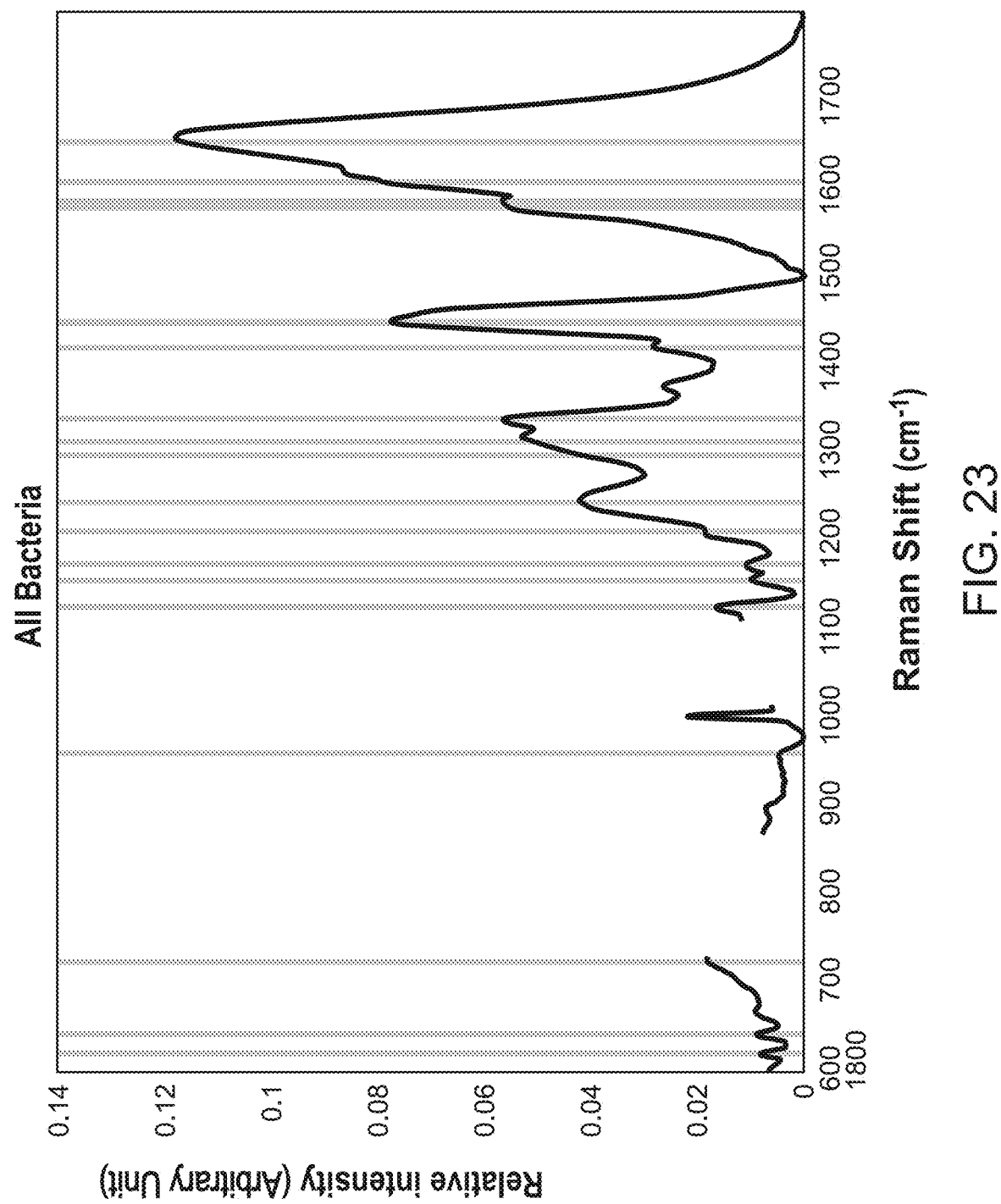
FIG. 23 illustrates eighteen exemplary preselected spectral bands for detecting the presence or absence of bacteria.
Figure 24:
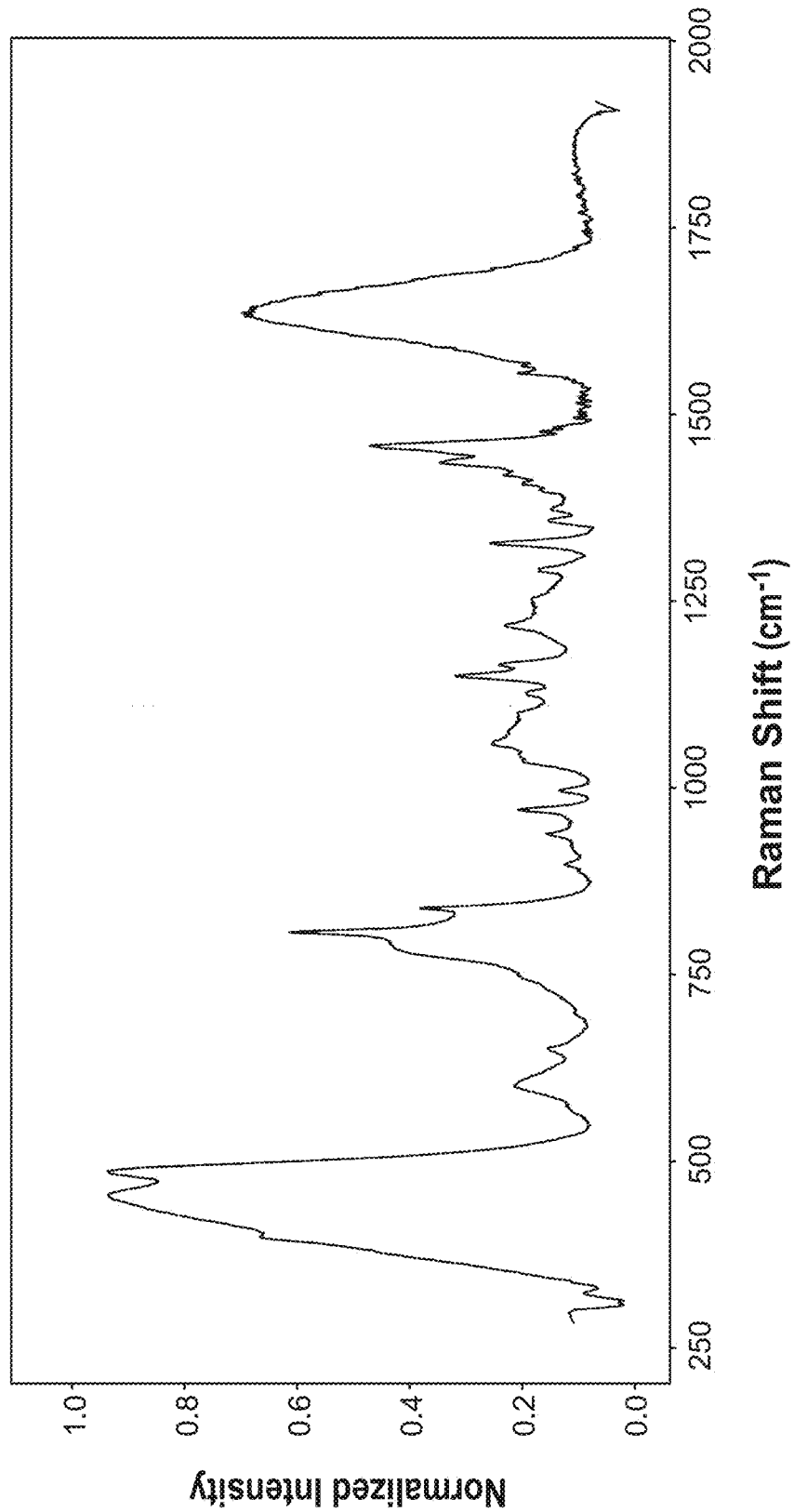
FIG. 24 illustrates an exemplary mean Raman spectrum of *Escherichia coli*.
Figure 25:
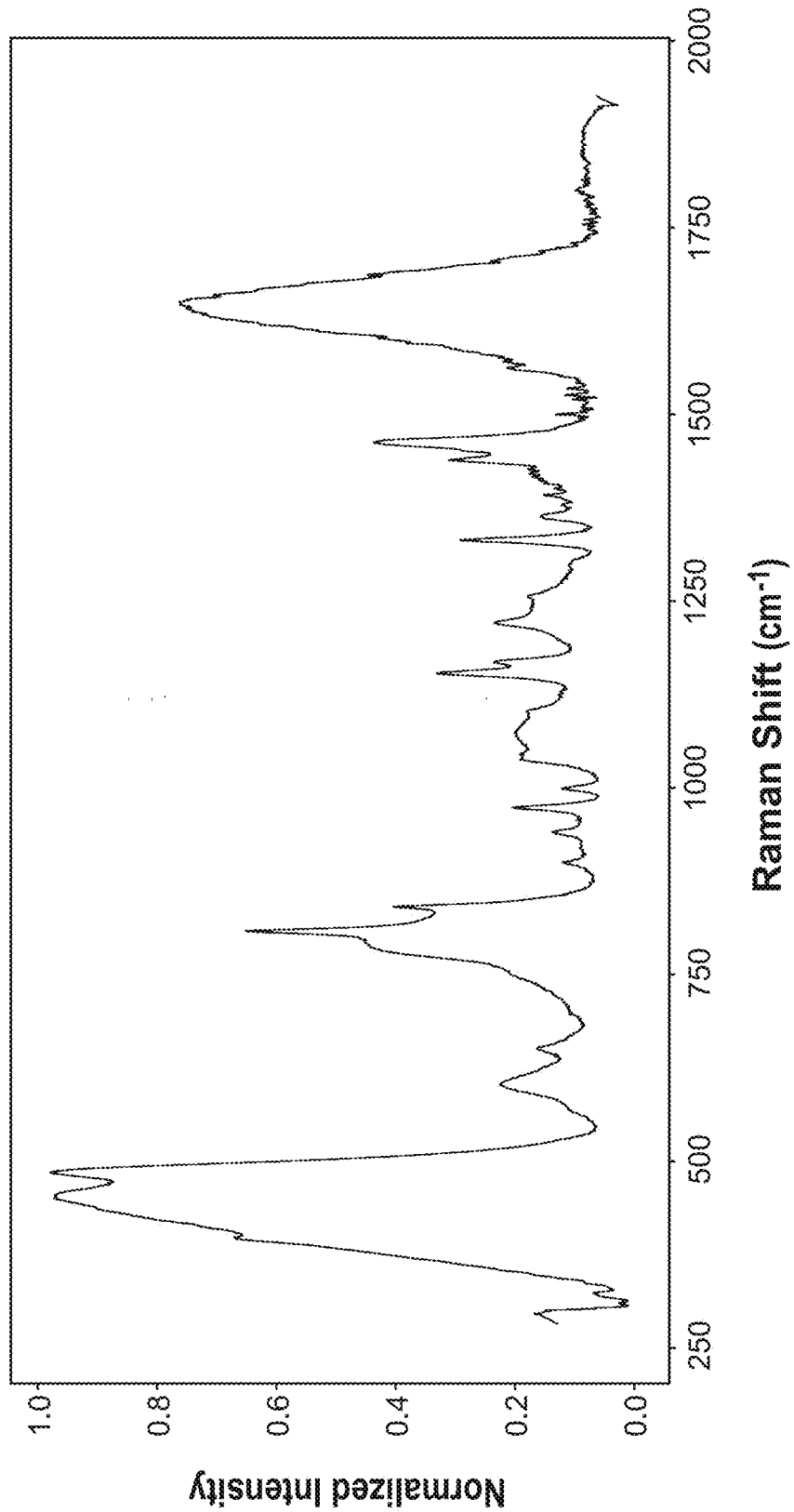
FIG. 25 illustrates an exemplary mean Raman spectrum of *Proteus mirabilis*.
Figure 26:
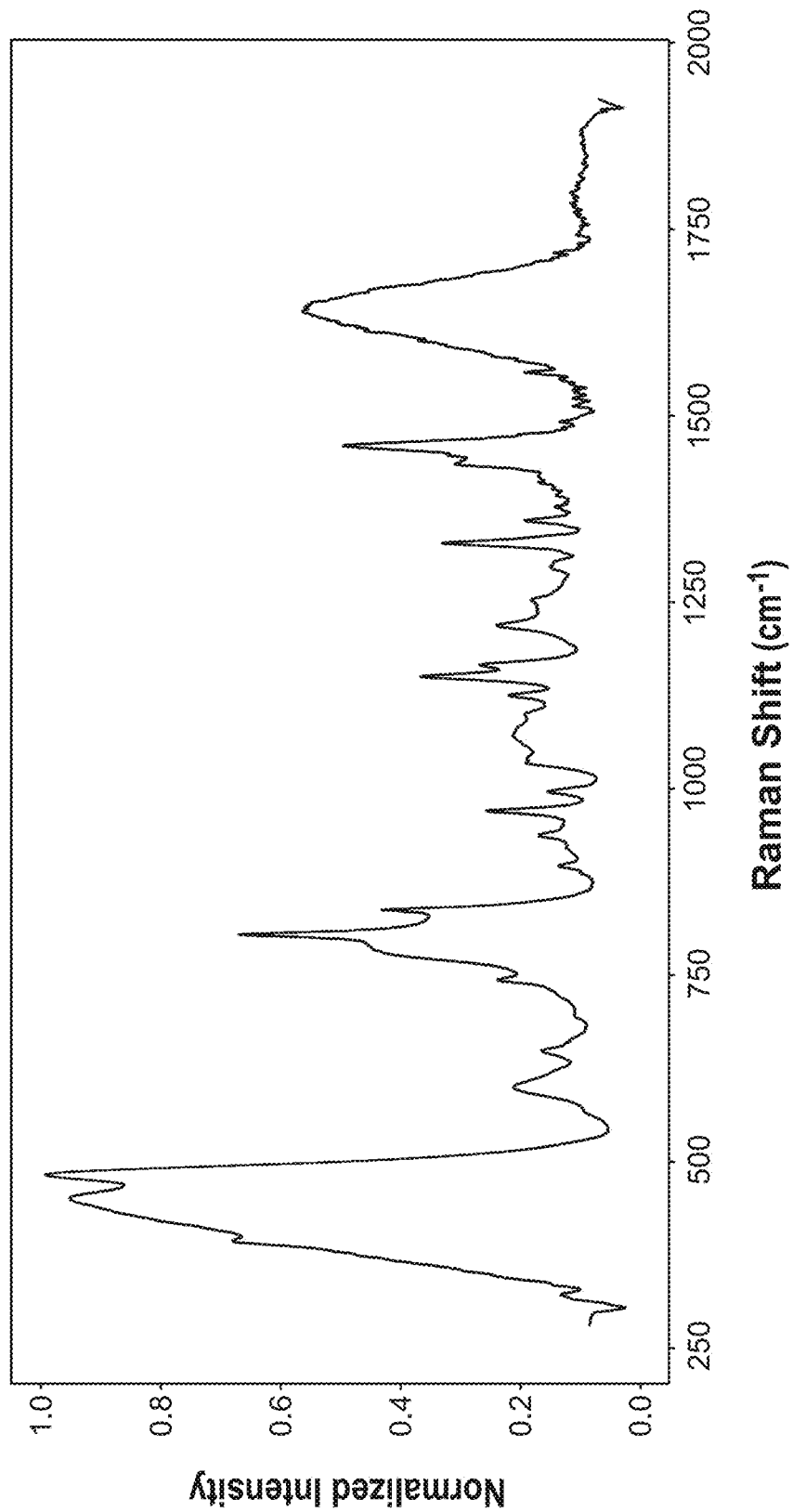
FIG. 26 illustrates an exemplary mean Raman spectrum of *Klebsiella pneumoniae*.
Figure 27:
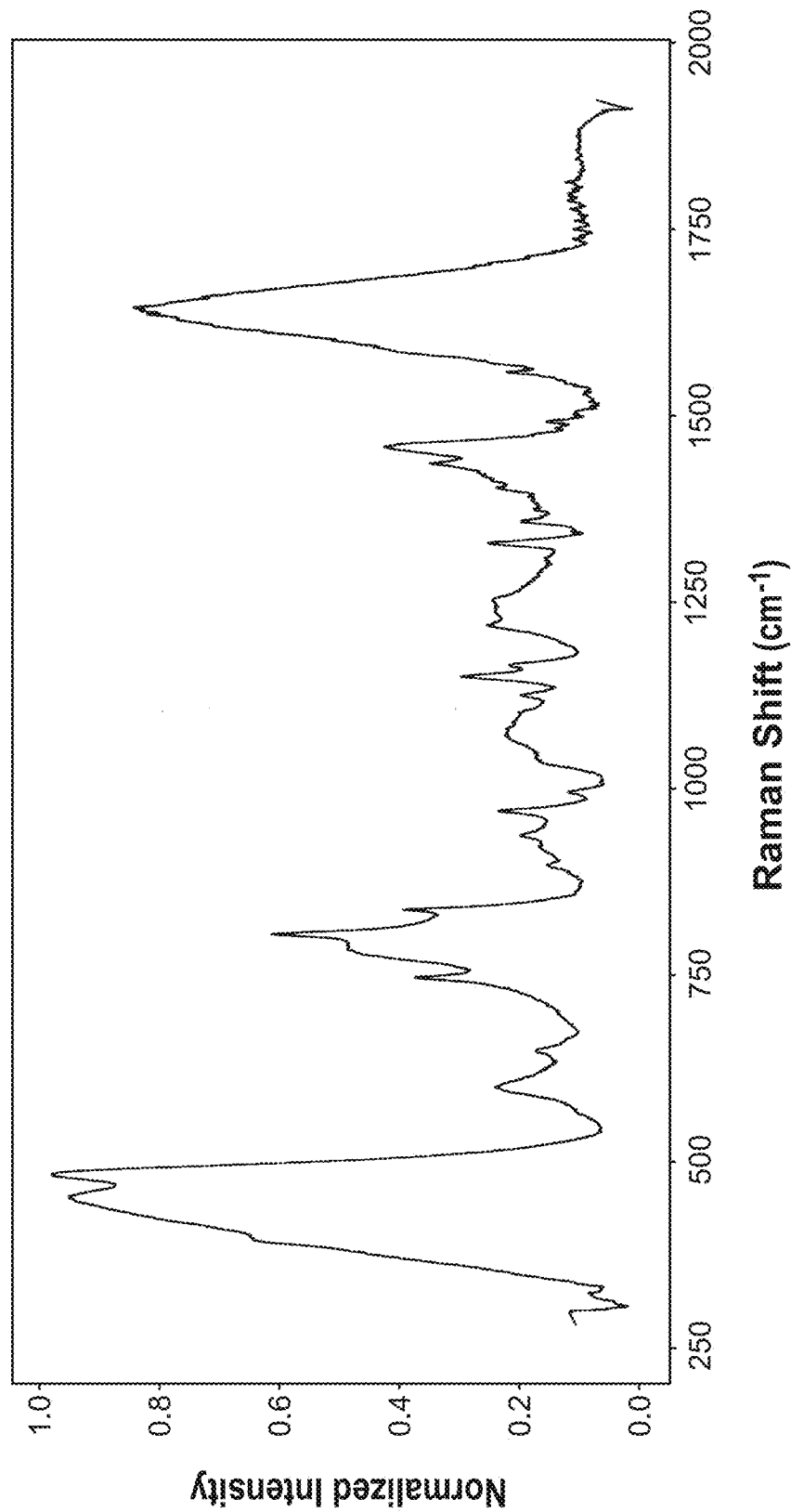
FIG. 27 illustrates an exemplary mean Raman spectrum of *Leptospira interrogans*.
Figure 28:
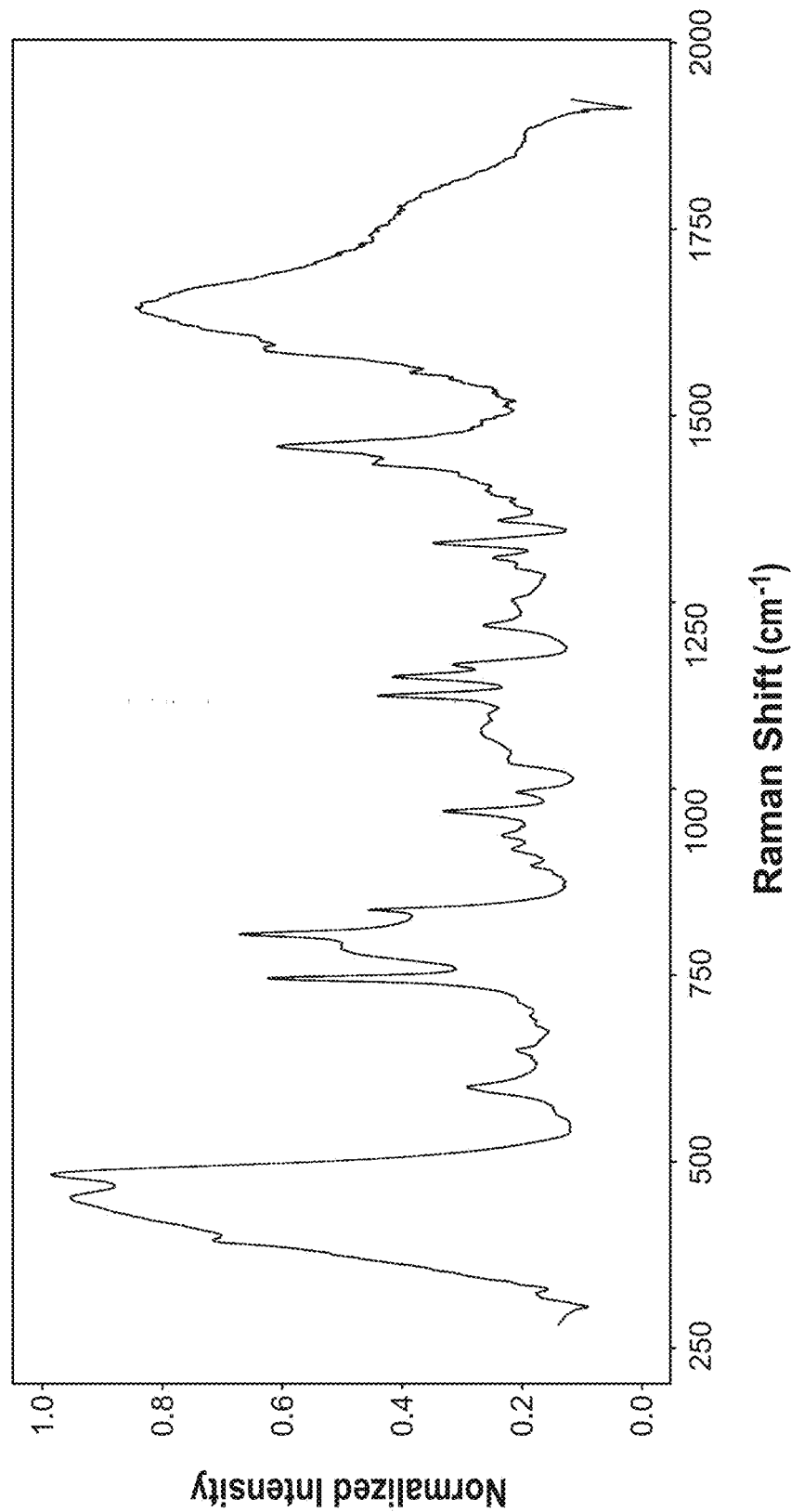
FIG. 28 illustrates an exemplary mean Raman spectrum of *Pseudomonas aeruginosa*.
Figure 29:
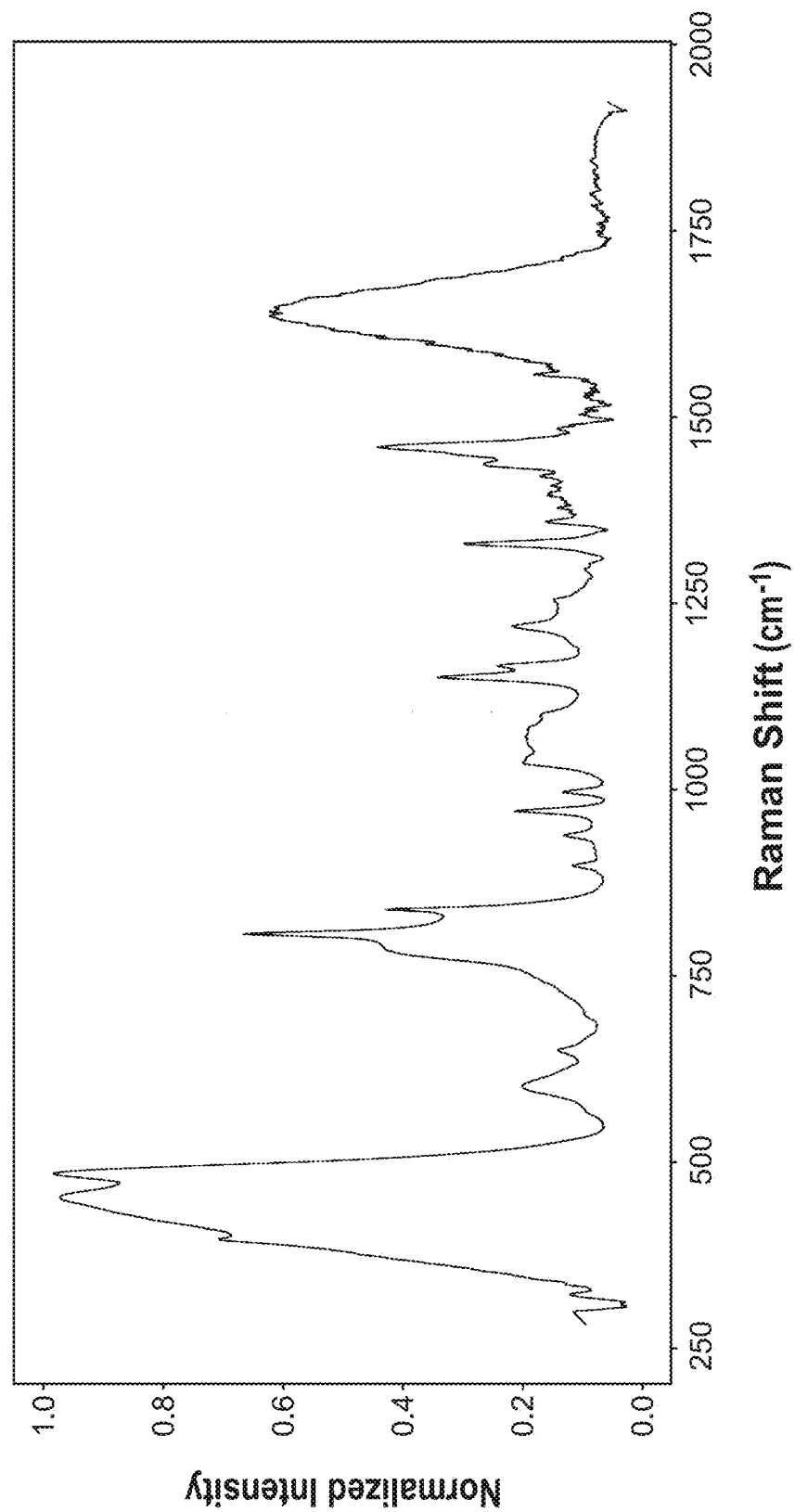
FIG. 29 illustrates an exemplary mean Raman spectrum of *Enterococcus faecalis*.
Figure 30:
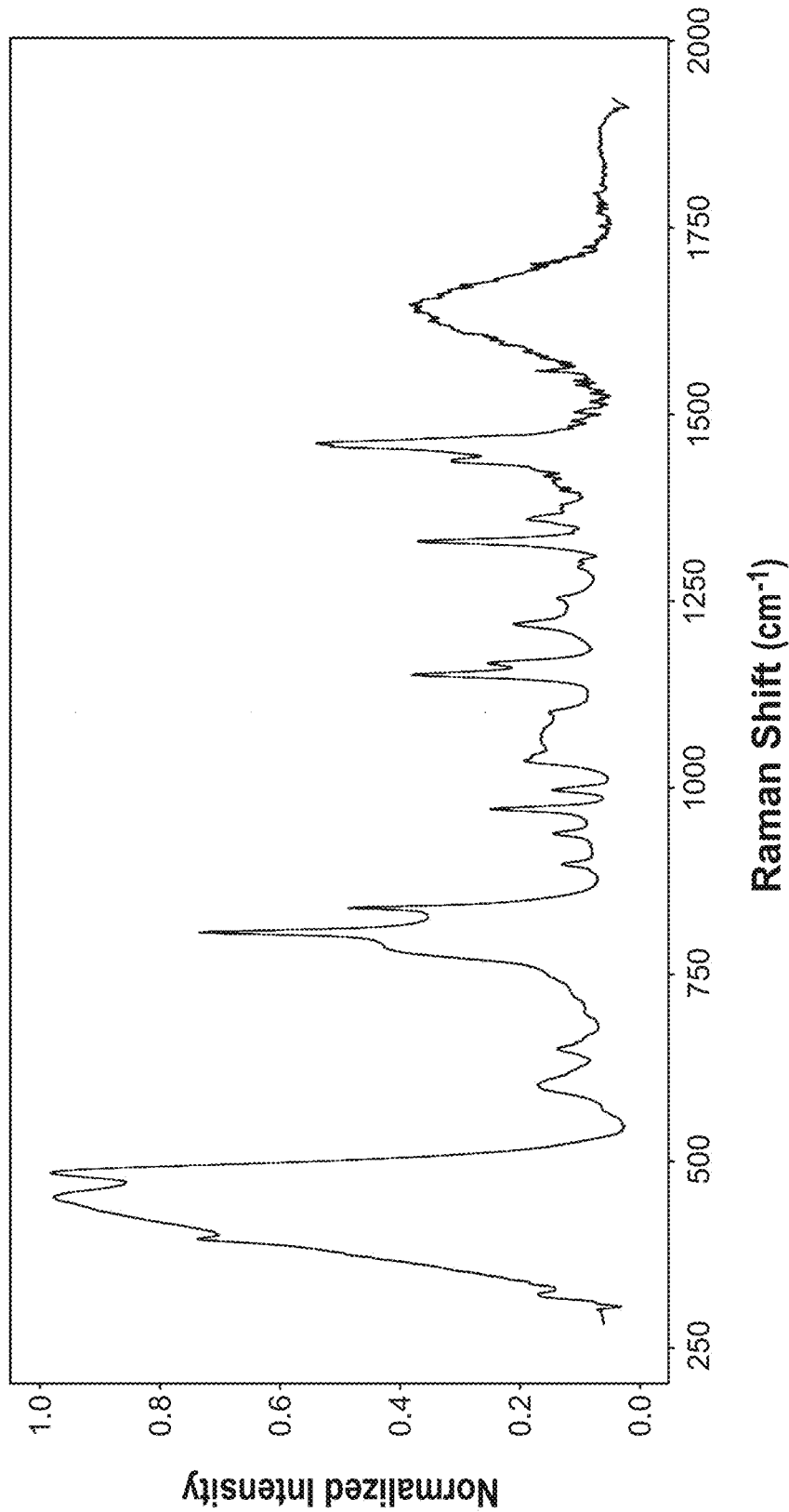
FIG. 30 illustrates an exemplary mean Raman spectrum of *Streptococcus zooepidemicus* or *Streptococcus canis*.
Figure 31:
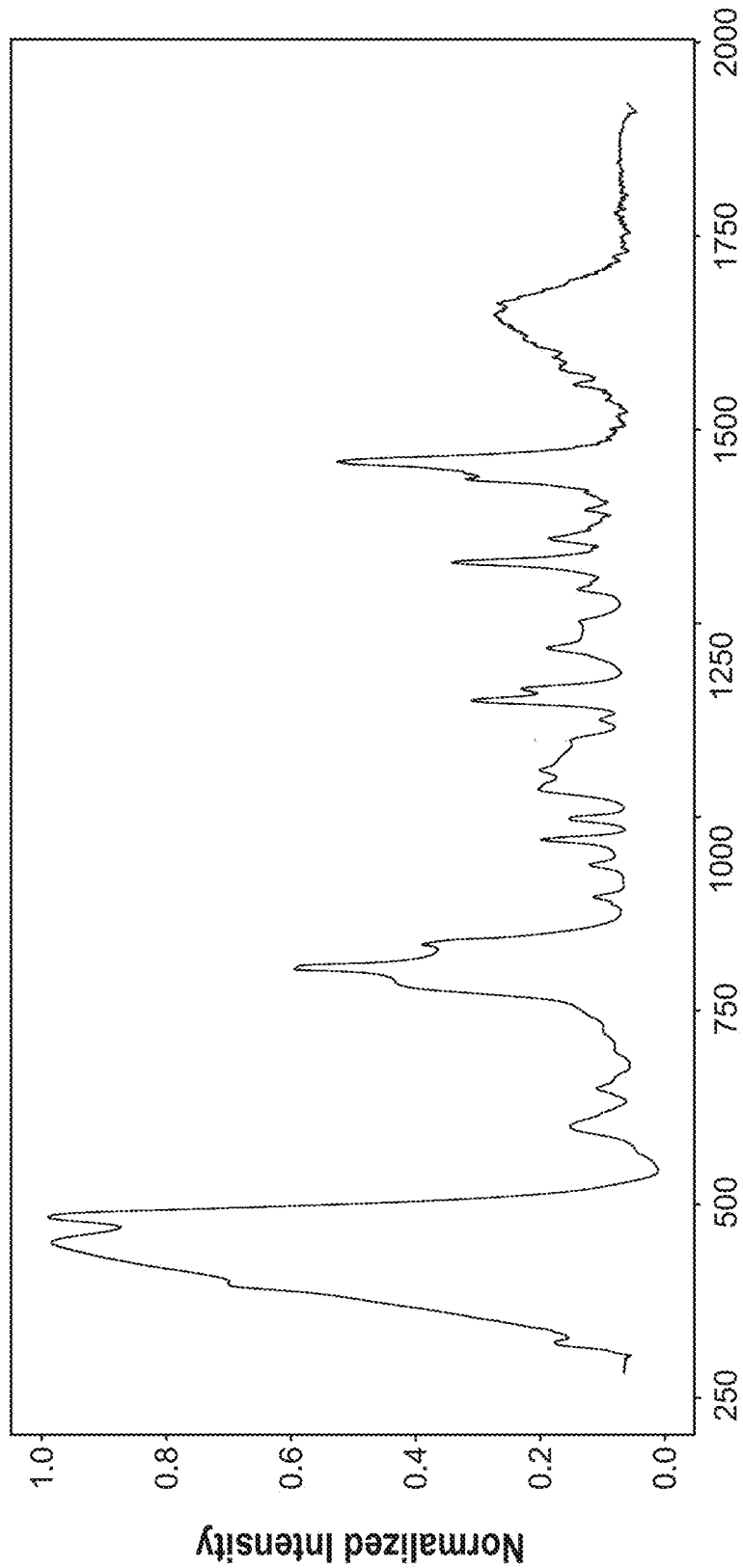
FIG. 31 illustrates an exemplary mean Raman spectrum of *Staphylococcus pseudintermedius*.

In some exemplary embodiments, Raman spectroscopic system 100 is used to identify and analyze one or more preselected spectral bands of the optical signal received from a sample to assess or detect the presence or absence of a bacterium of a certain class, order, family, genus, species, and/or strain for the particular application. FIG. 23 illustrates eighteen exemplary preselected Raman spectral bands for detecting the presence or absence of bacteria. These preselected Raman spectral bands were determined based on experimentally collected Raman spectra of the bacteria shown in FIGS. 21 and 22. One or more of these preselected Raman spectral bands include distinguishing features associated with the unique molecular components of the outer cell wall of a bacterium.

In some exemplary embodiments, the eighteen exemplary preselected Raman spectral bands shown in FIG. 23 include 610-630 $cm^{-1}$, 630-650 $cm^{-1}$, 715-735 $cm^{-1}$, 950-979 $cm^{-1}$, 990-1010 $cm^{-1}$, 1115-1135 $cm^{-1}$, 1155-1165 $cm^{-1}$, 1160-1180 $cm^{-1}$, 1200-1220 $cm^{-1}$, 1240-1260 $cm^{-1}$, 1290-1310 $cm^{-1}$, 1315-1325 $cm^{-1}$, 1330-1350 $cm^{-1}$, 1410-1430 $cm^{-1}$, 1440-1460 $cm^{-1}$, 1570-1590 $cm^{-1}$, 1600-1620 $cm^{-1}$, and 1650-1670 $cm^{-1}$. In some exemplary embodiments, one or more of the eighteen Raman spectral bands are analyzed. In some exemplary embodiments, the preselected Raman spectral bands may include 735-874 $cm^{-1}$ and/or 1013-1116 $cm^{-1}$ (not shown).

The preselected spectral band of 610-630 $cm^{-1}$ includes a Raman peak at 621 $cm^{-1}$, corresponding to vibrations associated with amino acids. The preselected spectral band of 630-650 $cm^{-1}$ includes a Raman peak at 643 $cm^{-1}$, corresponding to vibrations associated with proteins and amino acids. The preselected spectral band of 715-735 $cm^{-1}$ includes a Raman peak at 725 $cm^{-1}$, corresponding to vibrations associated with proteins and amino acids. The preselected spectral band of 950-979 $cm^{-1}$ includes a Raman peak at 960 $cm^{-1}$, corresponding to vibrations associated with proteins and amino acids. The preselected spectral band of 990-1010 $cm^{-1}$ includes a Raman peak at 1003 $cm^{-1}$, corresponding to vibrations associated with proteins. The preselected spectral band of 1115-1135 $cm^{-1}$ includes a Raman peak at 1126 $cm^{-1}$, corresponding to vibrations associated with lipids and carbohydrates. The preselected spectral band of 1155-1165 $cm^{-1}$ includes a Raman peak at 1158 $cm^{-1}$, corresponding to vibrations associated with proteins. The preselected spectral band of 1160-1180 $cm^{-1}$ includes a Raman peak at 1173 $cm^{-1}$, corresponding to vibrations associated with amino acids. The preselected spectral band of 1200-1220 $cm^{-1}$ includes a Raman peak at 1209 $cm^{-1}$, corresponding to vibrations associated with amino acids. The preselected spectral band of 1240-1260 $cm^{-1}$ includes a Raman peak at 1249 $cm^{-1}$, corresponding to vibrations associated with proteins (Amide III) and nucleic acids. The preselected spectral band of 1290-1310 $cm^{-1}$ includes a Raman peak at 1296 $cm^{-1}$, corresponding to vibrations associated with lipids. The preselected spectral band of 1315-1325 $cm^{-1}$ includes a Raman peak at 1320 $cm^{-1}$, corresponding to vibrations associated with proteins and nucleic acids. The preselected spectral band of 1330-1350 $cm^{-1}$ includes a Raman peak at 1338 $cm^{-1}$, corresponding to vibrations associated with proteins, lipids, amino acids, and nucleic acids. The preselected spectral band of 1410-1430 $cm^{-1}$ includes a Raman peak at 1420 $cm^{-1}$, corresponding to vibrations associated with lipids and nucleic acids. The preselected spectral band of 1440-1460 $cm^{-1}$ includes a Raman peak at 1448 $cm^{-1}$, corresponding to vibrations associated with proteins and lipids. The preselected spectral band of 1570-1590 $cm^{-1}$ includes a Raman peak at 1578 $cm^{-1}$, corresponding to vibrations associated with amino acids. The preselected spectral band of 1600-1620 $cm^{-1}$ includes a Raman peak at 1606 $cm^{-1}$, corresponding to vibrations associated with amino acids. The preselected spectral band of 1650-1670 $cm^{-1}$ includes a Raman peak at 1657 $cm^{-1}$, corresponding to vibrations associated with proteins (Amide I) and lipids. The preselected spectral band of 735-874 $cm^{-1}$ includes Raman peaks corresponding to vibrations associated with nucleic acids and amino acids. The preselected spectral band of 1013-1116 $cm^{-1}$ includes Raman peaks corresponding to vibrations associated with protein, carbohydrates, and lipids.

In some exemplary embodiments, a combination of at least two of the preselected Raman spectral bands shown in FIG. 23 are selected for spectral analysis for detecting the presence or absence of a bacterium. In some exemplary embodiments, all of these preselected Raman spectral bands are analyzed to determine the species or strain of a bacterium or to distinguish the species or strain of a bacterium from another species or strain.

In some exemplary embodiments, one preselected spectral band is analyzed to determine the species of a bacterium. In some exemplary embodiments, the preselected spectral band may include a plurality of features. For example, a preselected spectral band from 600 $cm^{-1}$ to 1200 $cm^{-1}$ was used to detect different Gram-negative and Gram-positive species of bacteria in water. Specimens of each of the bacteria species *Escherichia coli, Proteus mirabilis, Klebsiella pneumoniae, Pseudomonas aeruginosa, Enterococcus faecalis, Streptococcus zooepidemicus* or *Streptococcus canis* and *Staphylococcus pseudintermedius* were prepared separately from bacteria plated on tryptic soy agar plates. A single isolated colony was added to 5 ml of tryptic soy broth in a 14 ml culture tube. The culture tube was placed on a shaker in a 37° C. incubator and incubated overnight for 18 hours. The overnight culture was centrifuged at room temperature for 5 minutes at 3500 rpms. The supernatant was removed and the bacteria pellet was re-suspended in 5 ml of filtered (sterilized) tap water. The bacteria were centrifuged and a washing process was repeated. After the final wash, filtered tap water was added to the bacteria pellet until the optical density (OD), measured at a wavelength of 600 nm, of the solution was adjusted to a desired value of 1.

To prepare specimen of *Leptospira interrogans*, serotype canicola (ATCC 23470) were cultivated in 250 ml culture flasks at 30° C. in Ellinghausen-McCullough-Johnson-Harris (EMJH) medium for 7-10 days. Then, the culture was centrifuged at room temperature for 20 minutes at 3500 rpms. The supernatant was removed and the bacteria pellet was re-suspended in 5 ml of filtered (sterilized) tap water. The bacteria were centrifuged and the washing process was repeated once. After the final wash, filtered tap water was added to the bacteria pellet until the OD, measured at a wavelength of 600 nm, of the solution was adjusted to the desired value of 1.

The preselected spectral band from 600 $cm^{-1}$ to 1200 $cm^{-1}$ was selected to include five Raman bands, including 600-800 $cm^{-1}$, 800-1200 $cm^{-1}$, 1200-1400 $cm^{-1}$, 1400-1500 $cm^{-1}$, and 1500-1760 $cm^{-1}$. The Raman band of 600-800 $cm^{-1}$ corresponds to vibrations associated with nucleotide conformation. The Raman band of 800-1200 $cm^{-1}$ corresponds to contributions from nucleic acids, lipids, proteins, and C—O stretching of carbohydrates. The Raman band of 1200-1400 $cm^{-1}$ corresponds to contributions from proteins, polysaccharides, lipids, and nucleic acids. The Raman band of 1400-1500 $cm^{-1}$ corresponds to C—H, $CH_2$, and $CH_3$ vibrations. The Raman band of 1500-1760 $cm^{-1}$ corresponds to the Amine I band with contributions of water, proteins, nucleic acids, and lipids.

FIGS. 24-31 illustrate exemplary mean Raman spectra of different species of bacteria in water obtained by Raman spectroscopic system 100 in one exemplary embodiment. In these examples, system 100 included the excitation light source 110 and the spectrometer 120. The spectrometer 120 included the transmission grating 126 (manufactured by Wasatch Photonics), the collimating element 124 (Zeiss Interlock 2/135), the focusing element 128, the entrance aperture 122, and the detector 130 (deep cooled back thinned CCD). The excitation light source 110 was a laser having a wavelength of 532.02 nm and a power of 100 mW. The transmission grating 126 had a line density of 2650 lines/ mm, an operational wavelength range of 540.17 nm to 592.63 nm, a diffraction efficiency of approximately 60% to 80% with an average diffraction efficiency of approximately 65% in the operational wavelength range as more specifically shown in FIG. 4, and an angle of incidence of 48.816° at a center wavelength of 568 nm for first order diffraction. The collimating element 124 and the focusing element 128 both had a focal length of 135 mm and an f-number of F/2. The detector 130 was a deep cooled back thinned CCD (Horiba Syncerity™ deep cooled CCD Camera, Model 354308) having an array of 2048×70 pixels, a pixel size of 14 μm×14 μm, and an image area of 28.7 mm by 0.98 mm. The spectrometer 120 had a preselected spectral band of 540.17 nm to 592.63 nm, or alternatively represented as a preselected spectral band of 278.5 $cm^{-1}$ to 1905.1 $cm^{-1}$ based on the 532.02 nm excitation wavelength, a transfer efficiency of approximately 60% to 80% with an average transfer efficiency of approximately 65% over the preselected spectral band, a spectral resolution of 1.43 $cm^{-1}$ for a center wavelength of 568 nm, a spectral resolution of 1.31 $cm^{-1}$ to 1.58 $cm^{-1}$ for different wavelengths of the preselected spectral band with an average spectral resolution of 1.43 $cm^{-1}$ of all the wavelengths of the preselected spectral band over the 2048 pixels of the CCD array, a path length from the focusing element 128 to the detector 130 of 13.5 cm, and a width of the entrance aperture 122 of 25 μm. The performance ratio of the spectrometer 120 was 4.8% $cm^{-1}$, which is the ratio between the 65% average transfer efficiency and the 13.5 cm path length. The performance product of the spectrometer 120 was 19.31, which is a product of the 1.43 $cm^{-1}$ average spectral resolution and the 13.5 cm path length of the spectrometer 120. A volume of 5 ml of each sample to be interrogated was received in a cuvette 310 of Raman spectroscopic system 100 as shown in FIGS. 17A-17D (manufactured by WI Inc.). The tapered wall 340 of cuvette 310 was made of Pro-fax PD702 polypropylene homopolymer and had a tilt angle of 16.2 degrees with a tolerance of 0.5 degree. Raw Raman spectra were preprocessed through subtraction of background noise and normalization. In some exemplary embodiments, mean Raman spectra are obtained and analyzed to assess or detect the presence or absence of a bacterium. As used herein, a mean Raman spectrum refers to the average of a plurality of Raman spectra measured by a spectrometer. As shown in FIGS. 24-31, the mean Raman spectra of each species of bacteria has unique Raman features resulting from the superposition of the five Raman bands in the preselected spectral band from 600 $cm^{-1}$ to 1200 $cm^{-1}$. These unique Raman features allow for distinguishing between the different but closely related Gram-negative species, including *Escherichia coli*, *Proteus mirabilis*, *Klebsiella pneumoniae*, *Leptospira interrogans*, and *Pseudomonas aeruginosa*, and Gram-positive species, including *Enterococcus faecalis*, *Streptococcus zooepidemicus* or *Streptococcus canis*, and *Staphylococcus pseudintermedius*.

In some exemplary embodiments, Raman spectroscopic system 100 is used to assess or detect the presence or absence of urinary crystals. The existence of urinary crystals and types of urinary crystal can provide useful information for the underlying diseases of humans or animals. In some exemplary embodiments, proper identification of urinary crystals is important in determining a suitable medical treatment. As a non-limiting example, struvite crystals (STR) are comprised of magnesium ammonium phosphate, which is likely to appear when the urine becomes too alkaline. Struvite is a natural constituent of urine. It remains dissolved (and not precipitate) in urine for as long as the urine remains slightly acidic and not too concentrated. Bacterial infections in the urinary tract can accumulate and increase the pH of the urine to between 6 and 6.5, enough to cause struvite crystals to precipitate. An overload of struvite crystals in the urine commonly results in bladder stones. As another non-limiting example, calcium oxalate crystals can be classified as either monohydrate (COM) ($CaC_2O_4 \cdot H_2O$) or dihydrate (COD) ($CaC_2O_4 \cdot 2H_2O$). COM appears in urine when there is ethylene glycol poisoning or antifreeze poisoning. COD can be found in normal urine. However, when the concentration of calcium oxalate in the urine is higher-than-normal, especially when the urine is acidic, the calcium oxalate in the urine can form bladder and kidney stones.

In one exemplary embodiment, three different types of crystals, 5 mg of magnesium ammonium phosphate ($NH_4MgPO_4 \cdot 6H_2O$), 10 mg of calcium oxalate dihydrate ($CaC_2O_4 \cdot 2H_2O$), and 5 mg of calcium oxalate monohydrate ($CaC_2O_4 \cdot H_2O$), were each first crushed into a powder sample using a mortar and pestle. Each powder sample was weighed and a desired amount of each powder sample was obtained and transferred to a conical cuvette of Raman spectroscopic system 100 as shown in FIGS. 17A-17D. Five milliliter of filtered tap water was added into each cuvette, which was then sealed before measurement. In these examples, the exemplary system 100, including the spectrometer 120 and cuvette 310, described in paragraph was used. Raw Raman spectra were preprocessed through subtraction of background noise and normalization and mean Raman spectra were obtained and analyzed to assess or detect the presence or absence of a urinary crystal.

Figure 32:
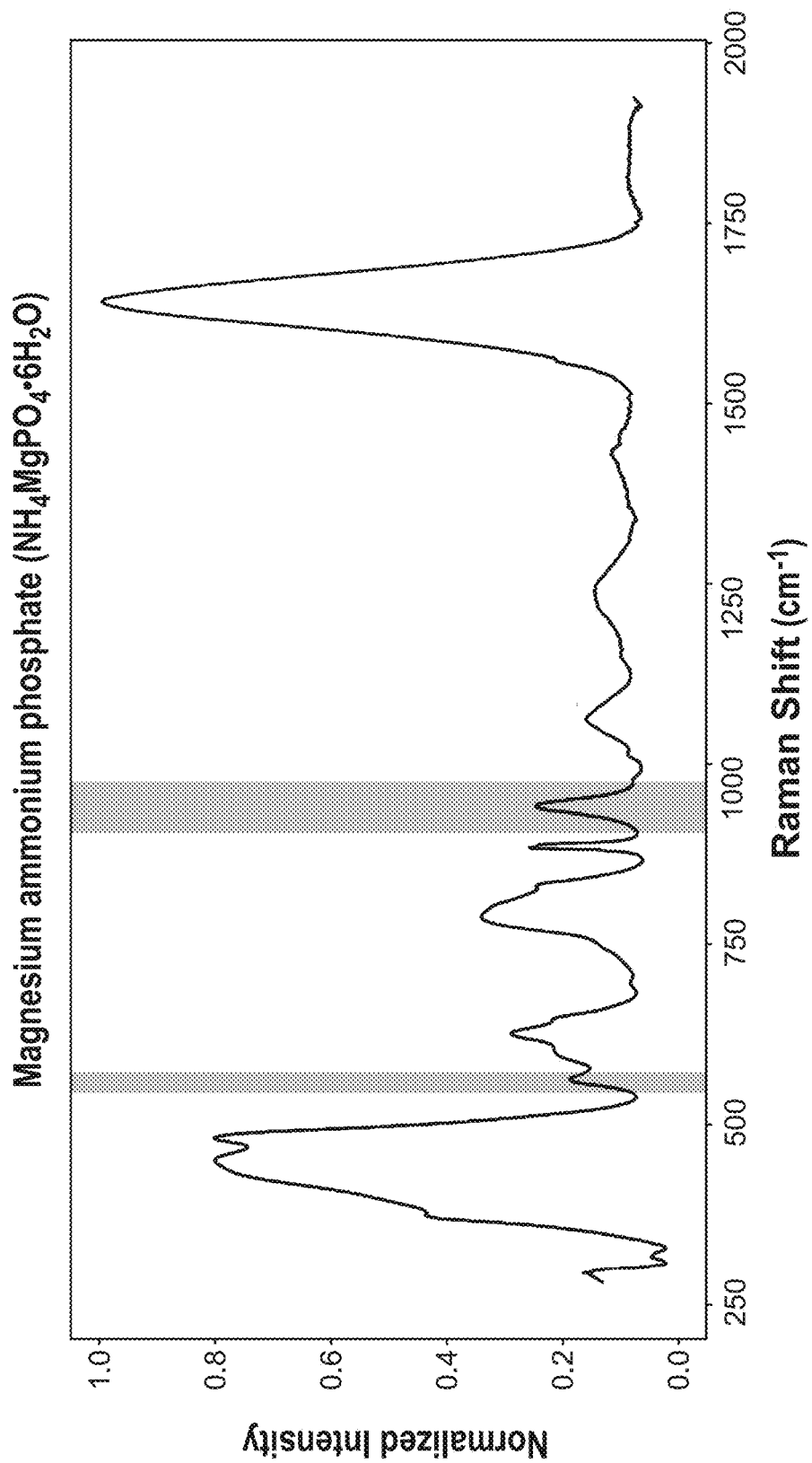
FIG. 32 illustrates exemplary spectral bands (gray bands) for detecting the presence or absence of magnesium ammonium phosphate and an exemplary measured Raman spectrum.
Figure 33:
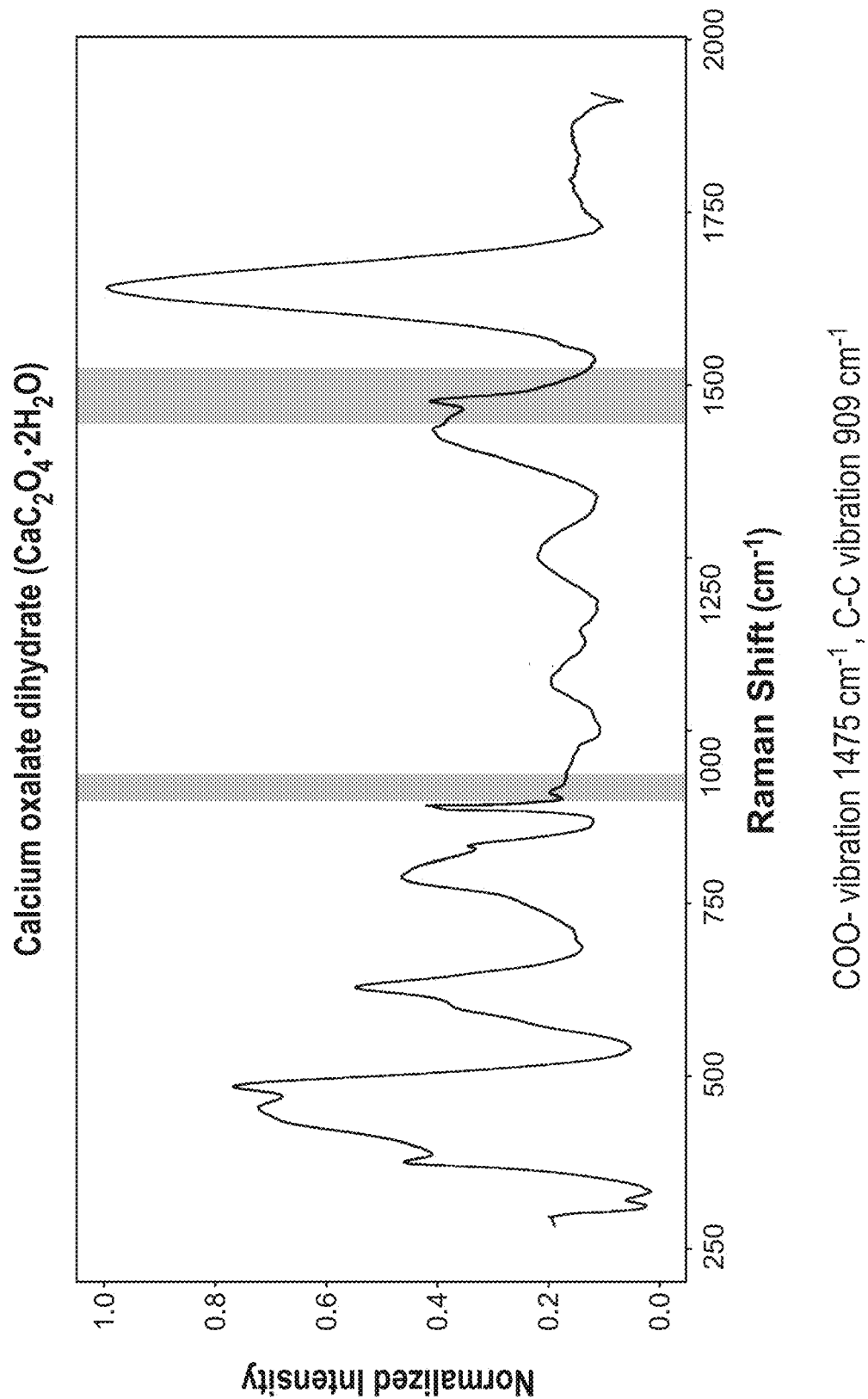
FIG. 33 illustrates exemplary preselected spectral bands (gray bands) for detecting the presence or absence of calcium oxalate dihydrate and an exemplary measured Raman spectrum.
Figure 34:
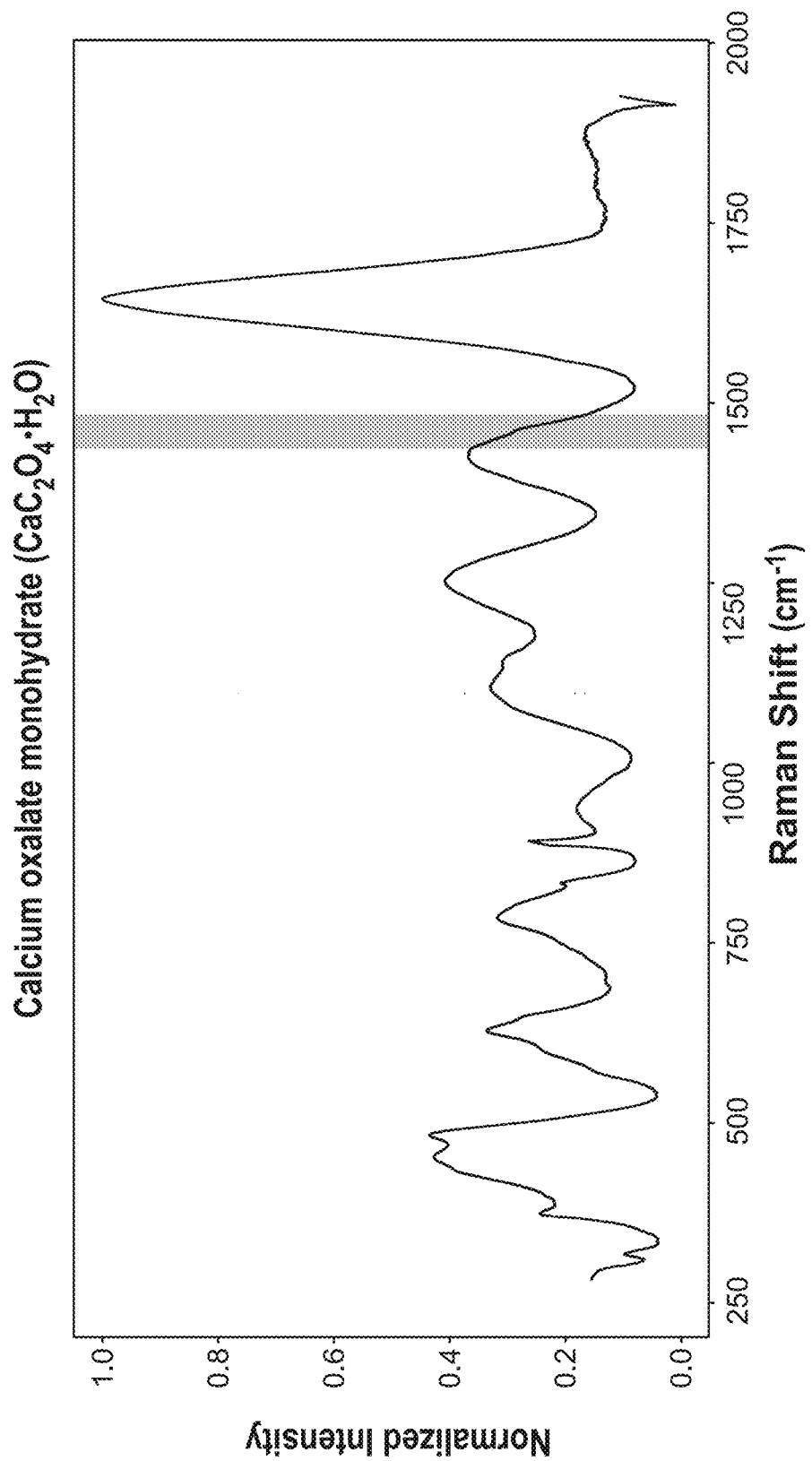
FIG. 34 illustrates an exemplary preselected spectral band (gray band) for detecting the presence or absence of calcium oxalate monohydrate and an exemplary measured Raman spectrum.

FIG. 32 illustrates exemplary predetermined spectral bands (gray bands) for detecting the presence or absence of magnesium ammonium phosphate and an exemplary measured Raman spectrum. As shown in FIG. 32, to detect the presence of magnesium ammonium phosphate, two spectral bands 544-572 $cm^{-1}$ and 910-982 $cm^{-1}$ containing the Raman peaks of $PO^-_3$ vibration at 563 $cm^{-1}$ and 944 $cm^{-1}$, respectively, were selected and analyzed. FIG. 33 illustrates exemplary predetermined spectral bands (gray bands) for detecting the presence or absence of calcium oxalate dihydrate and an exemplary measured Raman spectrum. As shown in FIG. 33, to detect the presence of calcium oxalate monohydrate, two spectral bands 1467-1527 $cm^{-1}$ and 892-938 $cm^{-1}$, containing the Raman peaks of COO— vibration at 1475 $cm^{-1}$ and C—C vibration 909 $cm^{-1}$, were selected and analyzed. FIG. 34 illustrates an exemplary predetermined spectral band (gray band) for detecting the presence or absence of calcium oxalate monohydrate and an exemplary measured Raman spectrum. As shown in FIG. 34, to detect the presence of calcium oxalate monohydrate, one spectral band 1437-1481 $cm^{-1}$, containing the Raman peak of COO— vibration at 1463 $cm^{-1}$ was selected and analyzed. The assessment and analysis of these preselected spectral bands of the Raman spectra obtained using Raman spectroscopic system 100 allowed for the detection of the presence of calcium oxalate dihydrate and magnesium ammonium phosphate in water.

In some exemplary embodiments, Raman spectroscopic system 100 is used to assess or detect the presence or absence of parasites in fecal samples, such as hookworms and roundworms. Hookworms are intestinal, blood-feeding, parasitic worms that cause types of infection known as helminthiases.

In one exemplary embodiment, three different fecal samples were prepared: a fecal sample containing hookworm eggs, a fecal sample containing roundworm eggs, and a control sample without hookworm or roundworm. In this exemplary embodiment, the exemplary system 100, including the spectrometer 120 and cuvette 310, described in paragraph was used. Each fecal sample was prepared according to the following procedure: (1) obtain and homogenize a fecal sample within a bag or a vial; (2) weigh 1 gram of the fecal sample in a wax coated cup; (3) add 15 mL of water to the cup and homogenize the fecal sample using a spatula or tongue depressor; (4) homogenize the fecal sample in the cup thoroughly to obtain a solution of the fecal sample; (5) drain the solution of the fecal sample through gauze into a new cup; (6) transfer the filtered solution into a 15 mL test tube; (7) add water to the filtered solution to make the total volume to 15 mL (or enough to balance); (8) centrifuge for 10 minutes at 1500 rpm; (9) discard the supernatant carefully not to disturb the upper layer of sediment; (10) add Sheather's sugar solution in two steps to obtain a homogeneous solution (homogenize with a vortex or a wooden stick); (11) add Sheather's sugar solution to make the total volume to 15 mL (or enough to balance); (12) centrifuge for 10 minutes at 1500 rpm; (13) carefully add Sheather's sugar solution to form a reverse meniscus; (14) place a coverslip on the meniscus and wait additional 10 minutes; (15) aseptically pipet 5 ml of filtered tap water into a clean conical cuvette of Raman spectroscopic system 100 as shown in FIGS. 17A-17D; (16) when time has elapsed, remove the coverslip from the test tube; (17) pull 1 ml of the filtered tap water from the cuvette and pipette onto the coverslip while holding it at an angle over the cuvette; (18) repeat several times, such as 2 to 5 times, while rotating the coverslip to ensure complete egg/oocyst removal; and (19) seal the cuvette for measurement.

Alternatively, in some exemplary embodiments, the samples can be prepared according to the following procedure: (1) place a clean cuvette on the a scale (e.g., an Acculab VI-200 scale), and zero the scale; (2) add unprocessed fecal sample to the cuvette using a spatula or wood stick until the appropriate mass of fecal sample has been reached; (3) pipet 5 ml of filtered tap water into the cuvette; (4) mix the fecal sample with a clean spatula or wood stick until a homogeneous slurry has been achieved; and (5) seal the cuvette for measurement.

Figure 35:
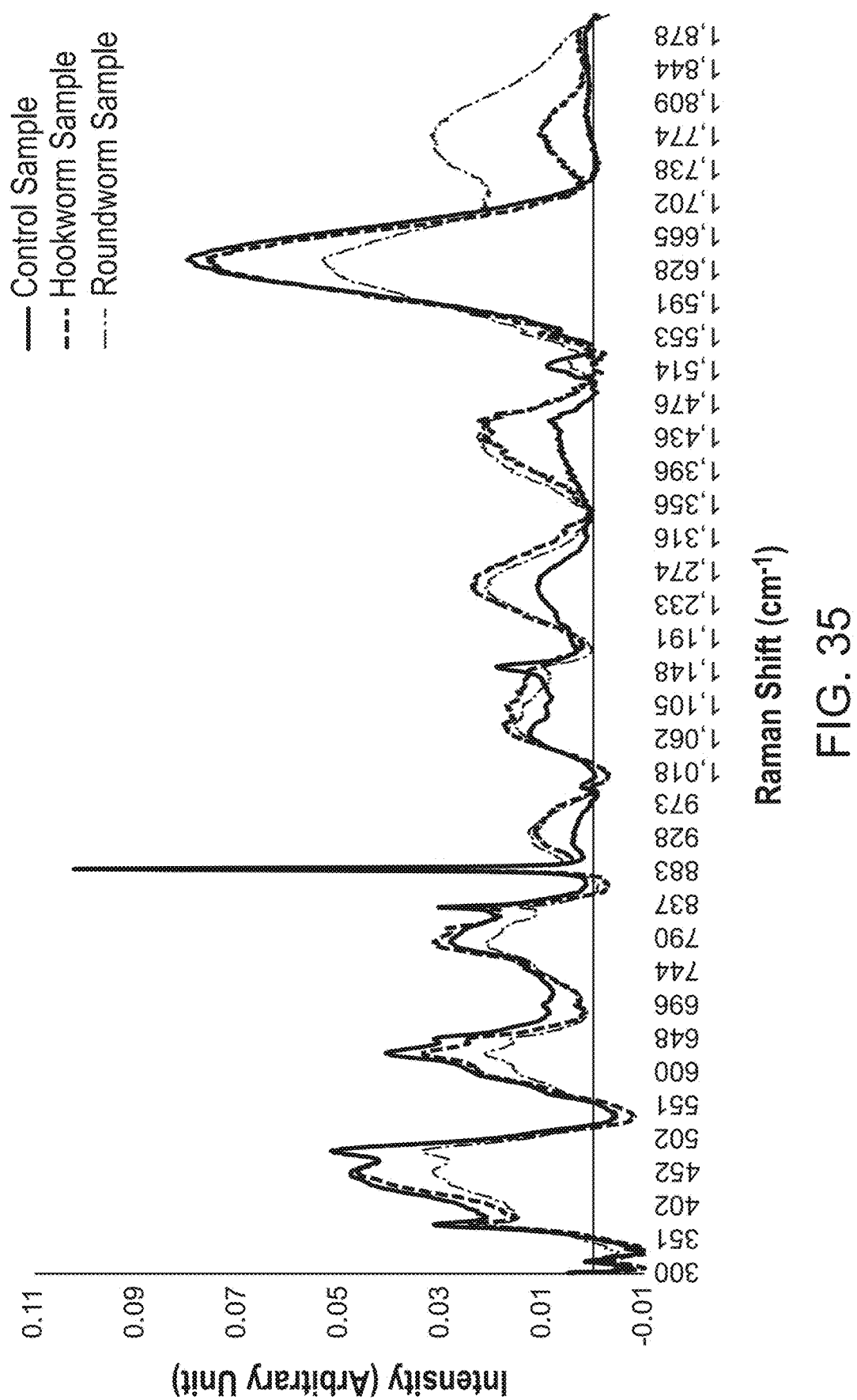
FIG. 35 illustrates exemplary mean Raman spectra of three different fecal samples for detecting the presence or absence of hookworm and roundworm.

FIG. 35 illustrates exemplary mean Raman spectra of the three different fecal samples (the fecal sample containing hookworm eggs, the fecal sample containing roundworm eggs, and the control sample without hookworm or roundworm) prepared by the 19-step procedure described above obtained using Raman spectroscopic system 100. As shown in FIG. 35, one or more Raman bands or Raman peaks contain distinguishing features that enable distinguishing the fecal sample containing hookworm from the fecal sample containing roundworm eggs; and enable distinguishing the fecal samples containing parasites from the control sample without the parasites. For example, the relative heights, slopes, locations, areas, and/or shapes of the various Raman bands or Raman peaks differ with each sample and can be used for distinguishing these three samples. Exemplary Raman bands or Raman peaks include a Raman peak at 607 $cm^{-1}$, corresponding to vibrations associated with glycerol; a Raman peak at 608 $cm^{-1}$, corresponding to vibrations associated with cholesterol; a Raman band of 1540-1680 $cm^{-1}$, corresponding to vibrations associated with Amide carbonyl group and aromatic hydrogens; a Raman peak at 1602 $cm^{-1}$, corresponding to vibrations associated with phenylalanine, $\delta$(C—C), and/or phenylalanine (protein assignment); a Raman peak at 1603 $cm^{-1}$, corresponding to vibrations associated with C—C in-plane bending mode of phenylalanine and tyrosine, and/or vibrations associated with ring C—C stretch of phenyl (1); a Raman peak at 1605 $cm^{-1}$, corresponding to vibrations associated with cytosine ($NH_2$), ring C—C stretch of phenyl (1), phenylalanine, tyrosine, and/or C—C(protein)); a Raman peak at 1606 $cm^{-1}$, corresponding to vibrations associated with C=C bending; a Raman peak at 1608 $cm^{-1}$, corresponding to vibrations associated with Cytosine ($NH_2$).

Figure 36:
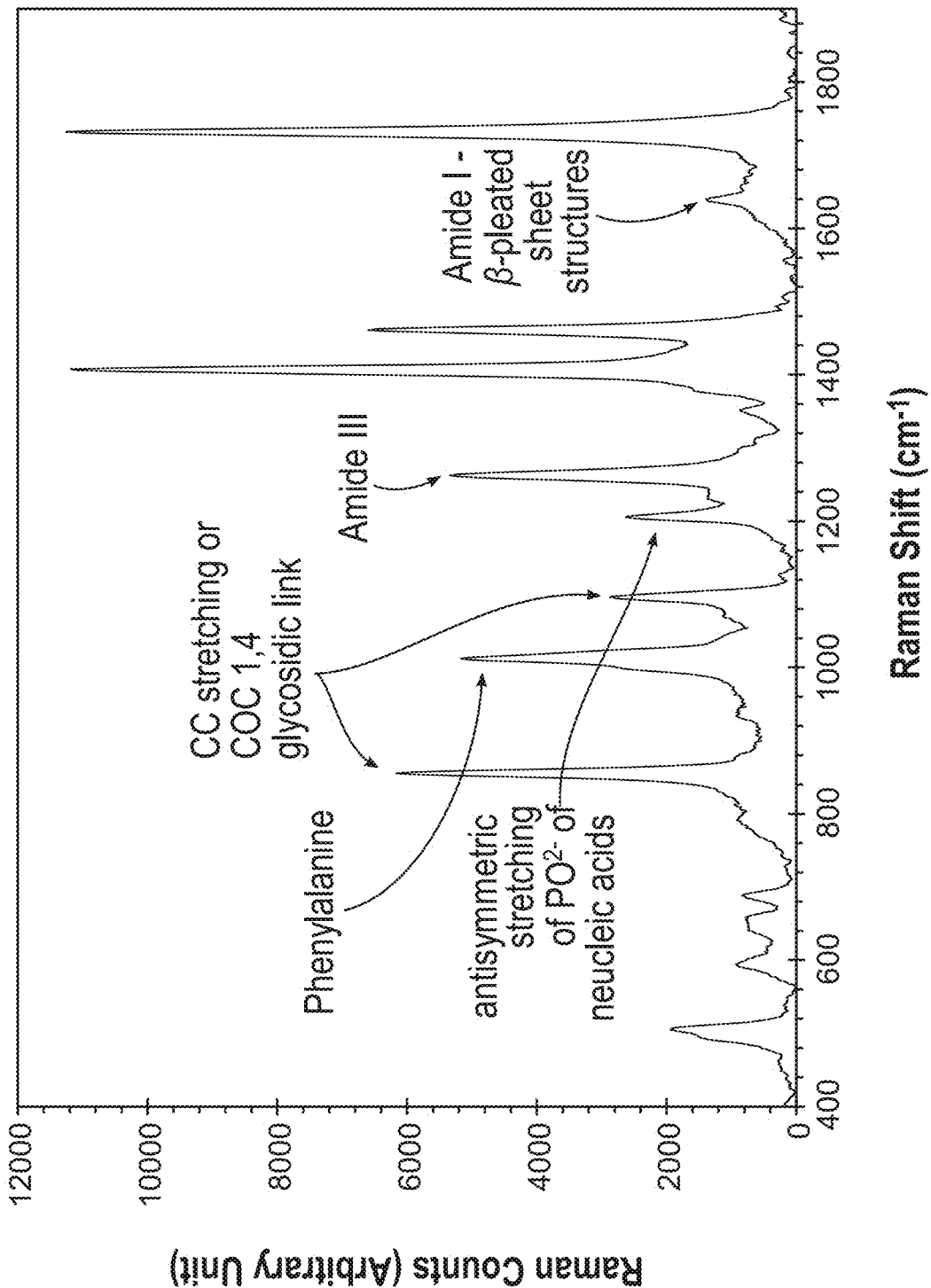
FIG. 36 illustrates an exemplary mean Raman spectrum of a sample containing A/PR/8 (H1N1) serotype influenza virus.

In some exemplary embodiments, Raman spectroscopic system 100 is used to identify and analyze one or more preselected spectral bands of the optical signal received from a sample to assess or detect the presence or absence of a virus of a certain class, order, family, genus, species, and/or for the particular application. Influenza virus continues to be responsible for widespread respiratory disease, deaths, and significant economic loss despite worldwide vaccination and eradication programs. Influenza virus can be classified into three influenza types, Influenza A, Influenza B, and Influenza C, based on the antigenic difference between their internal matrix and nucleocapsid proteins. The strains of influenza A and B viruses include A/PR/8 (H1N1), A/FW/50 (H1N1, A/USSR/77 (H1N1), A/WSN/33 (H1N1), A/Udorn/72 (H3N2), A/Udorn/72 1A spherical variant (H3N2), A/Udorn/72 10A filamentous variant (H3N2), A/Memphis/96 (H3N2), A/Arizona/94 (H3N2, A/Chick/California/2000 (H6N2), B/Beijing/96, and H5N1. FIG. 36 illustrates an exemplary mean Raman spectrum of a sample containing A/PR/8 (H1N1) serotype influenza virus. An excitation wavelength of 514.5 nm was used. As shown in FIG. 36, the Raman spectrum includes characteristic Raman bands or Raman peaks (as indicated by arrows in the figure) associated with the pleated sheet structure amide I group, distinct carbon-carbon, nucleic acids, and other amide groups. At least one feature of at least one of these Raman bands or Raman peaks is indicative of the presence or absence of A/PR/8 (H1N1) serotype influenza virus.

As described herein, Raman spectroscopic system 100 can be used to assess or detect the presence or absence of various types or strains of viruses besides influenza virus, such as human parainfluenza virus types 1, 2 and 3, respiratory syncytial virus (RSV), Adenovirus, or vesicular stomatitis virus (VSV). In some exemplary embodiments, Raman spectroscopic system 100 can used to assess or detect the presence or absence of pseudo type viruses, such as liposomes or virosomes injected with viral proteins or viral nucleic acids.

Figure 37:
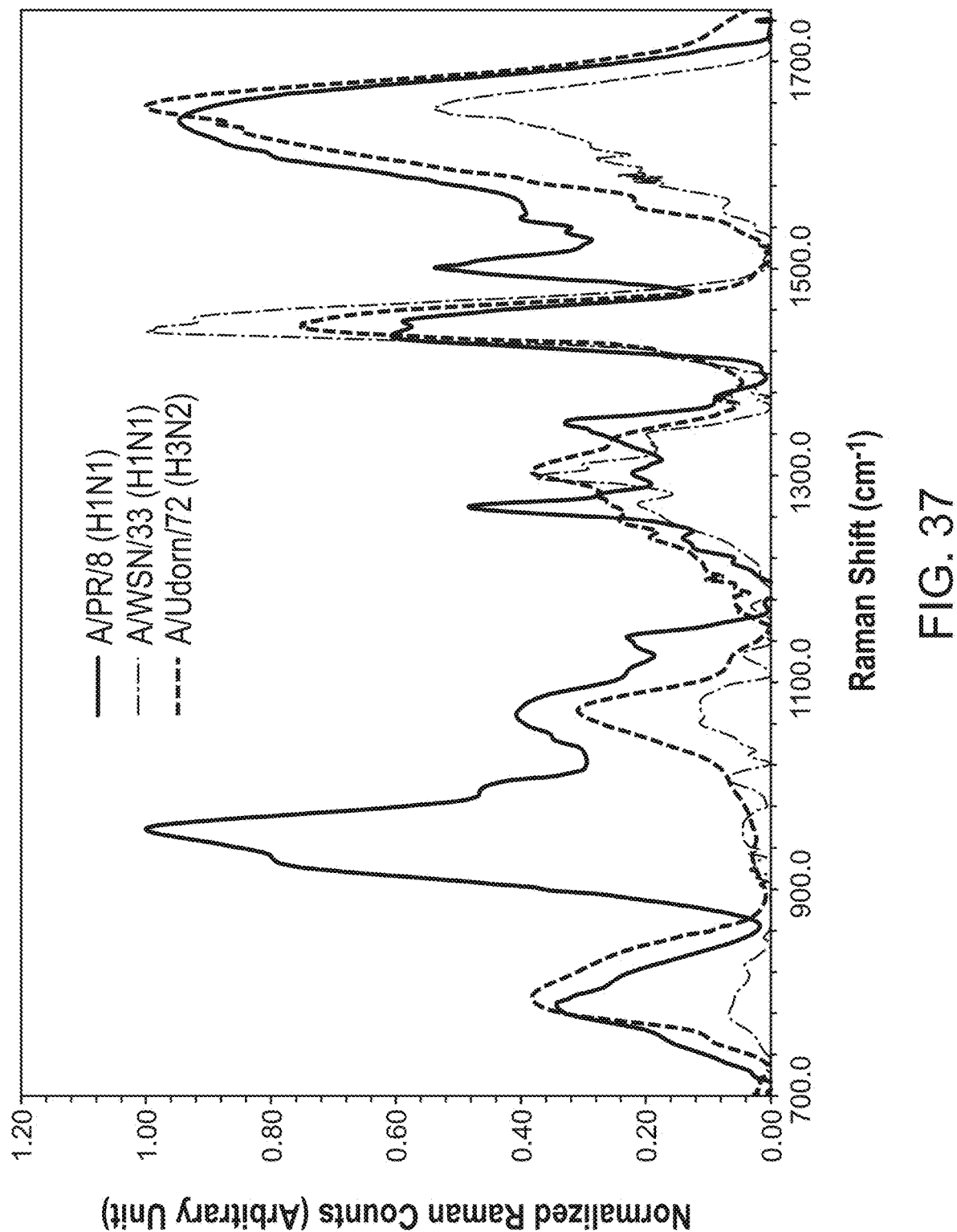
FIG. 37 illustrates three exemplary mean Raman spectrum of three samples containing different strains of influenza viruses.

In some exemplary embodiments, Renishaw in Via Reflex Raman Microscope is used to demonstrate the identification and analysis of one or more preselected spectral bands of the optical signal received from a sample to distinguish different strains of viruses. FIG. 37 illustrates three exemplary mean Raman spectrum of three samples containing different strains of influenza viruses, including a sample containing A/PR/8 (H1N1), a sample containing A/WSN/33 (H1N1), and a sample containing A/Udorn/72 (H3N2). These samples were prepared from purified influenza viruses in phosphate buffer solution. An excitation wavelength of 514.5 nm was used. As shown in FIG. 37, a number of Raman bands or Raman peaks associated with molecular functional groups in the viruses are distinct for these three different samples, and can be used for distinguishing the different strains of viruses in these samples. For example, the relative heights, slopes, areas, shapes, and/or locations of the various Raman bands or Raman peaks differ with each virus strain, which can be used for distinguishing the various strains of viruses from one another. Exemplary Raman bands or Raman peaks for distinguishing virus strains are summarized in Table 3 below.

TABLE 3

Raman bands or Raman peaks of functional groups
for distinguishing virus strains.

| Wavenumber cm$^{-1}$ | Functional Group Assignment |
|---|---|
| 1300-1307 | $CH_2$ deformation (lipid) or $CH_3/CH^2$ twisting lipid or $\delta(CH_2)$ twisting and wagging phospholipids |
| 1328-1330 | Typical phospholipids |
| 1336-1342 | $CH_2/CH_3$ wagging, twisting &/or bending mode of lipids and nucleic acids. |
| 1442-1447 | $CH_2$ bending mode of proteins & lipids |
| 1650 | (C=C) Amide I |
| 2850 | $CH_2$, symmetric stretch lipids, fatty acids |
| 2883 | $CH_2$ asymmetric stretch of lipids and proteins |
| 2933 | $CH_2$ asymmetric stretch |
| 2935 | Chain end $CH_3$ symmetric band |

Figure 38:
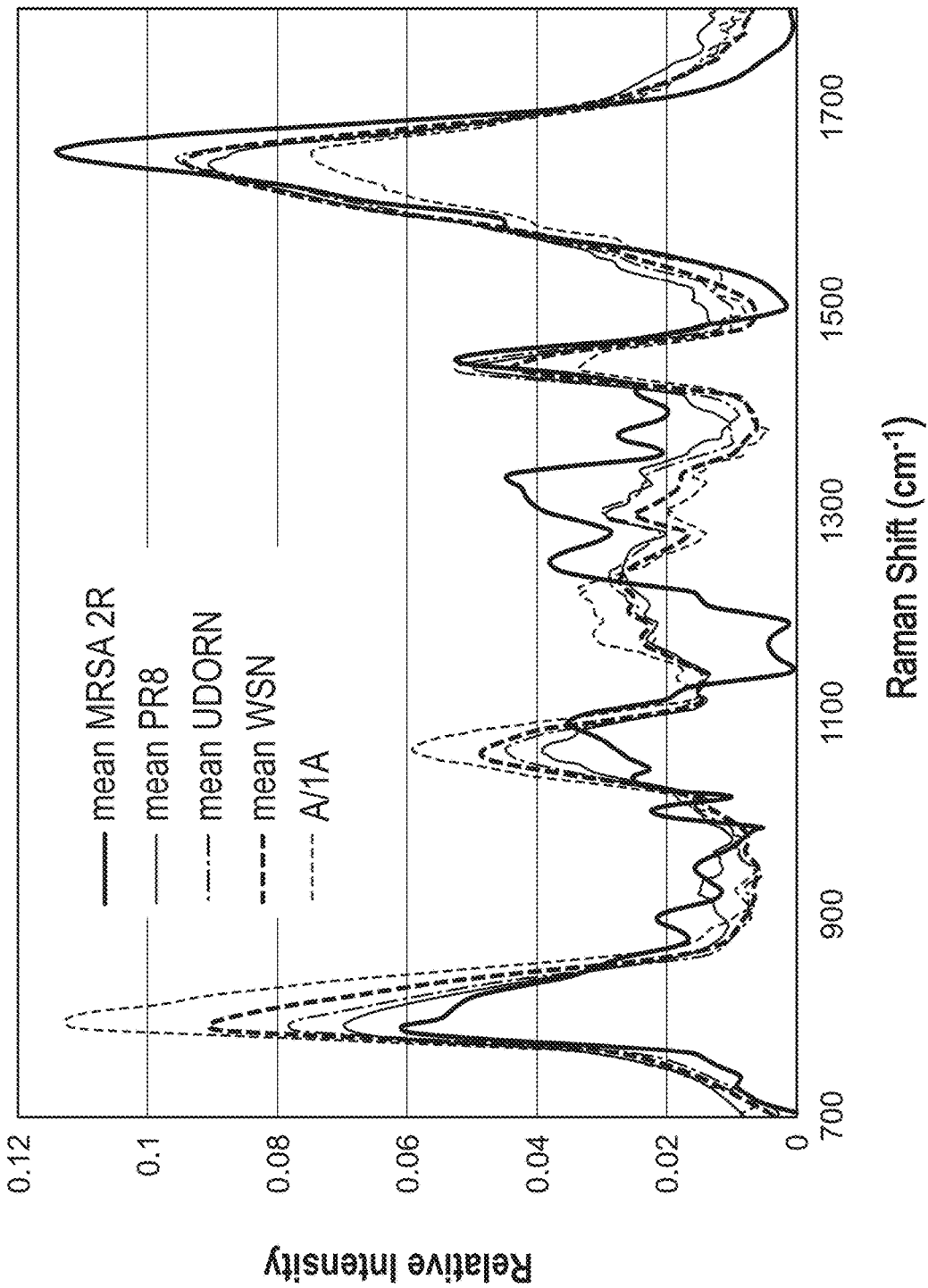
FIG. 38 illustrates five exemplary mean Raman spectra of five samples containing [four] different strains of influenza viruses compared to bacteria.

In some exemplary embodiments, Renishaw in Via Reflex Raman Microscope is used to demonstrate the identification and analysis of one or more preselected spectral bands of the optical signal received from a sample to distinguish viruses from bacteria. FIG. 38 illustrates five exemplary mean Raman spectra of five samples containing different strains of influenza viruses or bacteria, including a sample containing A/PR/8 (H1N1), a sample containing WSN (H1N1), a sample containing Udorn (H3N2), a sample containing PR8, and a sample containing Methicillin-resistant *Staphylococcus aureus* (MRSA 2R). The samples containing viruses were prepared from purified viruses in phosphate buffer solution. The sample containing bacteria was prepared according to the method described above in paragraphs and [0179]. An excitation wavelength of 514.5 nm was used. As shown in FIG. 38, a number of Raman bands or Raman peaks associated with molecular functional groups in the viruses and bacteria are distinct for these five different samples, and can be used for distinguishing the different strains of viruses and for distinguishing each virus strain from the bacteria in these samples. For example, the relative heights, slopes, areas, shapes, and/or locations of the various Raman bands or Raman peaks differ with each virus strain and differ between the virus strains from the bacteria, which can be used for distinguishing the various strains of viruses from one another and for distinguishing the virus strains from the bacteria. Exemplary Raman bands or Raman peaks for distinguishing virus strains and for distinguishing the virus strains from the bacteria are summarized in Table 4 below.

TABLE 4

Raman bands or Raman peaks of functional groups
for distinguishing virus strains and for
distinguishing virus strains from bacteria.

| Wavenumber cm$^{-1}$ | Functional Group Assignment |
|---|---|
| 897 | Monosaccharide |
| 950 | Polysaccharides |
| 1002 | Phenylalanine |
| 1035 | Polysaccharides |
| 1090 | Symmetric phosphate stretching vibrations |
| 1250 | Amide III |
| 1335 | $CH_3CH_2$ twisting and wagging nucleic acids |
| 1337 | Amide III |
| 1379 | $\delta CH_3$ symmetric (lipid assignment) |
| 1451 | $CH_2CH_3$ deformation |
| 1656 | C=C lipids (phospholipids) or Amide I |
| 2850 | $CH_2$, symmetric stretch lipids, fatty acids |
| 2876 | $CH_2$ asymmetric stretch of lipids and proteins |
| 2939 | C—H vibrations in lipids & proteins |

Figure 39:
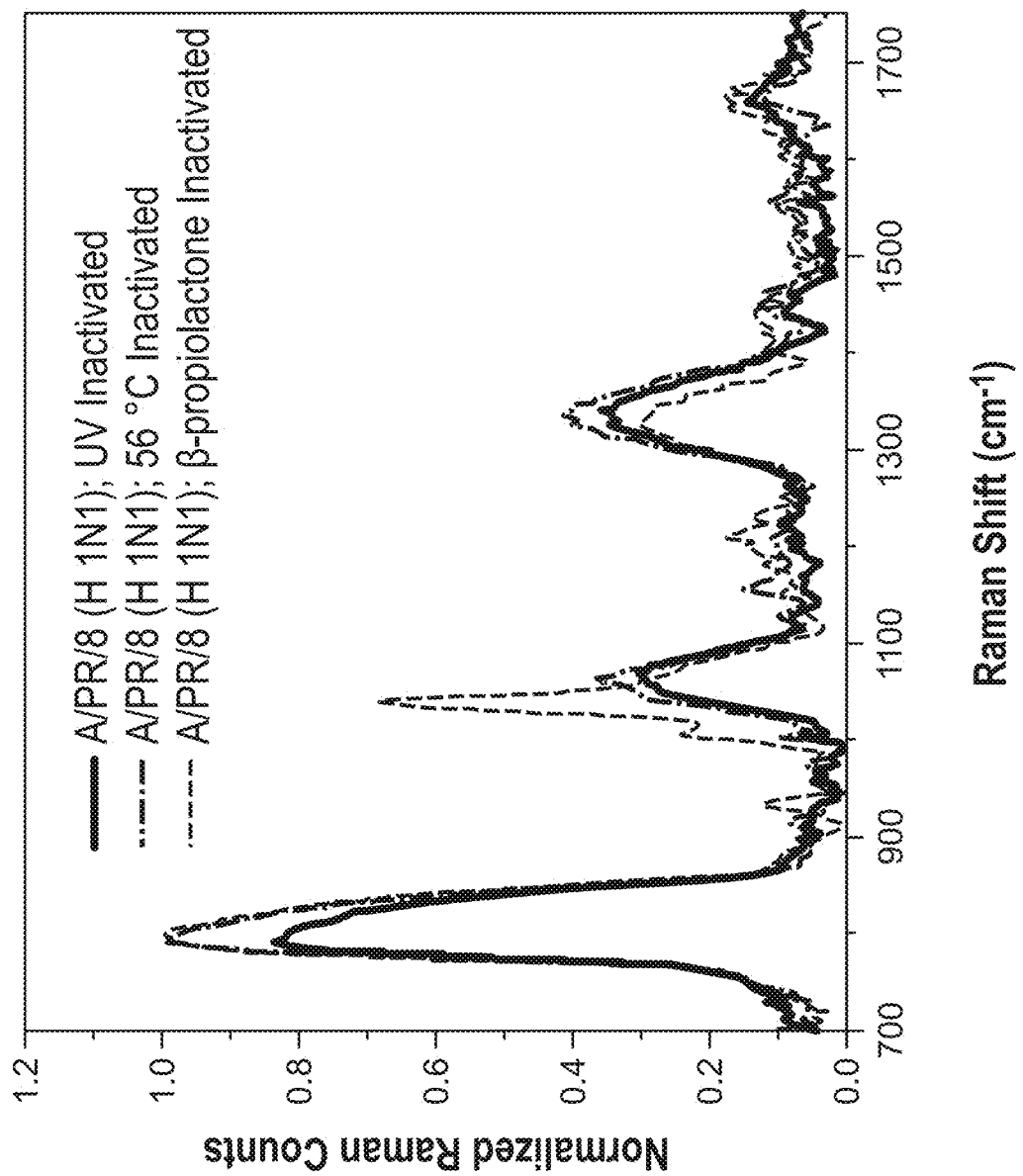
FIG. 39 illustrates three exemplary mean Raman spectra of three dried samples containing same strain of virus inactivated respectively by three distinct methods.

In some exemplary embodiments, Renishaw in Via Reflex Raman Microscope is used to demonstrate the identification and analysis of one or more preselected spectral bands of the optical signal received from a sample to distinguish viruses inactivated by different inactivation methods. FIG. 39 illustrates three exemplary mean Raman spectra of three dried samples containing A/PR/8 (H1N1) inactivated respectively by three distinct methods: UV, heat, and chemical deactivation. An excitation wavelength of 785 nm was used. As shown in FIG. 39, a number of Raman bands or Raman peaks associated with molecular functional groups in A/PR/8 are different for these three different samples. For example, the relative heights, slopes, locations, areas, and/or shapes of the various Raman bands or Raman peaks differ with each sample and can be used for distinguishing these three samples. Exemplary differences are included in the shift of the Raman peak from 1040 to 1080 cm$^{-1}$ and in the shift of the Raman peak located near 1340 cm$^{-1}$. These results indicate that very minor changes, even in the same strain of virus, can be identified by some exemplary embodiments of the present disclosure. Such capability of some exemplary embodiments of the present disclosure may further allow the detection and identification of pseudo type viruses or engineered viruses. Furthermore, such capability of some exemplary embodiments of the present disclosure may be valuable in assessing the virulence and effect of treatment for influenza in the clinical setting.

In some exemplary embodiments, Raman spectroscopic system 100 is used to identify and analyze one or more preselected spectral bands of the optical signal received from a sample to detect target cells, such as white blood cells. There are five different types of white blood cells: neutrophils (45%-73% normal), monocytes (2%-8% normal), lymphocytes (20%-40% normal), eosinophils (0-4% normal), and basophils (0-1% normal). In humans, the concentration of white blood cells in the blood typically ranges from $3.4 \times 10^3$-$10 \times 10^3$ cells/mm$^3$. An increase or decrease from the normal ranges of white blood cell concentration in the blood may be due to infection, disease, and drugs. For example, an abnormal increase of neutrophils in the blood can be due to a bacterial infection, an abnormal increase of eosinophils in the blood can be due to a parasitic infection and a hypersensitivity reaction (drug/allergy), an abnormal increase of basophils in the blood can be due to chronic inflammation and leukemia, an abnormal increase of lymphocytes in the blood can be due to mononucleosis, tuberculosis, syphilis, and viral infection, an abnormal decrease of lymphocytes in the blood can be due to due to HIV infection, radiation, and steroids, and an abnormal increase of monocytes in the blood can occur during recovery from bacterial infection, leukemia, or a disseminated tuberculosis infection. Moreover, an abnormal amount of white blood cells in urine may be due to infection, inflammation, disease, allergies, or drugs. For example, in humans, a concentration of white blood cells in urine greater than 10 cells/mm 3 or 10,000 cells/ml (chamber count method) can be indicative of a bacteria urinary tract infection (UTI). For example, a concentration of neutrophils in urine higher than a threshold can be due to UTI and/or pyelonephritis, a concentration of eosinophils in urine higher than a threshold can be due to acute interstitial nephritis caused by an allergic reaction, typically to drugs, a concentration of lymphocytes in urine higher than a threshold can be due to an inflammation, usually a chronic condition like bladder stones or bladder cancer, or viral diseases, and a concentration of monocytes in urine higher than a threshold can be due to viral infection. An abnormal increase of neutrophils in the blood can be due to viral, bacterial, or fungal infections or stress. An abnormal increase of eosinophils in the blood can be due to parasitic infection and allergic reactions. An abnormal increase of basophils in the blood may indicate bone marrow problems, and when found with an increase of eosinophils may indicate allergies. An abnormal increase of lymphocytes in the blood can be due to autoimmune diseases, such as colitis. An abnormal increase of monocytes in the blood may indicate Leukemia or other types of cancer.

In some exemplary embodiments, Raman spectroscopic system 100 is used to detect the presence of neutrophils or the presence of neutrophils and bacteria in the same sample. Neutrophils are the most common white blood cells observed in urine and are the inflammatory cells seen in cystitis. In some exemplary embodiments, a fresh human peripheral blood neutrophil sample containing 120 million cells in 15 ml of media from Human Cells Biosciences were used. The fresh human peripheral blood neutrophil sample was washed at 1200 rpm for 5 minutes twice to remove the media and diluted to 1 million/mL in PBS buffer at pH 7.2. A sample containing neutrophils was prepared by spiking water with the diluted fresh human peripheral blood neutrophil sample such that the concentration of neutrophils in the sample was 100,000 cells/ml. In these examples, the exemplary system 100, including the spectrometer 120 and cuvette 310, described in paragraph was used. A volume of 5 ml of the sample containing neutrophils was then placed in the cuvette of Raman spectroscopic system 100 for measurement. To prepare the sample containing both neutrophils and bacteria, a bacteria (*Escherichia coli* or *Leptospira interrogans*) pellet (OD=1) obtained using the methods described above in paragraphs and was resuspended in 5 ml water, which was then added with 0.5 mL of 1 million/mL of the diluted fresh human peripheral blood neutrophil sample. A volume of 5 ml of the sample containing both neutrophils and bacteria was then placed in the cuvette of Raman spectroscopic system 100 for measurement.

Figure 40:
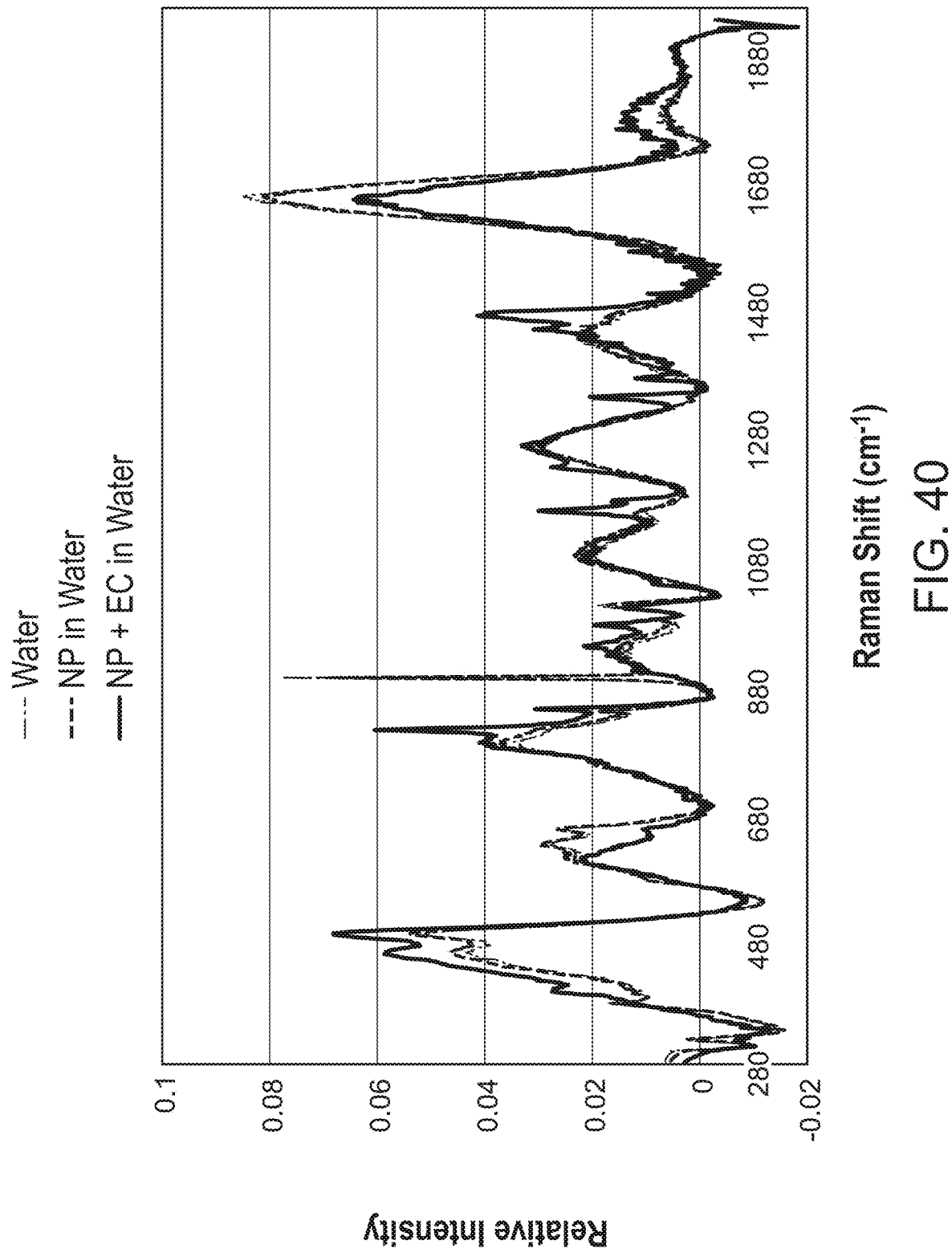
FIG. 40 illustrates three exemplary mean Raman spectra of water, a sample containing neutrophils, a sample containing neutrophils and *Escherichia coli*.
Figure 41:
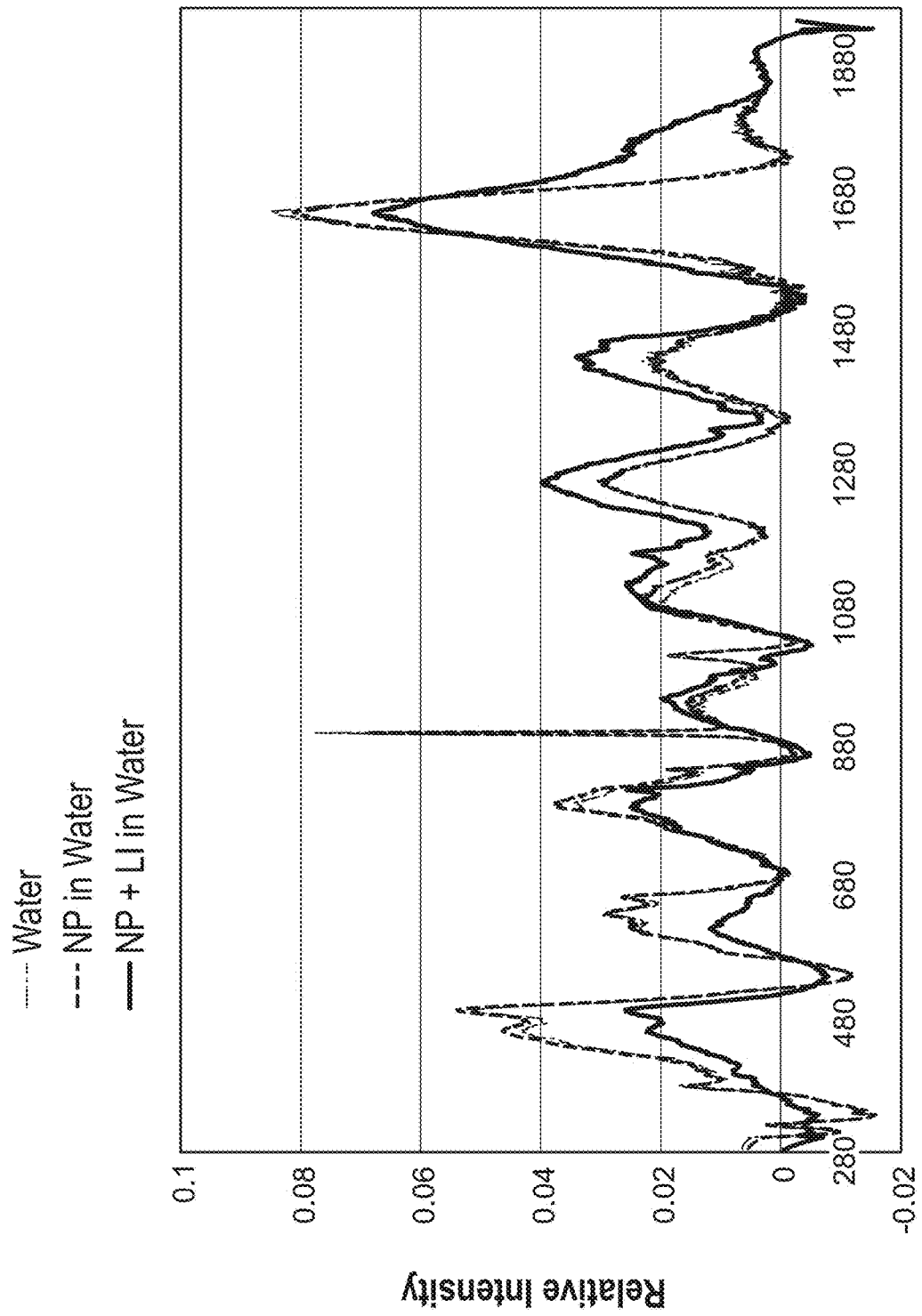
FIG. 41 illustrates three exemplary mean Raman spectra of water, a sample containing neutrophils, a sample containing neutrophils and *Leptospira interrogans*.
Figure 42:
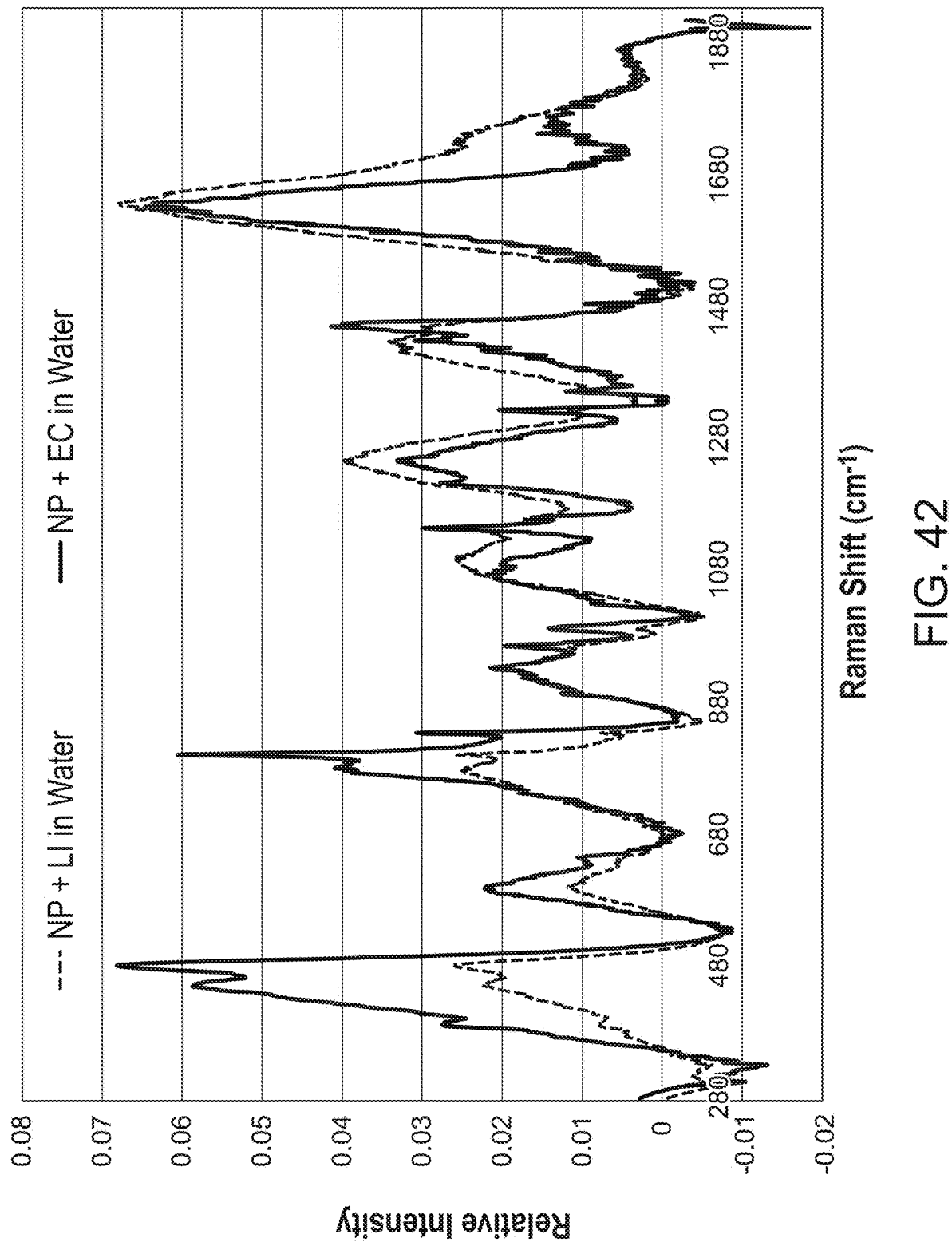
FIG. 42 illustrates two exemplary mean Raman spectra of a sample containing neutrophils and *Escherichia coli* and a sample containing neutrophils and *Leptospira interrogans*.

FIG. 40 illustrates three exemplary mean Raman spectra of water, a sample containing neutrophils, and a sample containing neutrophils and *Escherichia coli*. FIG. 41 illustrates three exemplary mean Raman spectra of water, a sample containing neutrophils, and a sample containing neutrophils and *Leptospira interrogans*. FIG. 42 illustrates two exemplary mean Raman spectra of a sample containing neutrophils and *Escherichia coli* and a sample containing neutrophils and *Leptospira interrogans*. As shown in FIGS. 40 and 41, a number of Raman bands or Raman peaks associated with molecular functional groups in the neutrophils and bacteria are distinct for these three different samples, and can be used for distinguishing the three different samples and detecting the presence of only neutrophils and the presence of both neutrophils and bacteria in these samples. For example, the relative heights, shapes, areas, slopes, and/or location of the various Raman bands or Raman peaks differ with each sample and can be used for distinguishing these samples. Moreover, as shown in FIG. 42, a number of Raman bands or Raman peaks associated with molecular functional groups in bacteria are distinct for *Escherichia coli* and *Leptospira interrogans*, and can be used to determine what type of bacteria is in the sample. Such capability is useful for determining the type of bacterial infection and the suitable treatment when the presence of neutrophils has been detected. Any one or more exemplary Raman bands or Raman peaks that can be used in exemplary embodiments of detecting the presence or absence of neutrophils and/or bacteria include a Raman peak at 416.42 cm$^{-1}$, corresponding to vibrations associated with fatty acid; a Raman peak at 431.60 cm$^{-1}$, corresponding to vibrations associated with carboxylic acid; a Raman peak at 1105.05 cm$^{-1}$, corresponding to vibrations associated with carbohydrate or lipid; a Raman peak at 437.28 cm$^{-1}$, corresponding to vibrations associated with saccharide; a Raman peak at 408.82 cm$^{-1}$, corresponding to vibrations associated with saccharide; a Raman peak at 435.38 cm$^{-1}$, corresponding to vibrations associated with carboxylic acid; a Raman peak at 435.38 cm$^{-1}$, corresponding to vibrations associated with carboxylic acid; a Raman peak at 427.81 cm$^{-1}$, corresponding to vibrations associated with saccharide; a Raman peak at 433.49 cm$^{-1}$, corresponding to vibrations associated with fatty acid; and a Raman peak at 433.49 cm$^{-1}$, corresponding to vibrations associated with amino acid.

In some exemplary embodiments, the excitation light source 110 of Raman spectroscopic system 100 could be a laser having a wavelength of 532.02 nm. The transmission grating 126 of Raman spectroscopic system 100 could have a line density of 2650 lines/mm, an operational wavelength range of 540.173 nm to 592.629 nm, a diffraction efficiency of approximately 60% to 80% with an average diffraction efficiency of approximately 65% in the operational wavelength range, and an angle of incidence of 48.816 degrees at a center wavelength of 568 nm for first order diffraction. The collimating element 124 and the focusing element 128 could have a focal length of 135 mm and an f-number in the range of F/1.2 to F/4. The detector 130 could be a deep cooled back thinned CCD having an array of 2048×70 pixels, a pixel size of 14 μm×14 μm, and an image area of 28.7 mm by 0.98 mm. In these examples, spectrometer 120 of Raman spectroscopic system 100 could have a preselected spectral band of 540.173 nm to 592.629 nm, or alternatively represented as a preselected spectral band of 283.69 cm$^{-1}$ to 1922.33 cm$^{-1}$ based on the excitation wavelength of 532.02 nm, an average transfer efficiency of 65% over the preselected spectral band, a spectral resolution of 1.43 cm$^{-1}$ at the center wavelength of 568 nm, a spectral resolution from 1.31 cm$^{-1}$ to 1.58 cm$^{-1}$ for different wavelengths of the preselected spectral band with an average spectral resolution of 1.43 cm$^{-1}$ of all the wavelengths of the preselected spectral band over the 2048 pixels of the CCD array, a path length from the focusing element 128 to the detector 130 of 13.5 cm, and a width of the entrance aperture 122 of 25 μm. The performance ratio of the spectrometer 120 could be 4.8%·cm$^{-1}$, which is the ratio between the 65% average transfer efficiency and the 13.5 cm path length of the spectrometer 120. The performance product of the spectrometer 120 could be 26, which is the product of the 2 cm$^{-1}$ average spectral resolution and the 13.5 cm path length of the spectrometer 120.

In some exemplary embodiments, the excitation light source 110 of Raman spectroscopic system 100 could be a laser having a wavelength of 488 nm. The transmission grating 126 of Raman spectroscopic system 100 could have a line density of 2650 lines/mm, an operational wavelength range of 540.173 nm to 592.629 nm, a diffraction efficiency of approximately 60% to 80% with an average diffraction efficiency of approximately 65% in the operational wavelength range, and an angle of incidence of 48.816 degrees at a center wavelength of 568 nm for first order diffraction. The collimating element 124 and the focusing element 128 could have a focal length of 135 mm and an f-number in the range from F/1.2 to F/4. The detector 130 could be a deep cooled back thinned CCD having an array of 2048×70 pixels, a pixel size of 14 μm×14 μm, and an image area of 28.7 mm by 0.98 mm. In these examples, spectrometer 120 of Raman spectroscopic system 100 could have a preselected spectral band of 540.173 nm to 592.629 nm, or alternatively represented as a preselected spectral band of 1979.2 cm$^{-1}$ to 3617.8 cm$^{-1}$ based on the excitation wavelength of 488 nm, an average transfer efficiency of 65% over the preselected spectral band, a spectral resolution of 1.43 cm$^{-1}$ at the center wavelength of 568 nm, a spectral resolution from 1.31 cm$^{-1}$ to 1.58 cm$^{-1}$ for different wavelengths of the preselected spectral band with an average spectral resolution of 1.43 cm$^{-1}$ of all the wavelengths of the preselected spectral band over the 2048 pixels of the CCD array, a path length from the focusing element 128 to the detector 130 of 13.5 cm, and a width of the entrance aperture 122 of 25 µm. The performance ratio of the spectrometer 120 could be 4.8%·cm$^{-1}$, which is the ratio between the 65% average transfer efficiency and the 13.5 cm path length of the spectrometer 120. The performance product of the spectrometer 120 could be 19.31, which is the product of the 1.43 cm$^{-1}$ average spectral resolution and the 13.5 cm path length of the spectrometer 120.

As indicated in the two paragraphs above, in some exemplary embodiments, the specifications for the various optical components of Raman spectroscopic system 100 remain the same when the excitation wavelength is 488 nm or 532 nm. Thus, in some exemplary embodiments, Raman spectroscopic system 100 could have the 488 nm laser and the 532.02 nm laser as two separate excitation light sources to allow the spectrometer 120 to acquire spectra in both the preselected spectral band of 1979.2 cm$^{-1}$ to 3617.8 cm$^{-1}$ and the preselected spectral band of 283.69 cm$^{-1}$ to 1922.33 cm$^{-1}$. In certain of these exemplary embodiments, the sample is excited sequentially at the excitation wavelength of 488 nm and the excitation wavelength of 532.02 nm separately (or vice versa). The spectra acquired in each of the preselected spectral bands are combined into a single spectrum spanning 283.69 cm$^{-1}$ to 1922.33 cm$^{-1}$ and 1979.2 cm$^{-1}$ to 3617.8 cm$^{-1}$. In certain other exemplary embodiments, the Raman spectroscopic system 100 can have other combinations of multiple excitation light sources having different excitation wavelengths. The multiple excitation light sources can be used to sequentially excite a sample to acquire spectra in multiple preselected spectral bands, which can be combined into a single spectrum.

In some exemplary embodiments, the excitation light source 110 of Raman spectroscopic system 100 could be a laser having a wavelength of 514.5 nm. The transmission grating 126 of Raman spectroscopic system 100 could have a line density of 2747 lines/mm, an operational wavelength range of 521.2 nm to 571.8 nm, a diffraction efficiency of approximately 60% to 80% with an average diffraction efficiency of approximately 65% in the operational wavelength range, and an angle of incidence of 48.823 degrees at a center wavelength of 548 nm for first order diffraction. The collimating element 124 and the focusing element 128 could have a focal length of 135 mm and an f-number in the range of F/1.2 to F/4. The detector 130 could be a deep cooled back thinned CCD having an array of 2048×70 pixels, a pixel size of 14 µm×14 µm, and an image area of 28.7 mm by 0.98 mm. In these examples, spectrometer 120 of Raman spectroscopic system 100 could have a preselected spectral band of 521.2 nm to 571.8 nm, or alternatively represented as a preselected spectral band of 248.32 cm$^{-1}$ to 1946.4 cm$^{-1}$ based on the excitation wavelength of 514.5 nm, an average transfer efficiency of 65% over the preselected spectral band, a spectral resolution of 1.48 cm$^{-1}$ at the center wavelength of 548 nm, a spectral resolution from 1.36 cm$^{-1}$ to 1.63 cm$^{-1}$ for different wavelengths of the preselected spectral band with an average spectral resolution of 1.48 cm$^{-1}$ of all the wavelengths of the preselected spectral band over the 2048 pixels of the CCD array, a path length from the focusing element 128 to the detector 130 of 13.5 cm, and a width of the entrance aperture 122 of 25 µm. The performance ratio of the spectrometer 120 could be 4.8%·cm$^{-1}$, which is the ratio between the 65% average transfer efficiency and the 13.5 path length of the spectrometer 120. The performance product of the spectrometer 120 could be 19.98, which is the product of the 1.48 cm$^{-1}$ average spectral resolution and the 13.5 cm path length of the spectrometer 120.

In some exemplary embodiments, the excitation light source 110 of Raman spectroscopic system 100 could be a laser having a wavelength of 473 nm. The transmission grating 126 of Raman spectroscopic system 100 could have a line density of 2747 lines/mm, an operational wavelength range of 521.2 nm to 571.8 nm, a diffraction efficiency of approximately 60% to 80% with an average diffraction efficiency of approximately 65% in the operational wavelength range, and an angle of incidence of 48.823 degrees at a center wavelength of 548 nm for first order diffraction. The collimating element 124 and the focusing element 128 could have a focal length of 135 mm and an f-number in the range of F/1.2 to F/4. The detector 130 could be a deep cooled back thinned CCD having an array of 2048×70 pixels, a pixel size of 14 µm×14 µm, and an image area of 28.7 mm by 0.98 mm. In these examples, spectrometer 120 of Raman spectroscopic system 100 could have a preselected spectral band of 521.2 nm to 571.8 nm, or alternatively represented as a preselected spectral band of 1953.6 cm$^{-1}$ to 3651.7 cm$^{-1}$ based on the excitation wavelength of 473 nm, an average transfer efficiency of 65% over the preselected spectral band, a spectral resolution of 1.48 cm$^{-1}$ at the center wavelength of 548 nm, a spectral resolution from 1.36 cm$^{-1}$ to 1.63 cm$^{-1}$ for different wavelengths of the preselected spectral band with an average spectral resolution of 1.48 cm$^{-1}$ of all the wavelengths of the preselected spectral band over the 2048 pixels of the CCD array, a path length from the focusing element 128 to the detector 130 of 13.5 cm, and a width of the entrance aperture 122 of 25 µm. The performance ratio of the spectrometer 120 could be 4.8%·cm$^{-1}$, which is the ratio between the 65% average transfer efficiency and the 13.5 path length of the spectrometer 120. The performance product of the spectrometer 120 could be 19.98, which is the product of the 1.48 cm$^{-1}$ average spectral resolution and the 13.5 cm path length of the spectrometer 120. In some exemplary embodiments, Raman spectroscopic system 100 could have the 514.5 nm laser and the 473 nm laser as two separate excitation light sources 110 to allow the spectrometer 120 to acquire spectra in both the preselected spectral band of 248.32 cm$^{-1}$ to 1946.4 cm$^{-1}$ and the preselected spectral band of 1953.6 cm$^{-1}$ to 3651.7 cm$^{-1}$.

In some exemplary embodiments, the excitation light source 110 of Raman spectroscopic system 100 could be a laser having a wavelength of 638 nm. The transmission grating 126 of Raman spectroscopic system 100 could have a line density of 2178 lines/mm, an operational wavelength range of 657.1 nm to 720.97 nm, a diffraction efficiency of approximately 60% to 80% with an average diffraction efficiency of approximately 65% in the operational wavelength range, and an angle of incidence of 48.807 degrees at a center wavelength of 691 nm for first order diffraction. The collimating element 124 and the focusing element 128 could have a focal length of 135 mm and an f-number in the range of F/1.2 to F/4. The detector 130 could be a deep cooled back thinned CCD having an array of 2048×70 pixels, a pixel size of 14 µm×14 µm, and an image area of 28.7 mm by 0.98 mm. In these examples, spectrometer 120 of Raman spectroscopic system 100 could have a preselected spectral band of 657.1 nm to 720.97 nm, or alternatively represented as a preselected spectral band of 456.4 $cm^{-1}$ to 1803.8 $cm^{-1}$ based on the excitation wavelength of 638 nm, an average transfer efficiency of 65% over the preselected spectral band, a spectral resolution of 1.17 $cm^{-1}$ at the center wavelength of 691 nm, a spectral resolution from 1.08 $cm^{-1}$ to 1.30 $cm^{-1}$ for different wavelengths of the preselected spectral band with an average spectral resolution of 1.18 $cm^{-1}$ of all the wavelengths of the preselected spectral band over the 2048 pixels of the CCD array, a path length from the focusing element 128 to the detector 130 of 13.5 cm, and a width of the entrance aperture 122 of 25 µm. The performance ratio of the spectrometer 120 could be 4.8%·$cm^{-1}$, which is the ratio between the 65% average transfer efficiency and the 13.5 cm path length of the spectrometer 120. The performance product of the spectrometer 120 could be 15.93, which is the product of the 2 $cm^{-1}$ average spectral resolution and the 13.5 cm path length of the spectrometer 120.

In some exemplary embodiments, the excitation light source 110 of Raman spectroscopic system 100 could be a laser having a wavelength of 589 nm. The transmission grating 126 of Raman spectroscopic system 100 could have a line density of 2178 lines/mm, an operational wavelength range of 657.1 nm to 720.97 nm, a diffraction efficiency of approximately 60% to 80% with an average diffraction efficiency of approximately 65% in the operational wavelength range, and an angle of incidence of 48.807 degrees at a center wavelength of 691 nm for first order diffraction. The collimating element 124 and the focusing element 128 could have a focal length of 135 mm and an f-number in the range of F/1.2 to F/4. The detector 130 could be a deep cooled back thinned CCD having an array of 2048×70 pixels, a pixel size of 14 µm×14 µm, and an image area of 28.7 mm by 0.98 mm. In these examples, spectrometer 120 of Raman spectroscopic system 100 could have a preselected spectral band of 657.1 nm to 720.97 nm, or alternatively represented as a preselected spectral band of 1760.4 $cm^{-1}$ to 3107.8 $cm^{-1}$ based on the excitation wavelength of 638 nm, an average transfer efficiency of 65% over the preselected spectral band, a spectral resolution of 1.17 $cm^{-1}$ at the center wavelength of 691 nm, a spectral resolution from 1.08 $cm^{-1}$ to 1.30 $cm^{-1}$ for different wavelengths of the preselected spectral band with an average spectral resolution of 1.18 $cm^{-1}$ of all the wavelengths of the preselected spectral band over the 2048 pixels of the CCD array, a path length from the focusing element 128 to the detector 130 of 13.5 cm, and a width of the entrance aperture 122 of 25 µm. The performance ratio of the spectrometer 120 could be 4.8%·$cm^{-1}$, which is the ratio between the 65% average transfer efficiency and the 13.5 cm path length of the spectrometer 120. The performance product of the spectrometer 120 could be 15.93, which is the product of the 1.18 $cm^{-1}$ average spectral resolution and the 13.5 cm path length of the spectrometer 120. In some exemplary embodiments, Raman spectroscopic system 100 could have the 638 nm laser and the 589 nm laser as two separate excitation light sources 110 to allow the spectrometer 120 to acquire spectra in both the preselected spectral band of 456.4 $cm^{-1}$ to 1803.8 $cm^{-1}$ and the preselected spectral band of 1760.4 $cm^{-1}$ to 3107.8 $cm^{-1}$.

In some exemplary embodiments, the excitation light source 110 of Raman spectroscopic system 100 could be a laser having a wavelength of 514.5 nm. The transmission grating 126 of Raman spectroscopic system 100 could have a line density of 2704 lines/mm, an operational wavelength range of 520.23 nm to 572.67 nm, a diffraction efficiency of approximately 60% to 80% with an average diffraction efficiency of approximately 65% in the operational wavelength range, and an angle of incidence of 47.8 degrees at a center wavelength of 548 nm for first order diffraction. The collimating element 124 and the focusing element 128 could have a focal length of 135 mm and an f-number in the range of F/1.2 to F/4. The detector 130 could be a deep cooled back thinned CCD having an array of 2048×70 pixels, a pixel size of 14 µm×14 µm, and an image area of 28.7 mm by 0.98 mm. In these examples, spectrometer 120 of Raman spectroscopic system 100 could have a preselected spectral band of 520.23 nm to 572.67 nm, or alternatively represented as a preselected spectral band of 214.4 $cm^{-1}$ to 1974.4 $cm^{-1}$ based on the excitation wavelength of 514.5 nm, an average transfer efficiency of 65% over the preselected spectral band, a spectral resolution of 1.53 $cm^{-1}$ at the center wavelength of 548 nm, a spectral resolution from 1.40 $cm^{-1}$ to 1.70 $cm^{-1}$ for different wavelengths of the preselected spectral band with an average spectral resolution of 1.54 $cm^{-1}$ of all the wavelengths of the preselected spectral band over the 2048 pixels of the CCD array, a path length from the focusing element 128 to the detector 130 of 13.5 cm, and a width of the entrance aperture 122 of 25 µm. The performance ratio of the spectrometer 120 could be 4.8%·$cm^{-1}$, which is the ratio between the 65% average transfer efficiency and the 13.5 cm path length of the spectrometer 120. The performance product of the spectrometer 120 could be 20.79, which is the product of the 1.54 $cm^{-1}$ average spectral resolution and the 13.5 cm path length of the spectrometer 120.

In some exemplary embodiments, the excitation light source 110 of Raman spectroscopic system 100 could be a laser having a wavelength of 488 nm. The transmission grating 126 of Raman spectroscopic system 100 could have a line density of 2786 lines/mm, an operational wavelength range of 490.3 nm to 542.8 nm, a diffraction efficiency of approximately 60% to 80% with an average diffraction efficiency of approximately 65% in the operational wavelength range, and an angle of incidence of 46.185 degrees at a center wavelength of 518 nm for first order diffraction. The collimating element 124 and the focusing element 128 could have a focal length of 135 mm and an f-number in the range of F/1.2 to F/4. The detector 130 could be a deep cooled back thinned CCD having an array of 2048×70 pixels, a pixel size of 14 µm×14 µm, and an image area of 28.7 mm by 0.98 mm. In these examples, spectrometer 120 of Raman spectroscopic system 100 could have a preselected spectral band of 490.3 nm to 542.8 nm, or alternatively represented as a preselected spectral band of 96.5 $cm^{-1}$ to 2067.8 $cm^{-1}$ based on the excitation wavelength of 488 nm, an average transfer efficiency of 65% over the preselected spectral band, a spectral resolution of 1.715 $cm^{-1}$ at the center wavelength of 518 nm, a spectral resolution from 1.56 $cm^{-1}$ to 1.91 $cm^{-1}$ for different wavelengths of the preselected spectral band with an average spectral resolution of 1.72 $cm^{-1}$ of all the wavelengths of the preselected spectral band over the 2048 pixels of the CCD array, a path length from the focusing element 128 to the detector 130 of 13.5 cm, and a width of the entrance aperture 122 of 25 µm. The performance ratio of the spectrometer 120 could be 4.8%·$cm^{-1}$, which is the ratio between the 65% average transfer efficiency and the 13.5 cm path length of the spectrometer 120. The performance product of the spectrometer 120 could be 23.22, which is the product of the 1.72 $cm^{-1}$ average spectral resolution and the 13.5 cm path length of the spectrometer 120.

In some exemplary embodiments, the excitation light source 110 of Raman spectroscopic system 100 could be a laser having a wavelength of 638 nm. The transmission grating 126 of Raman spectroscopic system 100 could have a line density of 2343 lines/mm, an operational wavelength range of 665.8 nm to 718.3 nm, a diffraction efficiency of approximately 60% to 80% with an average diffraction efficiency of approximately 65% in the operational wavelength range, and an angle of incidence of 54.39 degrees at a center wavelength of 694 nm for first order diffraction. The collimating element 124 and the focusing element 128 could have a focal length of 135 mm and an f-number in the range of F/1.2 to F/4. The detector 130 could be a deep cooled back thinned CCD having an array of 2048×70 pixels, a pixel size of 14 μm×14 μm, and an image area of 28.7 mm by 0.98 mm. In these examples, spectrometer 120 of Raman spectroscopic system 100 could have a preselected spectral band of 665.8 nm to 718.3 nm, or alternatively represented as a preselected spectral band of 654.8 $cm^{-1}$ to 1751.8 $cm^{-1}$ based on the excitation wavelength of 638 nm, an average transfer efficiency of 65% over the preselected spectral band, a spectral resolution of 0.96 $cm^{-1}$ at the center wavelength of 694 nm, a spectral resolution from 0.89 $cm^{-1}$ to 1.03 $cm^{-1}$ for different wavelengths of the preselected spectral band with an average spectral resolution of 0.96 $cm^{-1}$ of all the wavelengths of the preselected spectral band over the 2048 pixels of the CCD array, a path length from the focusing element 128 to the detector 130 of 13.5 cm, and a width of the entrance aperture 122 of 25 μm. The performance ratio of the spectrometer 120 could be 4.8%·$cm^{-1}$, which is the ratio between the 65% average transfer efficiency and the 13.5 cm path length of the spectrometer 120. The performance product of the spectrometer 120 could be 12.96, which is the product of the 0.96 $cm^{-1}$ average spectral resolution and the 13.5 cm path length of the spectrometer 120.

In some exemplary embodiments, the excitation light source 110 of Raman spectroscopic system 100 could be a laser having a wavelength of 514.5 nm. The transmission grating 126 of Raman spectroscopic system 100 could have a line density of 2789 lines/mm, an operational wavelength range of 522.05 nm to 570.87 nm, a diffraction efficiency of approximately 60% to 80% with an average diffraction efficiency of approximately 65% in the operational wavelength range, and an angle of incidence of 49.83 degrees at a center wavelength of 548 nm for first order diffraction. The collimating element 124 and the focusing element 128 could have a focal length of 135 mm and an f-number in the range of F/1.2 to F/4. The detector 130 could be a deep cooled back thinned CCD having an array of 2048×70 pixels, a pixel size of 14 μm×14 μm, and an image area of 28.7 mm by 0.98 mm. In these examples, spectrometer 120 of Raman spectroscopic system 100 could have a preselected spectral band of 522.05 nm to 570.87 nm, or alternatively represented as a preselected spectral band of 280.97 $cm^{-1}$ to 1919.18 $cm^{-1}$ based on the excitation wavelength of 514.5 nm, an average transfer efficiency of 65% over the preselected spectral band, a spectral resolution of 1.43 $cm^{-1}$ at the center wavelength of 548 nm, a spectral resolution from 1.31 $cm^{-1}$ to 1.57 $cm^{-1}$ for different wavelengths of the preselected spectral band with an average spectral resolution of 1.43 $cm^{-1}$ of all the wavelengths of the preselected spectral band over the 2048 pixels of the CCD array, a path length from the focusing element 128 to the detector 130 of 13.5 cm, and a width of the entrance aperture 122 of 25 μm. The performance ratio of the spectrometer 120 could be 4.8%·$cm^{-1}$, which is the ratio between the 65% average transfer efficiency and the 13.5 cm path length of the spectrometer 120. The performance product of the spectrometer 120 could be 19.31, which is the product of the 1.43 $cm^{-1}$ average spectral resolution and the 13.5 cm path length of the spectrometer 120.

In some exemplary embodiments, the excitation light source 110 of Raman spectroscopic system 100 could be a laser having a wavelength of 488 nm. The transmission grating 126 of Raman spectroscopic system 100 could have a line density of 3018 lines/mm, an operational wavelength range of 494.73 nm to 538.36 nm, a diffraction efficiency of approximately 60% to 80% with an average diffraction efficiency of approximately 65% in the operational wavelength range, and an angle of incidence of 51.41 degrees at a center wavelength of 518.1 nm for first order diffraction. The collimating element 124 and the focusing element 128 could have a focal length of 135 mm and an f-number in the range of F/1.2 to F/4. The detector 130 could be a deep cooled back thinned CCD having an array of 2048×70 pixels, a pixel size of 14 μm×14 μm, and an image area of 28.7 mm by 0.98 mm. In these examples, spectrometer 120 of Raman spectroscopic system 100 could have a preselected spectral band of 494.73 nm to 538.36 nm, or alternatively represented as a preselected spectral band of 283.05 $cm^{-1}$ to 1919.97 $cm^{-1}$ based on the excitation wavelength of 488 nm, an average transfer efficiency of 65% over the preselected spectral band, a spectral resolution of 1.43 $cm^{-1}$ at the center wavelength of 518 nm, a spectral resolution from 1.31 $cm^{-1}$ to 1.57 $cm^{-1}$ for different wavelengths of the preselected spectral band with an average spectral resolution of 1.43 $cm^{-1}$ of all the wavelengths of the preselected spectral band over the 2048 pixels of the CCD array, a path length from the focusing element 128 to the detector 130 of 13.5 cm, and a width of the entrance aperture 122 of 25 μm. The performance ratio of the spectrometer 120 could be 4.8%·$cm^{-1}$, which is the ratio between the 65% average transfer efficiency and the 13.5 cm path length of the spectrometer 120. The performance product of the spectrometer 120 could be 19.31, which is the product of the 1.43 $cm^{-1}$ average spectral resolution and the 13.5 cm path length of the spectrometer 120.

In some exemplary embodiments, the excitation light source 110 of Raman spectroscopic system 100 could be a laser having a wavelength of 638 nm. The transmission grating 126 of Raman spectroscopic system 100 could have a line density of 1983 lines/mm, an operational wavelength range of 649.75 nm to 727.35 nm, a diffraction efficiency of approximately 60% to 80% with an average diffraction efficiency of approximately 65% in the operational wavelength range, and an angle of incidence of 43.21 degrees at a center wavelength of 690.5 nm for first order diffraction. The collimating element 124 and the focusing element 128 could have a focal length of 135 mm and an f-number in the range of F/1.2 to F/4. The detector 130 could be a deep cooled back thinned CCD having an array of 2048×70 pixels, a pixel size of 14 μm×14 μm, and an image area of 28.7 mm by 0.98 mm. In these examples, spectrometer 120 of Raman spectroscopic system 100 could have a preselected spectral band of 649.75 nm to 727.35 nm, or alternatively represented as a preselected spectral band of 283.56 $cm^{-1}$ to 1925.48 $cm^{-1}$ based on the excitation wavelength of 638 nm, an average transfer efficiency of 65% over the preselected spectral band, a spectral resolution of 1.43 $cm^{-1}$ at the center wavelength of 690.5 nm, a spectral resolution from 1.29 $cm^{-1}$ to 1.61 $cm^{-1}$ for different wavelengths of the preselected spectral band with an average spectral resolution of 1.43 $cm^{-1}$ of all the wavelengths of the preselected spectral band over the 2048 pixels of the CCD array, a path length from the focusing element 128 to the detector 130 of 13.5 cm, and a width of the entrance aperture 122 of 25 µm. The performance ratio of the spectrometer 120 could be 4.8%·cm$^{-1}$, which is the ratio between the 65% average transfer efficiency and the 13.5 cm path length of the spectrometer 120. The performance product of the spectrometer 120 could be 19.31, which is the product of the 1.43 cm$^{-1}$ average spectral resolution and the 13.5 cm path length of the spectrometer 120.

In some exemplary embodiments, the excitation light source 110 of Raman spectroscopic system 100 could be a laser having a wavelength of 785 nm. The transmission grating 126 of Raman spectroscopic system 100 could have a line density of 1388 lines/mm, an operational wavelength range of 797.5.57 nm to 931.2 nm, a diffraction efficiency of approximately 60% to 80% with an average diffraction efficiency of approximately 65% in the operational wavelength range, and an angle of incidence of 36.94 degrees at a center wavelength of 866 nm for first order diffraction. The collimating element 124 and the focusing element 128 could have a focal length of 135 mm and an f-number in the range of F/1.2 to F/4. The detector 130 could be a deep cooled back thinned CCD having an array of 2048×70 pixels, a pixel size of 14 µm×14 µm, and an image area of 28.7 mm by 0.98 mm. In these examples, spectrometer 120 of Raman spectroscopic system 100 could have a preselected spectral band of 797.5.57 nm to 931.2 nm, or alternatively represented as a preselected spectral band of 282.02 cm$^{-1}$ to 1920.22 cm$^{-1}$ based on the excitation wavelength of 785 nm, an average transfer efficiency of 65% over the preselected spectral band, a spectral resolution of 1.43 cm$^{-1}$ at the center wavelength of 866 nm, a spectral resolution from 1.25 cm$^{-1}$ to 1.65 cm$^{-1}$ for different wavelengths of the preselected spectral band with an average spectral resolution of 1.43 cm$^{-1}$ of all the wavelengths of the preselected spectral band over the 2048 pixels of the CCD array, a path length from the focusing element 128 to the detector 130 of 13.5 cm, and a width of the entrance aperture 122 of 25 µm. The performance ratio of the spectrometer 120 could be 4.8%·cm$^{-1}$, which is the ratio between the 65% average transfer efficiency and the 13.5 cm path length of the spectrometer 120. The performance product of the spectrometer 120 could be 19.31, which is the product of the 1.43 cm$^{-1}$ average spectral resolution and the 13.5 cm path length of the spectrometer 120.

In some exemplary embodiments, the excitation light source 110 of Raman spectroscopic system 100 could be a laser having a wavelength of 1064 nm. The transmission grating 126 of Raman spectroscopic system 100 could have a line density of 775 lines/mm, an operational wavelength range of 1097.03 nm to 1337.03 nm, a diffraction efficiency of approximately 60% to 80% with an average diffraction efficiency of approximately 65% in the operational wavelength range, and an angle of incidence of 28.22 degrees at a center wavelength of 1220.5 nm for first order diffraction. The collimating element 124 and the focusing element 128 could have a focal length of 135 mm and an f-number in the range of F/1.2 to F/4. The detector 130 could be a deep cooled back thinned CCD having an array of 2048×70 pixels, a pixel size of 14 µm×14 µm, and an image area of 28.7 mm by 0.98 mm. In these examples, spectrometer 120 of Raman spectroscopic system 100 could have a preselected spectral band of 1097.03 nm to 1337.03 nm, or alternatively represented as a preselected spectral band of 283 cm$^{-1}$ to 1919.25 cm$^{-1}$ based on the excitation wavelength of 1064 nm, an average transfer efficiency of 65% over the preselected spectral band, a spectral resolution of 1.43 cm$^{-1}$ at the center wavelength of 1220.5 nm, a spectral resolution from 1.18 cm$^{-1}$ to 1.75 cm$^{-1}$ for different wavelengths of the preselected spectral band with an average spectral resolution of 1.43 cm$^{-1}$ of all the wavelengths of the preselected spectral band over the 2048 pixels of the CCD array, a path length from the focusing element 128 to the detector 130 of 13.5 cm, and a width of the entrance aperture 122 of 25 µm. The performance ratio of the spectrometer 120 could be 4.8%·cm$^{-1}$, which is the ratio between the 65% average transfer efficiency and the 13.5 cm path length of the spectrometer 120. The performance product of the spectrometer 120 could be 19.31, which is the product of the 1.43 cm$^{-1}$ average spectral resolution and the 13.5 cm path length of the spectrometer 120.

In some exemplary embodiments, the excitation light source 110 of Raman spectroscopic system 100 could be a laser. The excitation beam 200 emitted by the laser could be collimated by a lens, such as the beam expander 112, and then focused by a cylindrical lens onto the bottom end of the cuvette 310 in the form of a line. The focused line of the excitation beam on the bottom end of the cuvette 310 could be imaged and projected vertically to the entrance slit 122 of the spectrometer 120 along its vertical direction by the cylindrical lens and aperture focusing lens 118, which could be imaged to the detector 130 by the collimating element 124 and the focusing element 128. In these examples, the detector 130 could be an e2v CCD having an array of 2048×264 pixels, a pixel size of 15 µm×15 µm, and an image area of 30.7 mm by 4 mm. The image of the focused line on the detector could have a height up to 4 mm and a width of 2 pixels or more to achieve Nyquist sampling of the spectrum of the optical signal. In these examples, spectrometer 120 of Raman spectroscopic system 100 could have any of the combinations of excitation light sources and optical elements of the exemplary embodiments described above in fifteen paragraphs beginning "In some exemplary embodiments, the excitation light source 110 of Raman spectroscopic system 100 cpi;d be a ;aser . . . " and additional paragraphs directly referencing these paragraphs. In some exemplary embodiments, the focused line of the excitation beam can be projected onto the bottom end of the cuvette 310. In some exemplary embodiments, the focused line of the excitation beam can be scanned over the bottom end of the cuvette 310 line by line or rotationally to interrogate one or more selected areas across the interior surface 313a as desired. For example, the focused line of the excitation beam can be scanned over the bottom end of the cuvette 310 to interrogate a rectangular area line by line, or can be scanned over an area of an X-shaped or star-shaped pattern rotationally, or can be scanned over a circular area rotationally.

In certain exemplary embodiments, the Raman bands or Raman peaks that are analyzed for detecting the presence or absence of a target in a sample can be selected based on additional understanding of the molecular structure and composition of the target and therefore, are not limited to the examples provided in this disclosure.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive.

It is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A spectrometer comprising:
   a plurality of optical elements, comprising an entrance aperture, a collimating element, a volume phase holographic grating, a focusing element, and a detector array; wherein
   the entrance aperture is configured to receive a light beam;
   the collimating element is configured to direct the light beam to the volume phase holographic grating;
   the volume phase holographic grating is configured to disperse the light beam over a preselected spectral band of at least 50 nm;
   the focusing element is configured to focus the dispersed light beam to the detector array; and
   the plurality of optical elements are configured to transfer the light beam from the entrance aperture to the detector array with an average transfer efficiency from 60% to 98% for first order diffraction over the preselected spectral band of at least 50 nm.

2. The spectrometer of claim 1, wherein the plurality of optical elements are further configured to detect the dispersed light beam at the detector array with a spectral resolution from 0.1 $cm^{-1}$ to 2.5 $cm^{-1}$ over the preselected spectral band of at least 50 nm.

3. The spectrometer of claim 1, wherein the plurality of optical elements are configured to provide a performance ratio from 3%·$cm^{-1}$ to 12.3%·$cm^{-1}$ in the preselected spectral band, the performance ratio being a ratio between a transfer efficiency and a path length of the light beam traveled from the focusing element to the detector array.

4. The spectrometer of claim 1, wherein the plurality of optical elements are configured to provide a performance product from 0.8 to 100 in the preselected spectral band, the performance product being a product of a spectral resolution in $cm^{-1}$ and the path length of the light beam traveled from the focusing element to the detector array in cm.

5. The spectrometer of claim 1, wherein the path length of the light beam traveled from the focusing element to the detector array is from 8 cm to 20 cm.

6. The spectrometer of claim 1, wherein the detector array is a cryogenically cooled detector array.

7. The spectrometer of claim 1, wherein the volume phase holographic grating has a peak diffraction efficiency higher than 60% at a wavelength of 568 nm for first order diffraction at an angle of incidence of 48.8 degrees.

8. The spectrometer of claim 1, wherein the preselected spectral band is from 408 nm to 441 nm, from 537 nm to 596 nm, from 791 to 1048 nm, or from 1075 to 1613 nm.

9. The spectrometer of claim 1, wherein the volume phase grating comprises a transmissive material having a refractive index that vary in the form of fringes having a spatial frequency from 380 lines/mm to 6000 lines/mm.

10. The spectrometer of claim 1, wherein the volume phase holographic grating is configured to disperse the light beam over two or more preselected spectral bands, at least one of the two or more preselected spectral bands is of at least 50 nm.

11. A method for detecting the presence or absence of at least one feature of a Raman signal indicative of the presence or absence of a target in a sample, the method comprising:
   focusing a light beam onto a portion of the sample;
   directing a Raman signal from the portion of the sample to a spectrometer, the spectrometer comprising a plurality of optical elements, comprising an entrance aperture, a collimating element, a volume phase holographic grating, a focusing element, and a detector array; wherein
   the entrance aperture is configured to receive a light beam;
   the collimating element is configured to direct the light beam to the volume phase holographic grating;
   the volume phase holographic grating is configured to disperse the light beam over a preselected spectral band of at least 50 nm;
   the focusing element is configured to focus the dispersed light beam to the detector array; and
   the plurality of optical elements are configured to transfer the light beam from the entrance aperture to the detector array with an average transfer efficiency from 60% to 98% for first order diffraction with a spectral resolution from 0.1 $cm^{-1}$ to 5 $cm^{-1}$ over the preselected spectral band; and
   detecting the presence or absence of at least one feature of the Raman signal indicative of the presence or absence of the target in the sample.

12. The method of claim 11, wherein the detecting comprises analyzing a combination of at least three spectral bands of the Raman signal, the combination of spectral bands being selected from a group of spectral bands comprising spectral bands 610-630 $cm^{-1}$, 630-650 $cm^{-1}$, 715-735 $cm^{-1}$, 950-979 $cm^{-1}$, 990-1010 $cm^{-1}$, 1115-1135 $cm^{-1}$, 1155-1165 $cm^{-1}$, 1160-1180 $cm^{-1}$, 1200-1220 $cm^{-1}$, 1240-1260 $cm^{-1}$, 1290-1310 $cm^{-1}$, 1315-1325 $cm^{-1}$, 1330-1350 $cm^{-1}$, 1410-1430 $cm^{-1}$, 1440-1460 $cm^{-1}$, 1570-1590 $cm^{-1}$, 1600-1620 $cm^{-1}$, and 1650-1670 $cm^{-1}$.

13. The method of claim 11, wherein the detecting comprises detecting the presence or absence of at least one feature of the Raman signal indicative of the presence or absence of one or more markers or byproducts of the target.

14. The method of claim 11, wherein the target is a virus, a bacterium, or a parasite.

15. The method of claim 11, wherein the target substance is a metabolite, a chemical, or a toxin.

16. The method of claim 11, wherein the target is a cell, a tumor cell, a white blood cell, a protein, a lipid, an enzyme, a tissue, a normal tissue, a necrotic tissue, or a tissue constituent.

17. The method of claim 11, wherein the detecting comprises detecting the presence or absence of at least one feature of the Raman signal indicative of the presence or absence of two or more targets in the sample.

18. A method for performing an analysis on a sample within a cuvette comprising:

focusing a light beam onto a portion of the sample;

directing a Raman signal from the portion of the sample to a spectrometer, the spectrometer comprising a plurality of optical elements, comprising an entrance aperture, a collimating element, a volume phase holographic grating, a focusing element, and a detector array; wherein the entrance aperture is configured to receive a light beam;

the collimating element is configured to direct the light beam to the volume phase holographic grating;

the volume phase holographic grating is configured to disperse the light beam over a preselected spectral band of at least 50 nm;

the focusing element is configured to focus the dispersed light beam to the detector array; and the plurality of optical elements are configured to transfer the light beam from the entrance aperture to the detector array with an average transfer efficiency from 60% to 98% for first order diffraction with a spectral resolution from 0.1 $cm^{-1}$ to 5 $cm^{-1}$ over the preselected spectral band; and analyzing the Raman signal.

19. The method of claim 11, wherein the plurality of optical elements are configured to transfer the light beam from the entrance aperture to the detector array with an average transfer efficiency from 60% to 98% for first order diffraction with a spectral resolution from 0.1 $cm^{-1}$ to 2.5 $cm^{-1}$ over the preselected spectral band.

20. The method of claim 18, wherein the plurality of optical elements are configured to transfer the light beam from the entrance aperture to the detector array with an average transfer efficiency from 60% to 98% for first order diffraction with a spectral resolution from 0.1 $cm^{-1}$ to 2.5 $cm^{-1}$ over the preselected spectral band.

* * * * *